United States Patent
Zhan et al.

(10) Patent No.: US 11,329,684 B2
(45) Date of Patent: *May 10, 2022

(54) RADIO FREQUENCY SIGNAL BOOSTERS FOR VEHICLES

(71) Applicant: Cellphone-Mate, Inc., Fremont, CA (US)

(72) Inventors: Hongtao Zhan, Fremont, CA (US); Xulei Lin, Shenzhen (CN)

(73) Assignee: Cellphone-Mate, Inc., Fremont, CA (US)

(*) Notice: Subject to any disclaimer, the term of this patent is extended or adjusted under 35 U.S.C. 154(b) by 38 days.

This patent is subject to a terminal disclaimer.

(21) Appl. No.: 15/781,601

(22) PCT Filed: Jun. 15, 2017

(86) PCT No.: PCT/CN2017/088458
§ 371 (c)(1),
(2) Date: Jun. 5, 2018

(87) PCT Pub. No.: WO2017/215634
PCT Pub. Date: Dec. 21, 2017

(65) Prior Publication Data
US 2020/0350943 A1  Nov. 5, 2020

Related U.S. Application Data

(60) Provisional application No. 62/351,548, filed on Jun. 17, 2016.

(51) Int. Cl.
*H04B 1/38* (2015.01)
*H04W 4/40* (2018.01)
(Continued)

(52) U.S. Cl.
CPC ....... *H04B 1/3877* (2013.01); *H04B 7/15507* (2013.01); *H04W 4/40* (2018.02); *H04W 84/12* (2013.01)

(58) Field of Classification Search
CPC ...... H04B 1/3822; H04B 1/0057; H04B 1/40; H04B 3/548; H04B 7/01; H04B 7/5535;
(Continued)

(56) References Cited

U.S. PATENT DOCUMENTS 6,329,949 B1  12/2001 Barnett
6,570,858 B1  5/2003 Emmons et al.
(Continued)

FOREIGN PATENT DOCUMENTS

CN   101670810 A   3/2010
CN   105409298 A   3/2016
(Continued)

OTHER PUBLICATIONS

International Search Report and Written Opinion for International Application No. PCT/CN2017/088458 dated Aug. 23, 2017, in 11 pages.
(Continued)

*Primary Examiner* — Pablo N Tran
(74) *Attorney, Agent, or Firm* — Knobbe, Martens, Olson & Bear, LLP

(57) ABSTRACT

Apparatus and methods for signal boosters for vehicles are provided herein. In certain implementations, a vehicle signal booster system includes a signal booster and a mobile station antenna that receives an RF uplink signal and transmits a boosted RF downlink signal. The signal booster includes a housing, a mobile station antenna port that receives the RF uplink signal from the mobile station antenna and provides the boosted RF downlink signal to the mobile station antenna, a base station antenna that receives an RF downlink
(Continued)

signal and transmits a boosted RF uplink signal, and booster circuitry. The booster circuitry generates the boosted RF downlink signal based on amplifying one or more downlink channels of the RF downlink signal, and generates the boosted RF uplink signal based on amplifying one or more uplink channels of the RF uplink signal.

26 Claims, 37 Drawing Sheets

(51) Int. Cl.
*H04B 17/18* (2015.01)
*H04M 1/00* (2006.01)
*H04B 1/3877* (2015.01)
*H04B 7/155* (2006.01)
*H04W 84/12* (2009.01)

(58) Field of Classification Search
CPC ............ H04B 3/58; H04B 1/38; H04B 7/155; H04B 17/318; H03G 3/3042; H04Q 1/02; H04Q 1/08; B60L 1/00; B60R 16/033; H04M 1/00; H04W 52/52; H04W 16/26
See application file for complete search history.

(56) References Cited

U.S. PATENT DOCUMENTS

| | | | |
|---|---|---|---|
| 6,731,904 B1 | 5/2004 | Judd | |
| 6,864,853 B2 | 3/2005 | Judd | |
| 7,009,573 B2 | 3/2006 | Hornsby et al. | |
| 7,565,106 B1 | 7/2009 | Oh et al. | |
| 7,729,656 B2 | 6/2010 | Van Buren | |
| 7,783,318 B2 | 8/2010 | Wilson et al. | |
| 7,813,314 B2 | 10/2010 | Fulknier | |
| 8,005,513 B2* | 8/2011 | Risheq | H04B 7/15535 455/571 |
| 8,023,885 B2* | 9/2011 | Proctor, Jr | H04B 7/2606 455/7 |
| 8,027,636 B2* | 9/2011 | DeMarco | H01Q 5/40 455/11.1 |
| 8,244,173 B2 | 8/2012 | Moon | |
| 8,265,546 B2* | 9/2012 | Wang | H04B 7/15578 455/7 |
| 8,498,234 B2 | 7/2013 | Proctor | |
| 8,867,572 B1 | 10/2014 | Zhan | |
| 8,971,796 B2 | 3/2015 | Judd | |
| 9,100,839 B2 | 8/2015 | Zhan | |
| 9,432,852 B2 | 8/2016 | Zhan et al. | |
| 9,444,543 B2* | 9/2016 | Ashworth | H03F 3/19 |
| 9,775,051 B2 | 9/2017 | Zhan | |
| 10,236,921 B1* | 3/2019 | Kohlhepp | H01Q 1/246 |
| 10,523,160 B2* | 12/2019 | Ashworth | H03F 3/72 |
| 10,623,036 B2 | 4/2020 | Zhan et al. | |
| 10,630,374 B2* | 4/2020 | Ashworth | H04W 88/085 |
| 10,637,557 B2* | 4/2020 | Ashworth | H04B 7/15507 |
| 10,659,142 B1* | 5/2020 | Nordgran | H04W 16/26 |
| 10,784,952 B2* | 9/2020 | Huang | H04B 7/15535 |
| 2002/0034958 A1 | 3/2002 | Oberschmidt | |
| 2004/0110469 A1* | 6/2004 | Judd | G01S 19/25 455/15 |
| 2004/0160376 A1 | 8/2004 | Hornsby et al. | |
| 2004/0166802 A1 | 8/2004 | McKay, Sr. et al. | |
| 2004/0192194 A1 | 9/2004 | Zhen | |
| 2005/0118949 A1* | 6/2005 | Allen | H04B 7/15578 455/13.4 |
| 2005/0227652 A1 | 10/2005 | Kang et al. | |
| 2006/0164318 A1 | 7/2006 | Lastinger et al. | |
| 2006/0205342 A1 | 9/2006 | McKay et al. | |
| 2006/0205343 A1 | 9/2006 | Runyon | |
| 2007/0071128 A1 | 3/2007 | Meir et al. | |
| 2008/0039012 A1 | 2/2008 | McKay et al. | |
| 2008/0081555 A1 | 4/2008 | Kong et al. | |
| 2008/0225758 A1 | 9/2008 | Proctor | |
| 2008/0233865 A1 | 9/2008 | Malarky et al. | |
| 2010/0029197 A1 | 2/2010 | Judd | |
| 2010/0075596 A1 | 3/2010 | Demarco et al. | |
| 2010/0197222 A1 | 8/2010 | Scheucher | |
| 2010/0202325 A1 | 8/2010 | Poulin et al. | |
| 2012/0034954 A1 | 2/2012 | Tabe | |
| 2012/0257051 A1 | 10/2012 | Cheng | |
| 2012/0302188 A1 | 11/2012 | Sahota et al. | |
| 2013/0203404 A1 | 8/2013 | Cook | |
| 2013/0222201 A1 | 8/2013 | Ma | |
| 2013/0242852 A1 | 9/2013 | Petros | |
| 2013/0322395 A1 | 12/2013 | Kazmi et al. | |
| 2014/0016525 A1 | 1/2014 | Yoshizawa | |
| 2014/0038531 A1 | 2/2014 | Hisao et al. | |
| 2014/0134944 A1 | 5/2014 | Schwengler | |
| 2014/0184455 A1 | 7/2014 | Lea et al. | |
| 2014/0187173 A1 | 7/2014 | Partee | |
| 2014/0292593 A1 | 10/2014 | Thiam et al. | |
| 2014/0321353 A1 | 10/2014 | Zhan | |
| 2015/0008992 A1 | 1/2015 | Black | |
| 2015/0130667 A1 | 5/2015 | Koskiniemi | |
| 2015/0311591 A1 | 10/2015 | Golombek | |
| 2016/0036403 A1* | 2/2016 | Ashworth | H03F 3/19 330/284 |
| 2016/0198347 A1* | 7/2016 | Zhan | H04B 1/40 455/23 |
| 2017/0093525 A1 | 3/2017 | Navid | |
| 2017/0111864 A1 | 4/2017 | Ashworth et al. | |
| 2018/0070323 A1 | 3/2018 | Zhan | |
| 2018/0077585 A1 | 3/2018 | Zhan | |
| 2018/0139708 A1 | 3/2018 | Zhan | |
| 2020/0044618 A1* | 2/2020 | Terry | H03G 3/3042 |
| 2020/0287614 A1* | 9/2020 | Judd | H04B 7/15535 |
| 2020/0350941 A1 | 11/2020 | Zhan et al. | |
| 2021/0194114 A1* | 6/2021 | Caren | H01Q 1/3275 |

FOREIGN PATENT DOCUMENTS

| | | |
|---|---|---|
| EP | 2 226 890 A1 | 9/2010 |
| WO | WO 2007/109381 A2 | 9/2007 |

OTHER PUBLICATIONS

Cellphone-Mate Force-5 Manual, Apr. 30, 2012, in 36 pages (available at World Wide Web page: transition.fcc.gov/oet/ea/fccid/).
CETECOM Annex 1: Measurement Diagrams to Test Report No. 15-1-0046901-01a, in 16 pages, dated Mar. 31, 2016 (available at World Wide Web page: apps.fcc.gov/oetcf/eas/reports/ViewExhibitReport.cfm?mode=Exhibits&RequestTimeout=500 &calledFromFrame=N&application_id=% 2BDihVrSoXMNf7NBHMOSypQ%3D%3D&fcc_id= 2ACC7LTECOMPB0).
CETECOM Test Report No. 15-1-0046901-01a According to FCC Regulations Part 20, Section 20.21 for Kathrein Automotive GmbH & Co. KG, in 18 pages, dated Mar. 31, 2016 (available at World Wide Web page: apps.fcc.gov/oetcf/eas/reports/ViewExhibitReport.cfm?mode=Exhibits&RequestTimeout=500&calledFromFrame=N &application_id=%2BDihVrSoXMNf7NBHMOSypQ%3D%3D &fcc_id=2ACC7LTECOMPB0).
CETECOM Test Report No. 3-20835062-C, in 187 pages, dated Mar. 31, 2016 (available at World Wide Web page: apps.fcc.gov/oetcf/eas/reports/ViewExhibitReport.cfm?mode=Exhibits &RequestTimeout=500&calledFromFrame=N&application_id=% 2BDihVrSoXMNf7NBHMOSypQ%3D%3D&fcc_id= 2ACC7LTECOMPB0).
CKC Laboratories, Inc., Addendum EMC Test Report, Report No. 96950-13A, Issue Jul. 14, 2015, made public Jul. 29, 2015 in 217 pages (available at World Wide Web page: transition.fcc.gov/oet/ea/fccid/).
CKC Laboratories, Inc., EMC Test Report, Report No. 96950-14, Issue Jul. 6, 2015, made public Jul. 29, 2015 in 93 pages (available at World Wide Web page: transition.fcc.gov/oet/ea/fccid/).
CKC Laboratories, Inc., EMC Test Report, Report No. 96950-15, Issue Jul. 6, 2015, made public Jul. 29, 2015 in 70 pages (available at World Wide Web page: transition.fcc.gov/oet/ea/fccid/).

(56) References Cited

OTHER PUBLICATIONS

CKC Laboratories, Inc., EMC Test Report, Report No. 96950-16, Part 2, Issue Jul. 6, 2015, made public Jul. 29, 2015 in 86 pages (available at World Wide Web page: transition.fcc.gov/oet/ea/fccid/).
CKC Laboratories, Inc., EMC Test Report, Report No. 96950-16, Part 1, Issue Jul. 6, 2015, made public Jul. 29, 2015 in 115 pages (available at World Wide Web page: transition.fcc.gov/oet/ea/fccid/).
CKC Laboratories, Inc., Radio Frequency Exposure Report, Report No. 96950-22, Issue Jun. 6, 2015, made public Jul. 29, 2015 in 9 pages (available at World Wide Web page: transition.fcc.gov/oet/ea/fccid/).
Hindawi Publishing Corporation International Journal of Antennas and Propagation vol. 2012, Article ID 307616, 7 pages.
IEEE Antennas and Wireless Propagation Letters, vol. 4, 2005, Cavity-Backed Slot Antenna Array for the Repeater System of a Satellite Digital Multimedia Broadcasting Service.
Kathrein Automotive Cellular Signal Booster Compensator LTECOMPB0, in 7 pages, dated Mar. 31, 2016 (available at World Wide Web page: apps.fcc.gov/oetcf/eas/reports/ViewExhibitReport.cfm?mode=Exhibits&RequestTimeout=500&calledFromFrame=N&application_id=%2BDihVrSoXMNf7NBHMOSypQ%3D%3D&fcc_id=2ACC7LTECOMPB0).
Representative FCC Approval Documents (FCC Identifier RSNWF-HD) for Applicant Name Cellphone-Mate, made public Jul. 29, 2015, in 13 pages (available at World Wide Web page: transition.fcc.gov/oet/ea/fccid/).
SureCall EZ 4G Five-band Home Cellular Signal Booster, in 2 pages, dated Apr. 22, 2016.
SureCall EZ 4G Home Signal Booster Kit User Guide, in 16 pages, dated Jan. 29, 2016.
SureCall Force-7 Industrial User Guide, Made Public Jul. 29, 2015, in 26 pages (available at World Wide Web page: transition.fcc.gov/oet/ea/fccid/).
SureCall Fusion2Go Adjustable 2G, 3G, 4G Vehicle Signal Booster Kit User Guide, in 12 pages, dated Apr. 13, 2015.
SureCall Fusion2Go Voice and Data Cell Phone Signal Booster for Mobile Application, in 2 pages, dated Sep. 8, 2015.
Weboost Drive 4G-S Cellular Signal Booster, in 20 pages, dated Dec. 2015.
Weboost Drive 4G-S Quick Install Guide, in 2 pages, dated Dec. 2016.
Weboost Drive 4G-S Specification Sheet, in 2 pages, dated Dec. 2016.
Wilson AG ProTM Quint Selectable Signal Booster Installation Guide, Sep. 12, 2012 in 16 pages (available at World Wide Web page wilsonelectronics.com).
Wilson Electronics Mobile 4G Cellular Signal Booster 460108, in 8 pages, dated Jan. 2014.
Wilson Sleek 4G Signal Booster Installation Guide, Dec. 4, 2012, in 8 pages (available at World Wide Web page wilsonelectronics.com).
ZBoost-One YX400-P Signal Booster, Jul. 5, 2014 https://web.archive.org/web/20140705092719/http://www.zboost.com/files/YX400-P SpecSheet.pdf.

\* cited by examiner

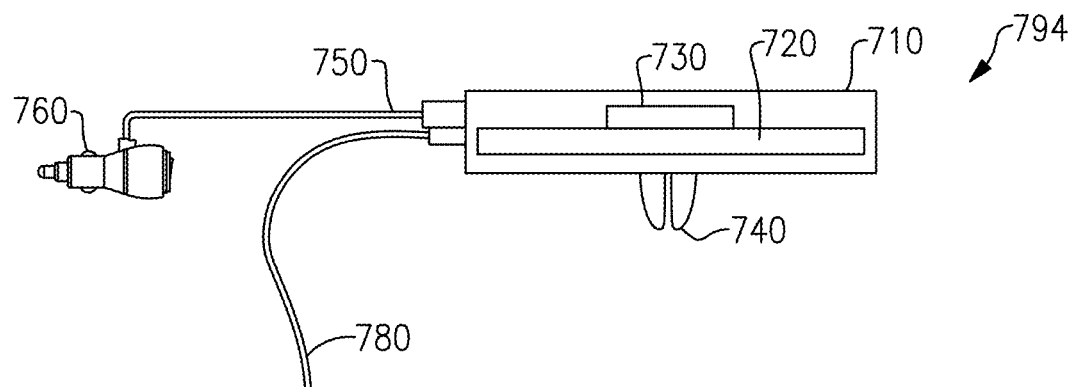
FIG.4D
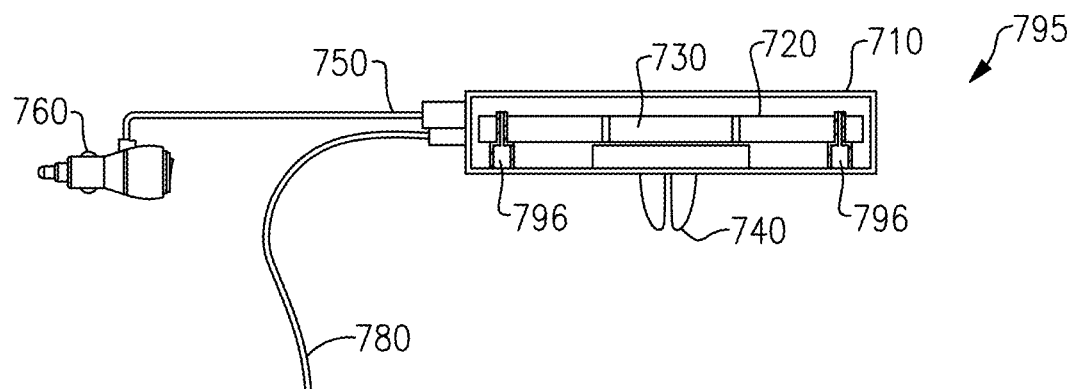
FIG.4E
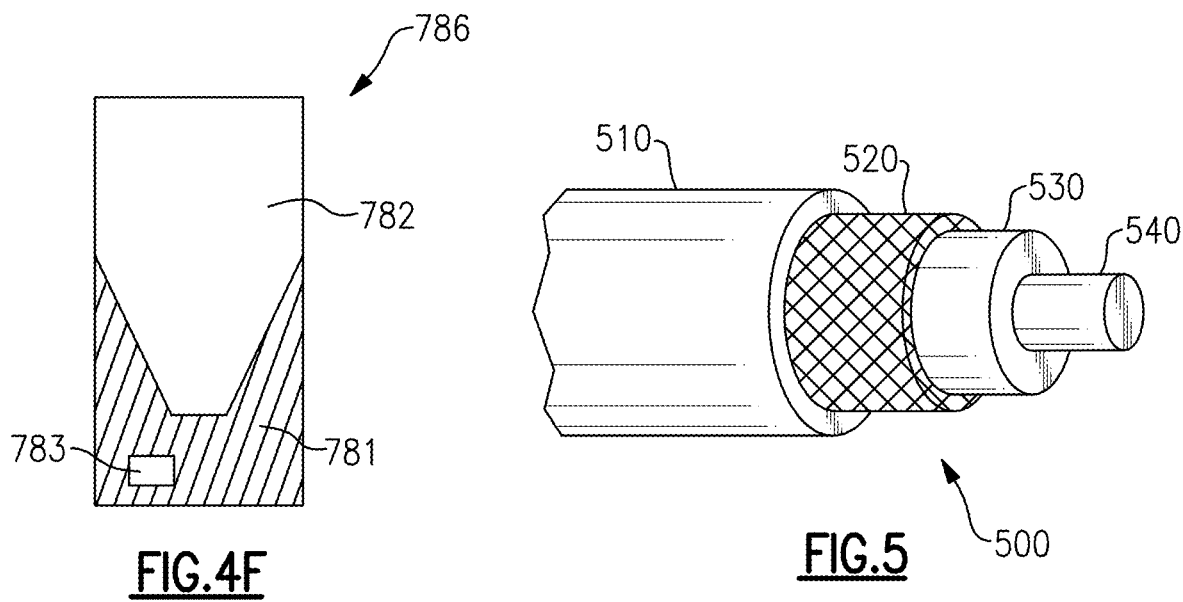
FIG.4F
FIG.5

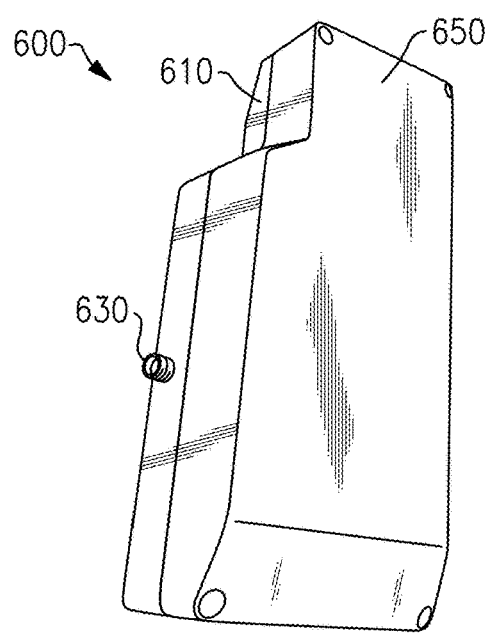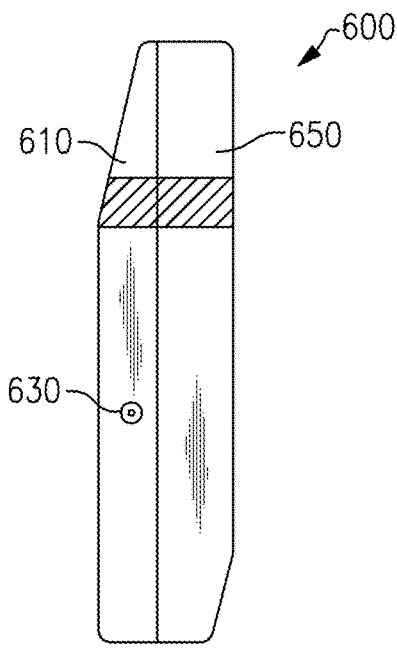
FIG.6A    FIG.6C
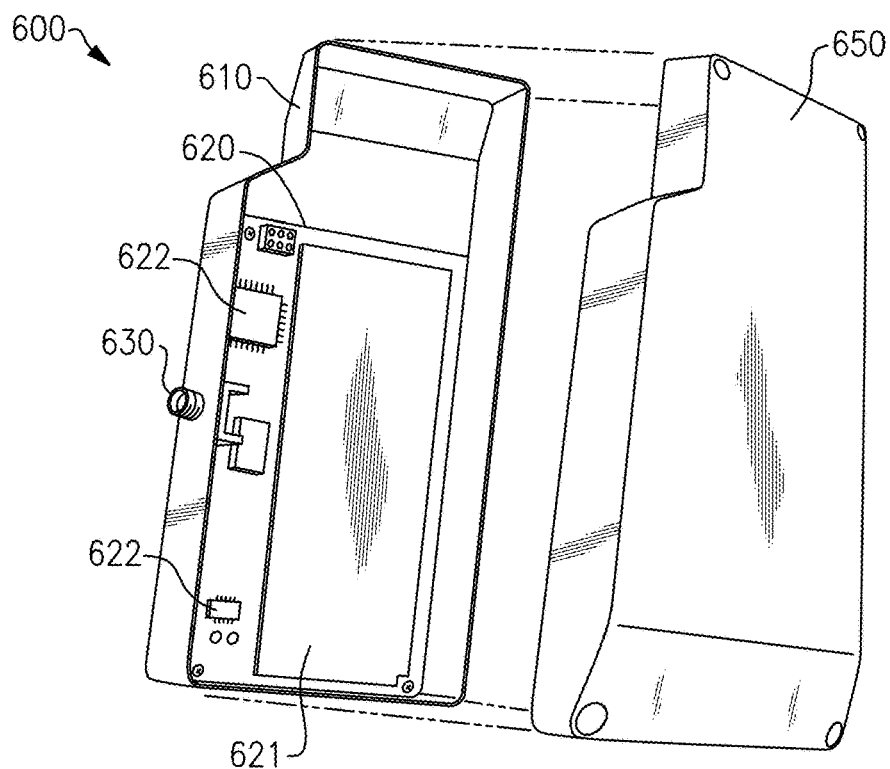
FIG.6B

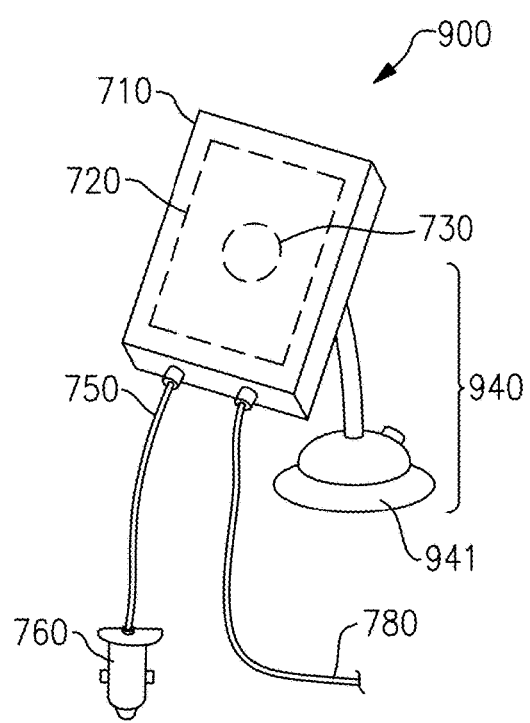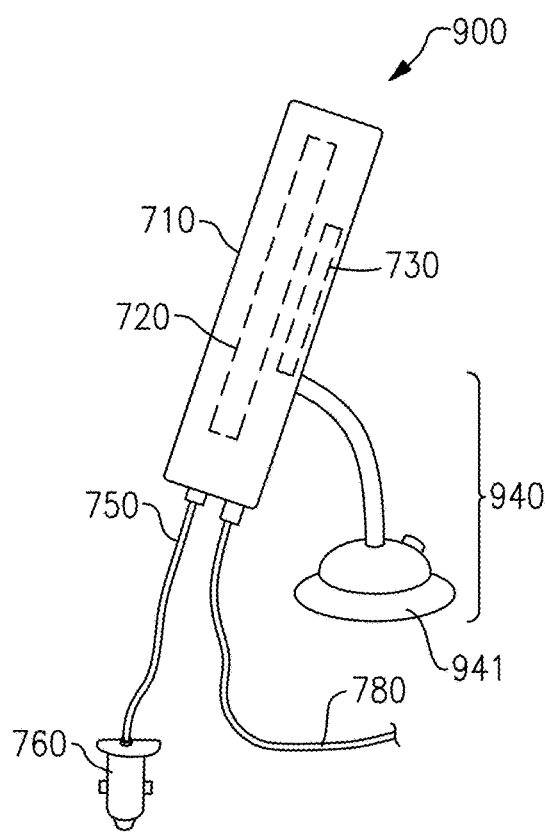
FIG.11A
FIG.11B

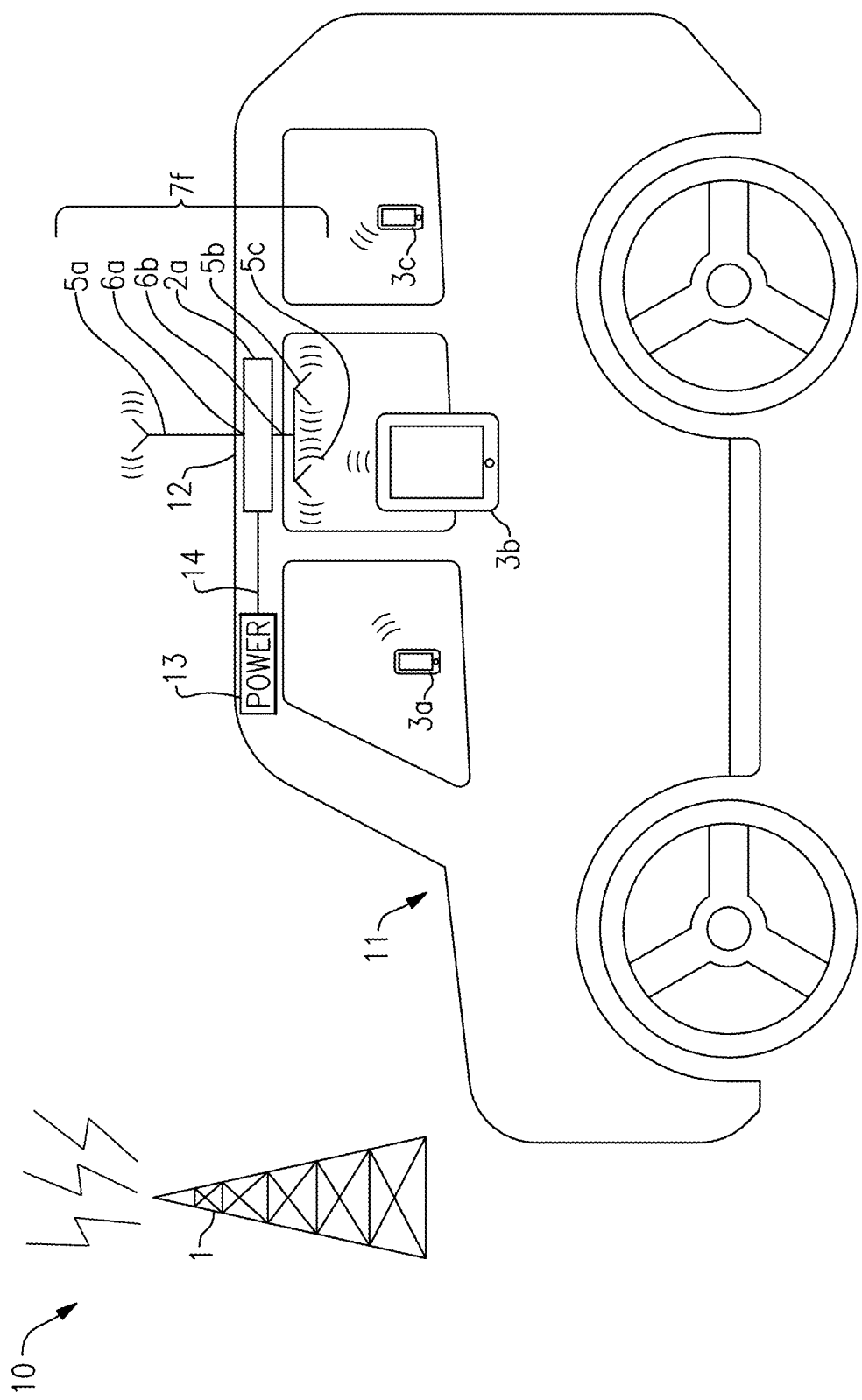

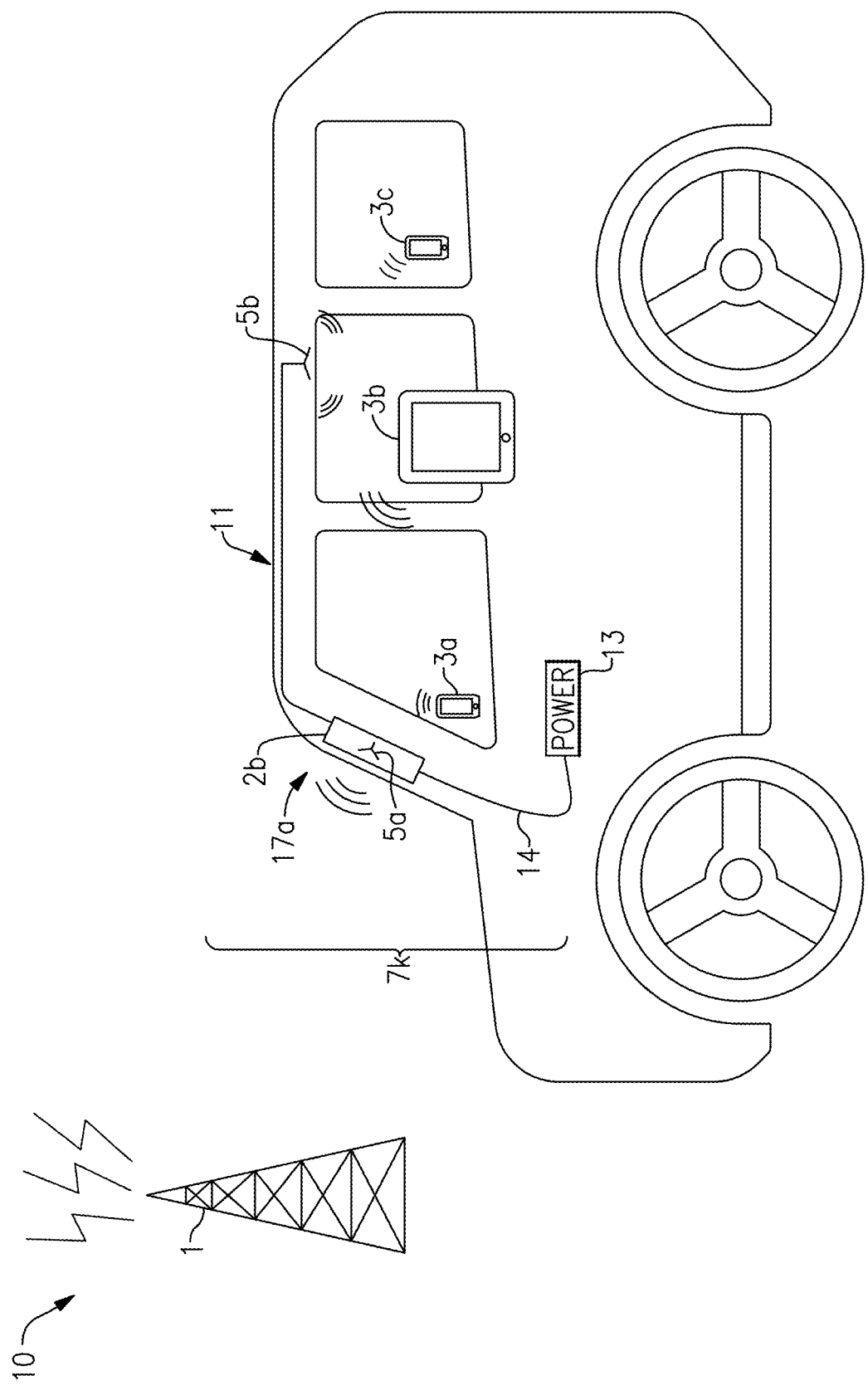

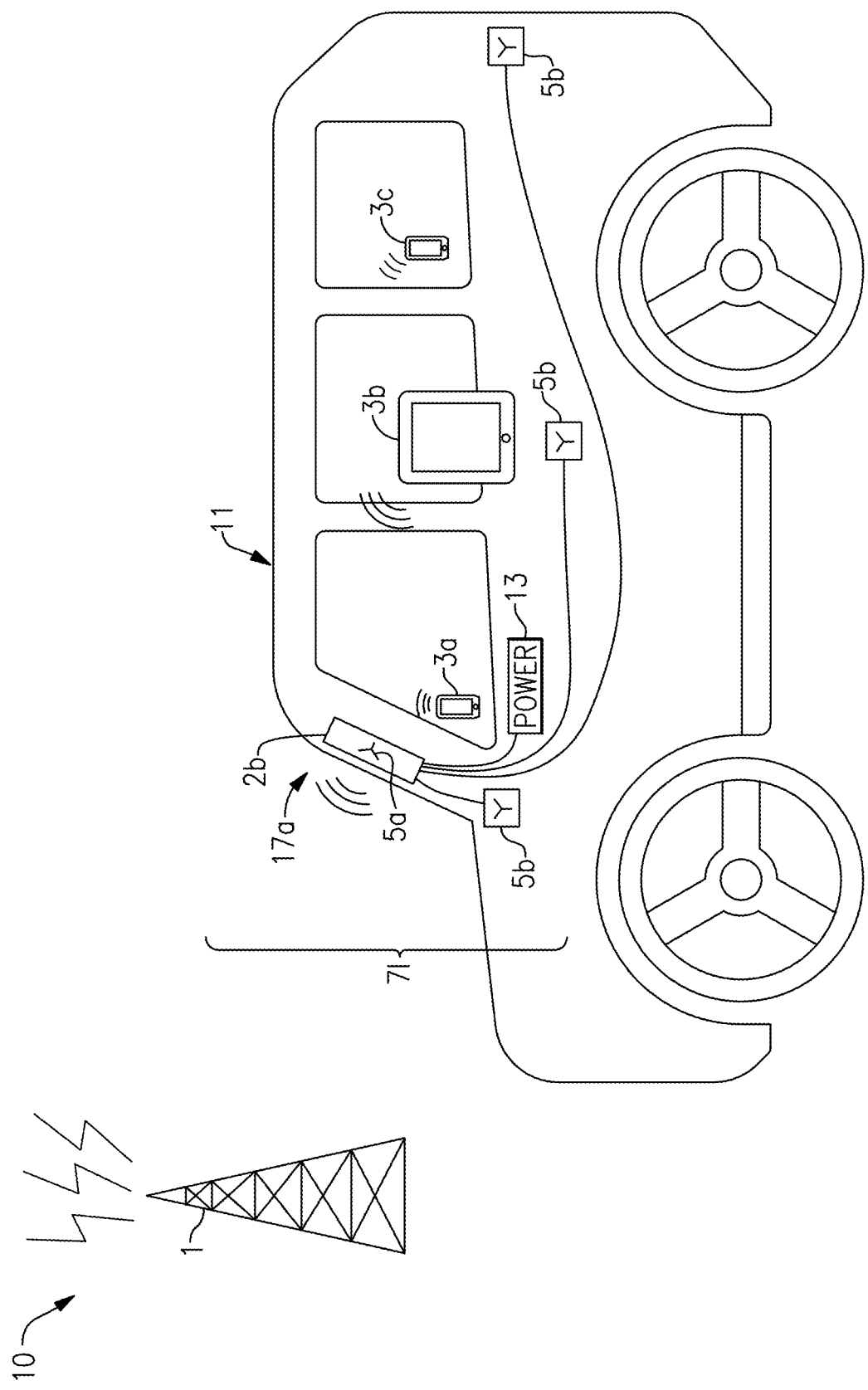

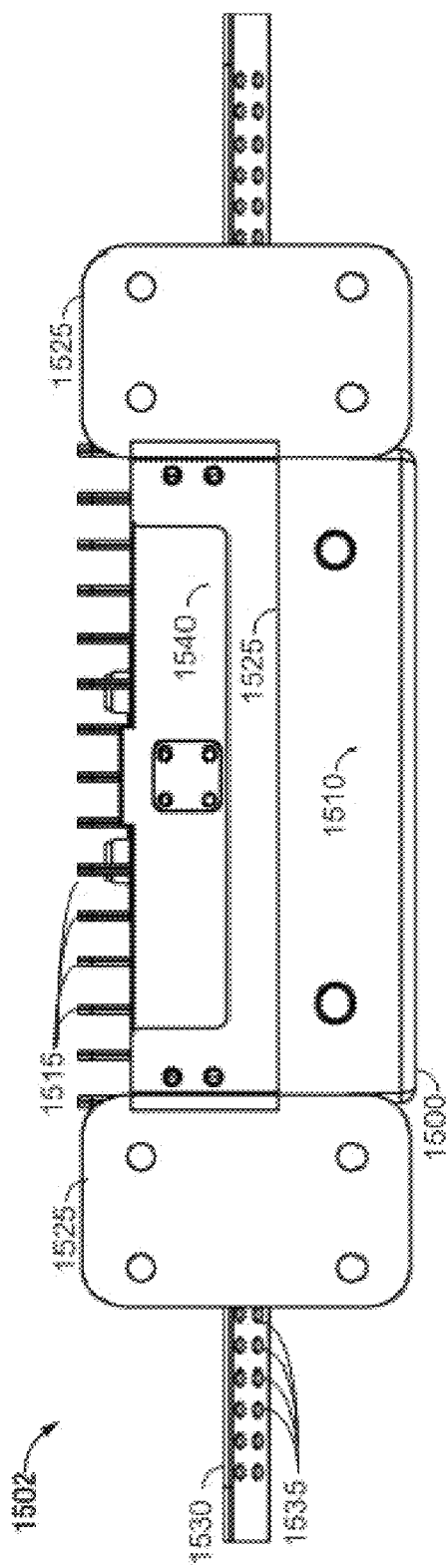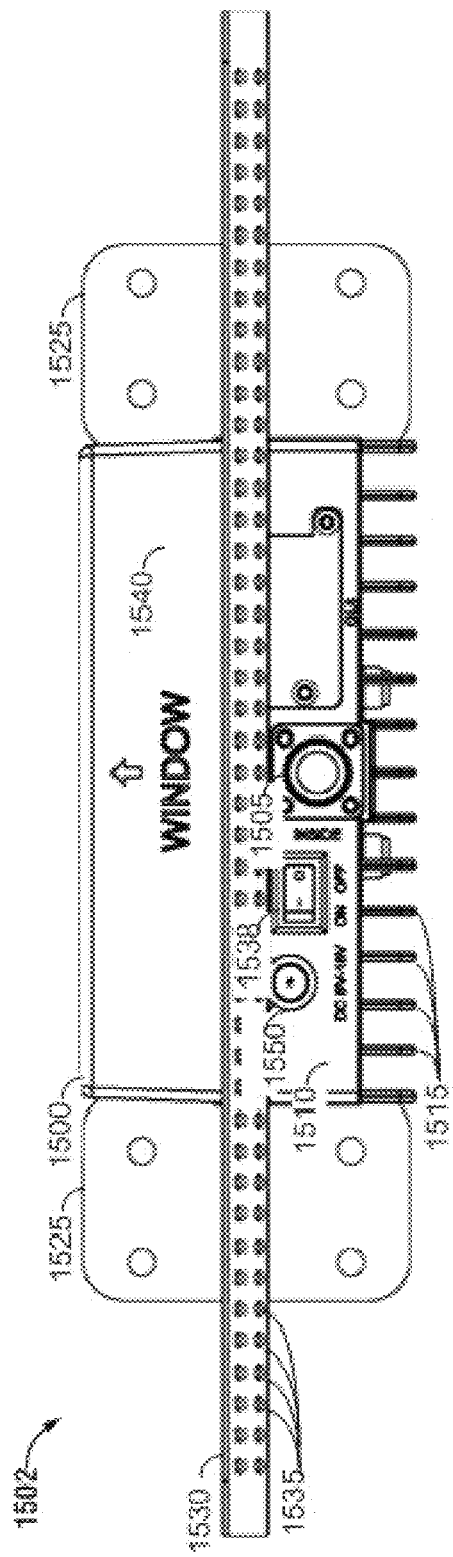
FIG. 14E
FIG. 14F

RADIO FREQUENCY SIGNAL BOOSTERS FOR VEHICLES

FIELD

Embodiments of the invention relate to electronic systems and, in particular, to radio frequency (RF) signal boosters for vehicles.

BACKGROUND

A cellular or mobile network can include base stations for communicating with wireless devices located within the network's cells. For example, base stations can transmit signals to wireless devices via a downlink (DL) channel and can receive signals from the wireless devices via an uplink (UL) channel. In the case of a network operating using frequency division duplexing (FDD), the downlink and uplink channels are separated in the frequency domain such that the frequency band operates using a pair of frequency channels.

A wireless device may be unable to communicate with any base stations when located in a portion of the mobile network having poor or weak signal strength. For example, the wireless device may be unable to communicate with a particular base station when the wireless device is separated from the base station by a large distance. Additionally, structures such as buildings or mountains can interfere with the transmission and/or reception of signals sent between the wireless device and a base station.

To improve a network's signal strength and/or coverage, a radio frequency (RF) signal booster can be used to amplify signals in the network. For example, the signal booster can be used to amplify or boost signals having frequencies associated with the frequency ranges of the network's uplink and downlink channels.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include improved communications between access points and mobile stations in a wireless network.

In one aspect, a vehicle signal booster system configured for use in a vehicle is provided. The vehicle signal booster system includes a mobile station antenna configured to receive a radio frequency (RF) uplink signal and to transmit a boosted RF downlink signal, and a signal booster. The signal booster includes a housing, a mobile station antenna port configured to receive the RF uplink signal from the mobile station antenna and to provide the boosted RF downlink signal to the mobile station antenna, a base station antenna within 20 cm of the housing, wherein the base station antenna is configured to receive an RF downlink signal and to transmit a boosted RF uplink signal, and booster circuitry within the housing, wherein the booster circuitry is configured to generate the boosted RF downlink signal based on amplifying one or more downlink channels of the RF downlink signal, and to generate the boosted RF uplink signal based on amplifying one or more uplink channels of the RF uplink signal.

In another aspect, a vehicle signal booster system includes a base station antenna configured to receive an RF downlink signal and to transmit a boosted RF uplink signal from above a roof of a vehicle, a first mobile station antenna configured to receive an RF uplink signal and to transmit a boosted RF downlink signal from beneath the roof of the vehicle, and a signal booster configured for integration in the roof of the vehicle, wherein the signal booster comprises a housing and booster circuitry within the housing and configured to receive power from a power source of the vehicle, wherein the booster circuitry is further configured to generate the boosted RF downlink signal based on amplifying one or more downlink channels of the RF downlink signal, and to generate the boosted RF uplink signal based on amplifying one or more uplink channels of the RF uplink signal, wherein the base station antenna is within 20 cm of the housing.

In another aspect, a vehicle signal booster system includes a base station antenna configured to receive an RF downlink signal and to transmit a boosted RF uplink signal from outside a body of a vehicle, a first mobile station antenna configured to receive an RF uplink signal and to transmit a boosted RF downlink signal inside the body of the vehicle, and a signal booster configured for integration in the vehicle, wherein the signal booster comprises booster circuitry configured to receive power from a power source of the vehicle, wherein the booster circuitry is further configured to generate the boosted RF downlink signal based on amplifying one or more downlink channels of the RF downlink signal, and to generate the boosted RF uplink signal based on amplifying one or more uplink channels of the RF uplink signal, wherein the base station antenna is within 20 cm of the signal booster, wherein a shielding effect of the body of the vehicle is operable as a reflector that provides sufficient isolation between the base station antenna and the first mobile station antenna to prevent oscillation of the signal booster.

In another aspect, a vehicle signal booster system configured for use in a vehicle is provided. The vehicle signal booster system includes a signal booster comprising a housing and booster circuitry within the housing, wherein the booster circuitry is configured to receive power from a vehicle power source, a base station antenna integrated with or located within the housing, wherein the base station antenna is configured to receive a radio frequency (RF) downlink signal and to transmit a boosted RF uplink signal, and a mobile station antenna integrated with or located within the housing, wherein the mobile station antenna is configured to receive an RF uplink signal and to transmit a boosted RF downlink signal, wherein the booster circuitry is further configured to generate the boosted RF downlink signal based on amplifying one or more downlink channels of the RF downlink signal, and to generate the boosted RF uplink signal based on amplifying one or more uplink channels of the RF uplink signal.

In another aspect, a radio frequency signal booster, configured for use in a vehicle, is provided. The radio frequency signal booster includes a base station antenna configured to be outside of the vehicle, the base station antenna configured to receive wireless communications signals on one or more downlink channels and to transmit wireless communications signals on one or more uplink channels, a mobile station antenna configured to transmit communications signals on one or more downlink channels and to receive wireless communications signals on one or more uplink channels, a downlink amplifier configured to amplify signals on downlink channels, received at the base station antenna, for transmission through the mobile station antenna, and an uplink amplifier configured to amplify signals on uplink channels, received at the mobile station antenna, for transmission through the base station antenna, wherein the downlink and uplink amplifiers are configured to be positioned within a body of the vehicle, adjacent to the base station antenna.

In another aspect, a radio frequency signal booster comprises a housing configured to be mounted within a vehicle, a power cable configured to receive power from the vehicle, a base station antenna integrated with or located within the housing, the base station antenna configured to receive wireless communications signals on one or more downlink channels and to transmit wireless communications signals on one or more uplink channels, at least one mobile station antenna configured to transmit cellular signals on one or more downlink channels and to receive cellular signals on one or more uplink channels, a downlink amplifier within the housing, the downlink amplifier configured to amplify signals on the one or more downlink channels, received at the base station antenna, for transmission through the mobile station antenna, and an uplink amplifier within the housing, the uplink amplifier configured to amplify signals on the one or more uplink channels, received at the mobile station antenna, for transmission through the base station antenna.

In another aspect, a radio frequency signal booster comprises a housing, a power cable, a base station antenna integrated with or located within the housing, the base station antenna configured to receive wireless communications signals on one or more downlink channels and to transmit wireless communications signals on one or more uplink channels, a mobile station antenna integrated with the power cable, the mobile station antenna configured to transmit wireless communications signals on one or more downlink channels and to receive wireless communications signals on one or more uplink channels, a downlink amplifier within the housing, the downlink amplifier configured to amplify signals on downlink channels, received at the base station antenna, for transmission through the mobile station antenna, and an uplink amplifier within the housing, the uplink amplifier configured to amplify signals on uplink channels, received at the mobile station antenna, for transmission through the base station antenna.

In another aspect, a vehicle signal booster system configured for use in a vehicle is provided. The vehicle signal booster system includes a mobile station antenna configured to receive a radio frequency (RF) uplink signal and to transmit a boosted RF downlink signal, and a signal booster. The signal booster includes a housing, a mobile station antenna port configured to receive the RF uplink signal from the mobile station antenna and to provide the boosted RF downlink signal to the mobile station antenna, a base station antenna integrated with or within the housing, wherein the base station antenna is configured to receive an RF downlink signal and to transmit a boosted RF uplink signal, and booster circuitry within the housing, wherein the booster circuitry is configured to generate the boosted RF downlink signal based on amplifying one or more downlink channels of the RF downlink signal, and to generate the boosted RF uplink signal based on amplifying one or more uplink channels of the RF uplink signal.

In another aspect, a vehicle signal booster system includes a base station antenna configured to receive an RF downlink signal and to transmit a boosted RF uplink signal from outside a body of a vehicle, a first mobile station antenna configured to receive an RF uplink signal and to transmit a boosted RF downlink signal inside the body of the vehicle, and a signal booster configured for integration in the vehicle, wherein the signal booster comprises booster circuitry configured to receive power from a power source of the vehicle, wherein the booster circuitry is further configured to generate the boosted RF downlink signal based on amplifying one or more downlink channels of the RF downlink signal, and to generate the boosted RF uplink signal based on amplifying one or more uplink channels of the RF uplink signal, wherein a shielding effect of the body of the vehicle is operable as a reflector that provides sufficient isolation between the base station antenna and the first mobile station antenna to prevent oscillation of the signal booster.

In another aspect, a vehicle signal booster system configured for use in a vehicle is provided. The vehicle signal booster system includes a mobile station antenna configured to receive a radio frequency (RF) uplink signal and to transmit a boosted RF downlink signal, and a signal booster. The signal booster includes a housing, a mobile station antenna port configured to receive the RF uplink signal from the mobile station antenna and to provide the boosted RF downlink signal to the mobile station antenna, and booster circuitry within the housing. The vehicle signal bother system further includes a base station antenna connected to the signal booster by a cable. The base station antenna is configured to receive an RF downlink signal and to transmit a boosted RF uplink signal, and the booster circuitry is configured to generate the boosted RF downlink signal based on amplifying one or more downlink channels of the RF downlink signal, and to generate the boosted RF uplink signal based on amplifying one or more uplink channels of the RF uplink signal. The cable provides less than 1 dB of loss at a highest signal frequency of interest.

In another aspect, a vehicle signal booster system includes a base station antenna configured to receive an RF downlink signal and to transmit a boosted RF uplink signal from above a roof of a vehicle, a first mobile station antenna configured to receive an RF uplink signal and to transmit a boosted RF downlink signal from beneath the roof of the vehicle, and a signal booster configured for integration in the roof of the vehicle, wherein the signal booster comprises a housing and booster circuitry within the housing and configured to receive power from a power source of the vehicle, wherein the booster circuitry is further configured to generate the boosted RF downlink signal based on amplifying one or more downlink channels of the RF downlink signal, and to generate the boosted RF uplink signal based on amplifying one or more uplink channels of the RF uplink signal, wherein the base station antenna is connected to the housing by a cable that provides less than 1 dB of loss at a highest signal frequency of interest.

In another aspect, a vehicle signal booster system comprises one or more base station antenna configured to receive an RF downlink signal and to transmit a boosted RF uplink signal from outside of the vehicle, on top of roof, rear window, front window, or other location. The vehicle signal booster system further comprises one or more mobile station antenna configured to receive an RF uplink signal and to transmit a boosted RF downlink signal from somewhere inside vehicle, such as right beneath the roof of the vehicle. The vehicle signal booster system further comprises a signal booster configured for integration with the vehicle, such as in the roof of the vehicle. The signal booster comprises booster circuitry configured to receive power from a power source of the vehicle, wherein the booster circuitry is further configured to generate the boosted RF downlink signal based on amplifying one or more downlink channels of the RF downlink signal, and to generate the boosted RF uplink signal based on amplifying one or more uplink channels of the RF uplink signal. Additionally, the vehicle body, with the shielding effects of metal components, such as the vehicle frame and/or window, also used or designed at the same time as an RF isolator so as to provide sufficient isolation such that the one or more mobile station antennas communicate with mobile device in vehicle wirelessly and effectively with enough booster gain, coverage area and signal strength and quality without oscillation and/or pre-oscillation.

BRIEF DESCRIPTION OF THE DRAWINGS

FIG. 4D is a side view of another embodiment of a vehicle interior mount including a mobile station antenna.

FIG. 4E is a side view of another embodiment of a vehicle interior mount including a mobile station antenna.

FIG. 4F is a plan view of one embodiment of a circuit board for a vehicle interior mount.

FIG. 5 is a perspective view of one example of a shared DC power and RF cable for a vehicle signal booster system.

FIG. 6A is a perspective view of a signal booster according to one embodiment.

FIG. 6B is a perspective view of two portions of the signal booster of FIG. 6A when opened.

FIG. 6C is a side view of the signal booster of FIG. 6A.

FIG. 11A is a front perspective view of another embodiment of a vehicle interior mount including a mobile station antenna.

FIG. 11B is a side view of the vehicle interior mount of FIG. 11A.

FIGS. 12A-12H are schematic diagrams of the mobile network of FIG. 1 according to various vehicular embodiments.

FIG. 14E is a bottom view of the signal booster of FIG. 14A.

FIG. 14F is a top view of the signal booster of FIG. 14A.

DETAILED DESCRIPTION OF EMBODIMENTS

Various aspects of the novel systems, apparatus, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatus, and methods disclosed herein, whether implemented independently of, or combined with, any other aspect of the invention. For example, an apparatus can be implemented or a method can be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein can be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Figure 1:
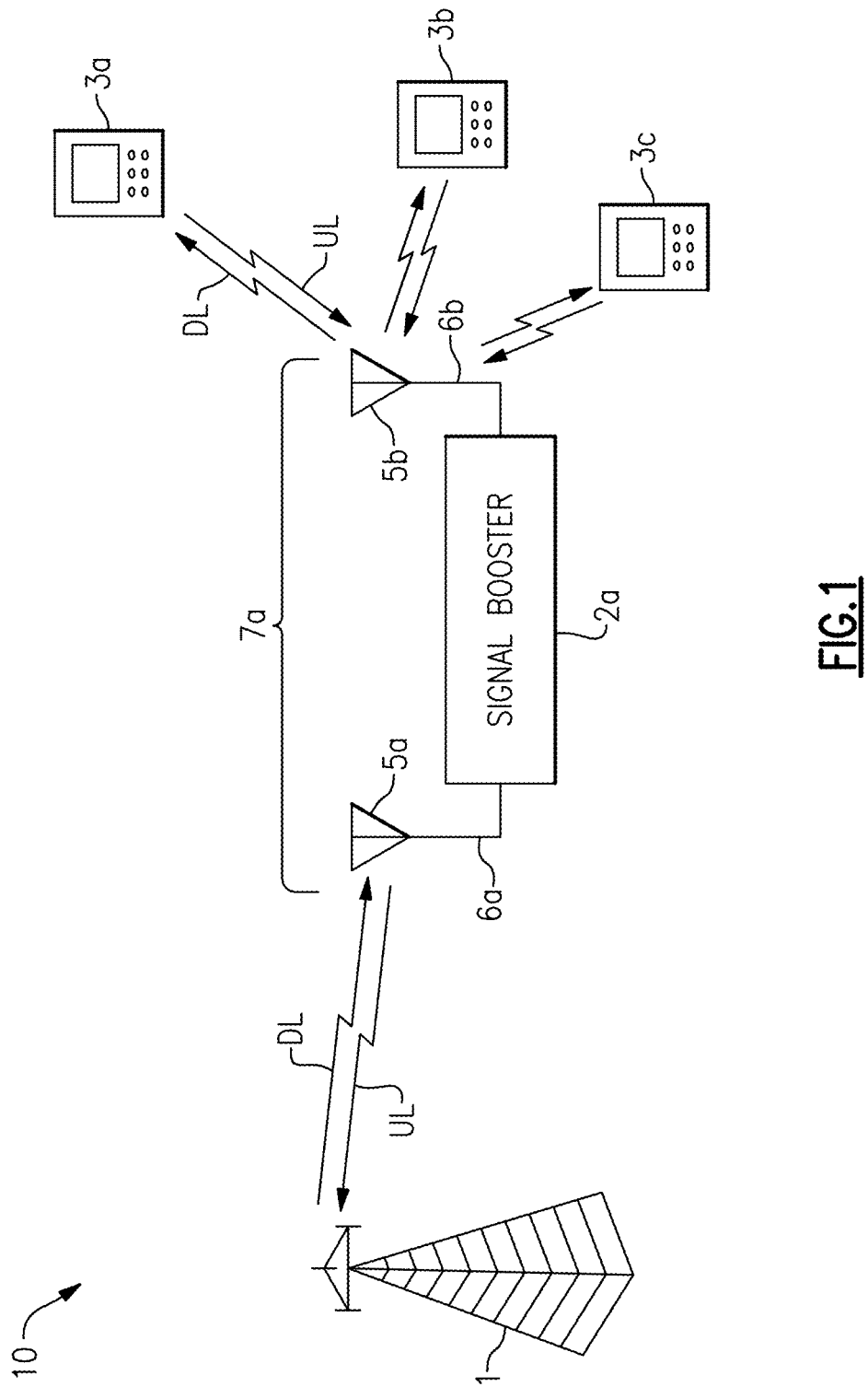
FIG. 1 is a schematic diagram of one example of a mobile network.

FIG. 1 is a schematic diagram of one example of a mobile network 10. The mobile network 10 includes a base station 1, mobile devices 3a-3c, and a signal booster system 7a that includes a base station antenna 5a, a base station antenna cable 6a, a signal booster 2a, a mobile station antenna cable 6b, and a mobile station antenna 5b.

Although the mobile network 10 illustrates an example with three mobile devices and one base station, the mobile network 10 can include base stations and/or mobile devices of other numbers and/or types. For instance, mobile devices can include mobile phones, tablets, laptops, wearable electronics (for instance, smart watches), and/or other types of user equipment (UE) suitable for use in a wireless communication network.

In the context of signal boosters for vehicles, the signal booster system 7a is included, embedded, or otherwise integrated in a vehicle, such as a land vehicle, a watercraft, or an aircraft. As used herein, land vehicles include not only road vehicles, such as cars, trucks, sport utility vehicles (SUVs), vans and buses, but also other types of vehicles that operate on land, such as trains.

The signal booster 2a can retransmit signals to and receive signals from the base station 1 using the base station antenna 5a, and can retransmit signals to and receive signals from the mobile devices 3a-3c using the mobile station antenna 5b. For example, the signal booster 2a can retransmit signals to the base station 1 over one or more uplink channels, and can receive signals from the base station 1 over one or more downlink channels. Additionally, the signal booster 2a can retransmit signals to the mobiles devices 3a-3c over one or more downlink channels, and can receive signals from the devices over one or more uplink channels.

In the example shown in FIG. 1, the signal booster 2a is electrically coupled to the base station antenna 5a via the base station antenna cable 6a and to the mobile station antenna 5b via the mobile station antenna cable 6b. However, other implementations are possible. For example, various embodiments herein can include one or more cables and/or antennas integrated into a signal booster. For example, integrating a base station antenna into a signal booster can reduce signal loss and/or improve system sensitivity.

In certain configurations, the base station antenna 5a is positioned or directed external to a vehicle, and the mobile station antenna 5b is inside the vehicle and operable to communicate with devices within a passenger compartment of the vehicle.

As a vehicle including the signal booster system 7a moves and/or as a network environment changes, the signal booster 2a can communicate with different base stations. Thus, it will be understood that base station 1 represents a particular base station or group of base stations that the signal booster 2a is in communication with at a particular time.

Thus, although FIG. 1 illustrates the signal booster 2a as communicating with one base station 1, the signal booster 2a can communicate with multiple base stations. For example, the signal booster 2a can be used to communicate with base stations associated with different cells of a network and/or with base stations associated with different networks, such as networks associated with different wireless carriers and/or frequency bands.

In certain implementations, the mobile devices 3a-3c can communicate at least in part over multiple frequency bands, including one or more cellular bands such as, Band II, Band IV, Band V, Band XII, and/or Band XIII For instance, in one example, the first mobile device 3a can operate using Advanced Wireless Services (AWS) (Band IV), the second mobile device 3b can operate using Personal Communication Services (PCS) (Band II), and the third mobile device 3c can operate using Cellular (for example, 800 MHz in the United States) services (Band V). Furthermore, in certain configurations, all or a subset of the mobile devices 3a-3c can communicate using Long Term Evolution (LTE), and may transmit and receive Band XII signals, Band XIII signals, and/or other signals associated with LTE. The teachings herein are also applicable to communications using carrier aggregation, including those associated with 4.5G, 5G technologies, and other emerging mobile communication technologies.

Although specific examples of frequency bands and communication technologies have been described above, the teachings herein are applicable to a wide range of frequency bands and communications standards. For example, signal boosters can be used to boost a wide variety of bands, including, but not limited to, 3G bands, 4G bands, 5G bands, Wi-Fi bands (for example, according to Institute of Electrical and Electronics Engineers 802.11 wireless communication standards), and/or digital television bands (for example, according to Digital Video Broadcasting, Advanced Television System Committee, Integrated Services Digital Broadcasting, Digital Terrestrial Multimedia Broadcasting, and Digital Multimedia Broadcasting standards).

Accordingly, the signal booster 2a can be configured to boost signals associated with multiple frequency bands so as to improve network reception for each of the mobile devices 3a-3c. Configuring the signal booster 2a to service multiple frequency bands can improve network signal strength and/or overcome loss arising from a vehicle body, which can be made of or include metal. For example, the signal booster 2a can improve network signal strength of devices using the same or different frequency bands, the same or different wireless carriers, and/or the same or different wireless technologies. Configuring the signal booster 2a as a multi-band booster can avoid the cost of separate signal boosters for each specific frequency band and/or wireless carrier. Additionally, configuring the signal booster 2a as a multi-band booster can also ease installation, reduce cabling, and/or issues associated with combining multiple boosters.

Examples of Vehicle Signal Booster Systems

As discussed above, in various embodiments, the signal booster system 7a can be integrated into a vehicle, such as an automobile, train, boat, aircraft, etc.

In certain implementations, the signal booster system 7a can be integrated into an automobile's electronic system, which can include GPS, audio systems, and various other systems. Thus, the signal booster's power subsystem can be integrated into the automobile's power system, and the signal booster's antenna subsystem can be integrated into the automobile's antenna system. In other implementations, the signal booster system 7a can be included as a stand-alone system that operates from the vehicle's power source.

Typically, the bodies of such vehicles (for instance, automobile frames or bodies) are made of or include metal. Furthermore, even vehicle windows or window membranes can include metal components (for example, impact-resistant membranes, resistive heater elements for defrosting, and/or radio antenna traces). The vehicle body, including a metal frame and window components can have a shielding effect on signals transmitted and received by the vehicle signal booster system, and thus interfere with the transmission and/or reception of signals.

The shielding effect of vehicle components can attenuate downlink signals from the base station within the vehicle and/or attenuate uplink signals transmitted from within the vehicle. Under most conditions, the shielding effect can cause signal strength to drop. In one example, the shielding effect reduces signal strength below a threshold for cellular communication, thereby preventing successful voice and/or data communication. In another example, mobile devices operate with higher transmit power to compensate for a loss in signal strength from shielding, and thus operate with greater power consumption and reduced battery life. In yet another example, the mobile device operates with lower signal quality, and thus lower data rate and/or lower voice quality.

Implementation of the signal booster system 7a in this vehicular context can advantageously improve both downlink signal strength and uplink signal strength of mobile devices within the vehicle. Furthermore, including a signal booster system in a vehicle also improves signal-to-noise ratio (SNR) of the mobile devices, thereby permitting mobile devices to transmit at a lower power level to extend battery life. For example, higher SNR can be realized by using superior antennas relative to those used in typical mobile phones, for instance, due to relaxed size and/or power constrains. Furthermore, signal boosters can operate with better receivers and/or transmitters relative to mobile devices.

To integrate the signal booster system 7a of FIG. 1 into a vehicle, the signal booster 2a can be placed inside the passenger compartment or trunk of the vehicle, the mobile station antenna 5b can be placed in the passenger compartment, and the base station antenna 5a can be placed near an exterior of the vehicle, such as mounted on or near the roof or back window.

However, in such implementations, a length of the base station antenna cable 6a can be up to several meters long, resulting in significant cable loss (for example, 7-8 dB or more). Such cable loss can reduce SNR, reduce transmit power, reducing receivier sensitivity, affect the quality of communications between the base station 1 and the mobile devices 3a-3c, reduce a battery life of the mobile devices 3a-3b by requiring a higher transmit power of the devices, and/or reduce a number of mobile devices that can be supported by the signal booster system. Furthermore, cable loss is frequency dependent, and thus can become very significant as cellular communication frequencies increase, for instance, in 5G technologies associated with frequencies in the 6 GHz to 100 GHz frequency range.

In various embodiments herein, the aforementioned disadvantages can be alleviated by integrating a base station antenna within a threshold distance to a signal booster and/or housed within the signal booster.

In one example, the base station antenna is within the housing of the signal booster. In another example, the base station antenna is connected to the base station antenna by a cable of relatively short length, for instance, a length in the range of about 1 cm to about 20 cm.

The signal booster (which in certain implementations includes an integrated base station antenna) can be positioned in a wide variety of locations, including, but not limited to, at the top of the vehicle (for instance, attached to a roof of the vehicle and/or integrated inside a vehicle roof or roof fin) or near a window of the vehicle. For example, positioning a signal booster near a top, middle, or otherwise proximate to a rear window can be desirable since a corresponding antenna radiation pattern can be relatively more horizontal as compared to communications from a car roof, which can function as a reflector. Also a rear window may be the largest window, and have less metal parts for interference with a radiation pattern.

In certain implementations, a length of any cable between the base station antenna and signal booster circuitry is short enough to not significantly impact the booster system's performance. In one example, cable length is sufficiently short to impact transmit power by less than 1 dB and receiver sensitivity by less than 1 dB.

In certain configurations, the signal booster is connected to a mobile station antenna via a cable, and the mobile station antenna is positioned in an interior of the vehicle. For example, a vehicle interior mount can include an integrated mobile station antenna, and the vehicle interior mount can be placed inside of a vehicle, such as on a dashboard, console, or vent.

In other configurations, the mobile station antenna is integrated in the signal booster. For example, a signal booster can be included in a roof of a vehicle, with the base station antenna and the mobile station antenna isolated at least in part from one another by the vehicle's roof.

Accordingly, in certain implementations herein, metal components of a vehicle are advantageously used to provide shielding or isolation between a base station antenna and a mobile station antenna. For example, a vehicle's roof can serve as a perfect or near perfect reflector or isolator for providing antenna-to-antenna isolation.

When the car's body provides sufficient isolation, for instance, 40 dB or more, cables may not be needed for separating a base station antenna and a mobile station antenna. Rather, shielding in the range of 40 to 50 dB separation may provide sufficient antenna-to-antenna spate for a signal booster operating in a car. Currently maximum gain for mobile booster is 50 dB, defined and limited by FCC regulation. (Need a claim here of cable less signal booster.)

The vehicle signal booster systems herein can receive power in a variety of ways. In certain implementations, a vehicle interior mount with an integrated mobile station antenna receives DC power from a vehicle's power source (for instance, from an outlet of vehicle, a vehicle battery, and/or directly from an alternator). Additionally, the vehicle can provide the signal booster with a DC supply voltage over a shared DC power and RF cable, for instance, a coaxial cable. For example, the shared DC power and RF cable can include a conductor including an RF voltage superimposed on a DC supply voltage. Implementing the vehicle signal booster system in this manner provides a number of advantages, such as reduced cable cost. In such implementations, the signal booster can include a DC power and RF processing circuit for isolating and separating DC versus RF, thereby powering the signal booster's circuitry using the DC supply voltage received from the cable and handling RF signals transmitted and received over the same cable.

Figure 2:
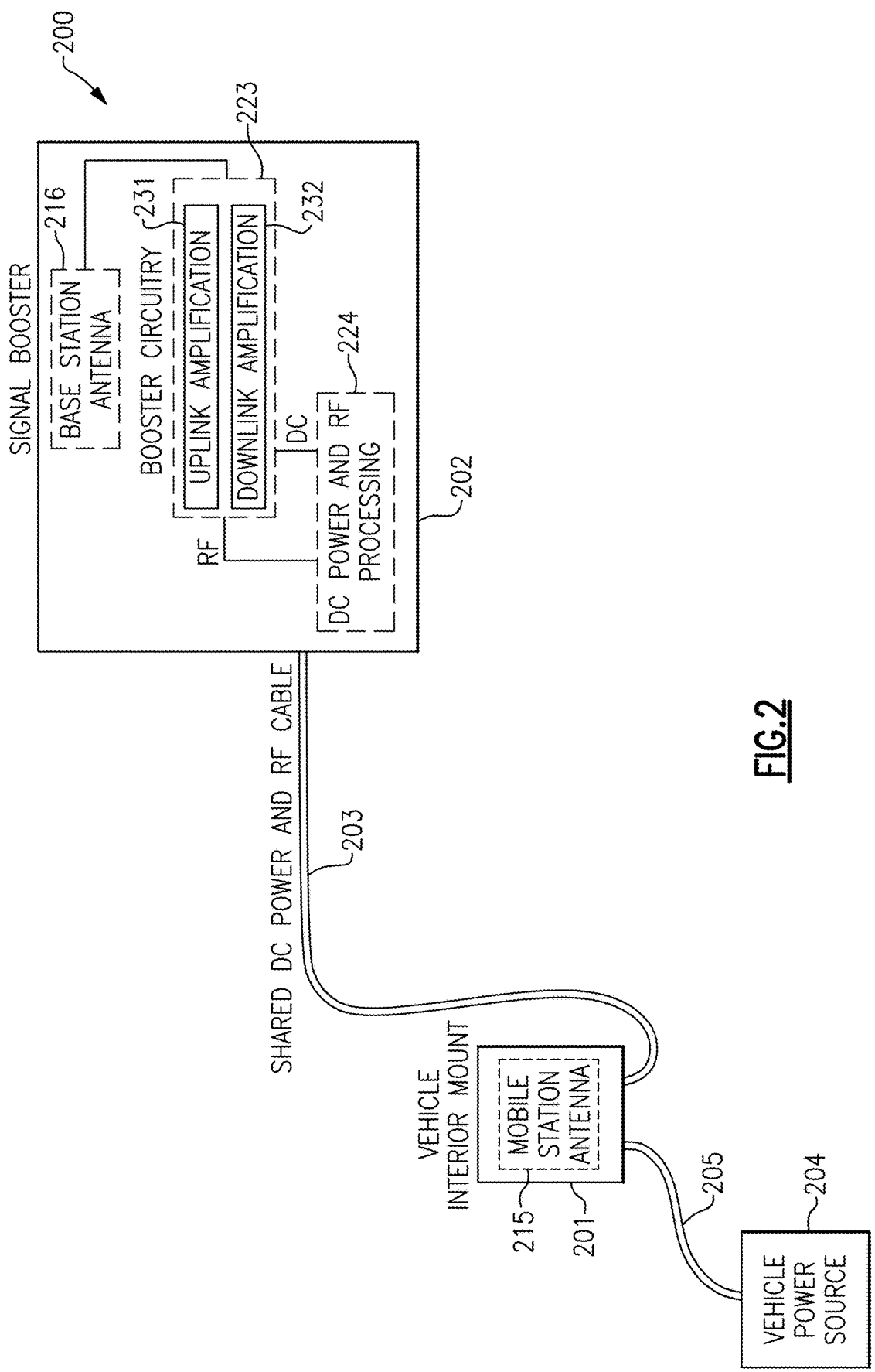
FIG. 2 is a schematic diagram of a vehicle signal booster system according to one embodiment.

FIG. 2 is a schematic diagram of a vehicle signal booster system 200 according to one embodiment. The vehicle signal booster system 200 includes a vehicle interior mount 201, a signal booster 202, and a shared DC power and RF cable 203. In the illustrated embodiment, the vehicle interior mount 201 includes a mobile station antenna 215. In certain implementations, the mobile station antenna 215 is integrated with or located within the mount 201. Additionally, the signal booster 202 includes a base station antenna 216, which is integrated with or located within the signal booster 202, in this embodiment. In another embodiment, the base station antenna 216 is within a threshold distance of the signal booster 202, for example, within 20 cm. In yet another embodiment, the base station antenna 216 is connected to the signal booster 202 by a cable that provides less than 1 dB of loss at the highest signal frequency of interest. The signal booster 202 further includes booster circuitry 223 and a DC power and RF processing circuit 224, which in certain implementations are included on a circuit board within the signal booster 202.

The vehicle interior mount 201 can be attached to any suitable location in an interior of the vehicle. In one example, the vehicle interior mount 201 is attachable to an interior surface of the vehicle, such as a dashboard, console, seat, and/or vent. In another example, the vehicle interior mount 201 is attachable to a vehicle roof and radiates signals downward. In yet another example, the vehicle interior mount 201 is integrated into an interior of a vehicle during manufacturing.

In the illustrated embodiment, the vehicle interior mount 201 receives power from a vehicle power source 204 via a power cable 205. In certain implementations, one end of the power cable 205 includes a plug, such as a USB smart plug or cigarette lighter plug, which is insertable into a vehicle accessory outlet or socket. In one example, the vehicle interior mount 201 receives DC power, for instance about 12 VDC, from the vehicle accessory outlet. Although an implementation with a pluggable power cable is shown, other configurations are possible. In one example, the power cable includes open end twist power wires to be fixed on vehicle battery or other vehicle power source.

In another embodiment, a power cable is provided directly to the signal booster 202.

The vehicle interior mount 201 provides a DC supply voltage to the signal booster 202 via the shared DC power and RF cable 203. In certain implementations, the vehicle interior mount 201 includes circuitry for combining a DC power supply and an RF signal, while providing isolation. Furthermore, in certain implementations the vehicle interior mount 201 includes circuitry operable to filter and/or regulate DC power received from the vehicle power source 204 to generate the DC supply voltage for the shared DC power and RF cable 203. In another implementation, the DC supply voltage provided over the shared DC power and RF cable 203 corresponds to a DC voltage received from the vehicle power supply 204 without filtering or regulation.

The shared DC power and RF cable 203 is also used to carry RF signals, such as RF signals sent for transmission on the mobile station antenna 201 and RF signals received by the mobile station antenna 215. In certain implementations, the shared DC power and RF cable 203 includes a conductor that carries an RF voltage that is superimposed on a DC supply voltage. Implementing a vehicle signal booster system with a shared DC power and RF cable can provide a number of advantages, such as reduced cabling cost, reduced connectors/connections, improved reliability, and/or enhanced integration.

The signal booster 202 includes the DC power and RF processing circuit 224, which handles signaling over the shared DC power and RF cable 203. For example, the DC power and RF processing circuit 224 can provide filtering and/or other extraction of a DC supply voltage from the shared DC power and RF cable 203, and use the DC supply voltage to power the booster circuitry 223. Additionally, the DC power and RF processing circuit 224 also handles transmission and reception of RF signals by the signal booster 202 over the cable 203.

In certain implementations, the DC power and RF processing circuit 224 includes isolation circuitry (for instance, filters and/or other isolators) for isolating RF circuitry used for signal boosting from DC supply noise and separation circuitry for separating RF and DC.

In the illustrated embodiment, the booster circuitry 223 receives RF uplink signals received from the mobile station antenna 215 via the shared DC power and RF cable 203. The RF uplink signals are amplified by an uplink amplification circuit 231 of the booster circuitry 223, and subsequently transmitted on the base station antenna 216. The base station antenna 216 also receives RF downlink signals, which are amplified by a downlink amplification circuit 232 of the booster circuitry 223, and subsequently transmitted to the mobile station antenna 215 via the shared DC power and RF cable 203.

In certain configurations, the vehicle signal booster system 200 further include a cable for charging a battery of a user's mobile device. In one example, a charging cable is provided from the vehicle interior mount 201. In another example, a charging cable is provided from the signal booster 202.

Figure 3A:
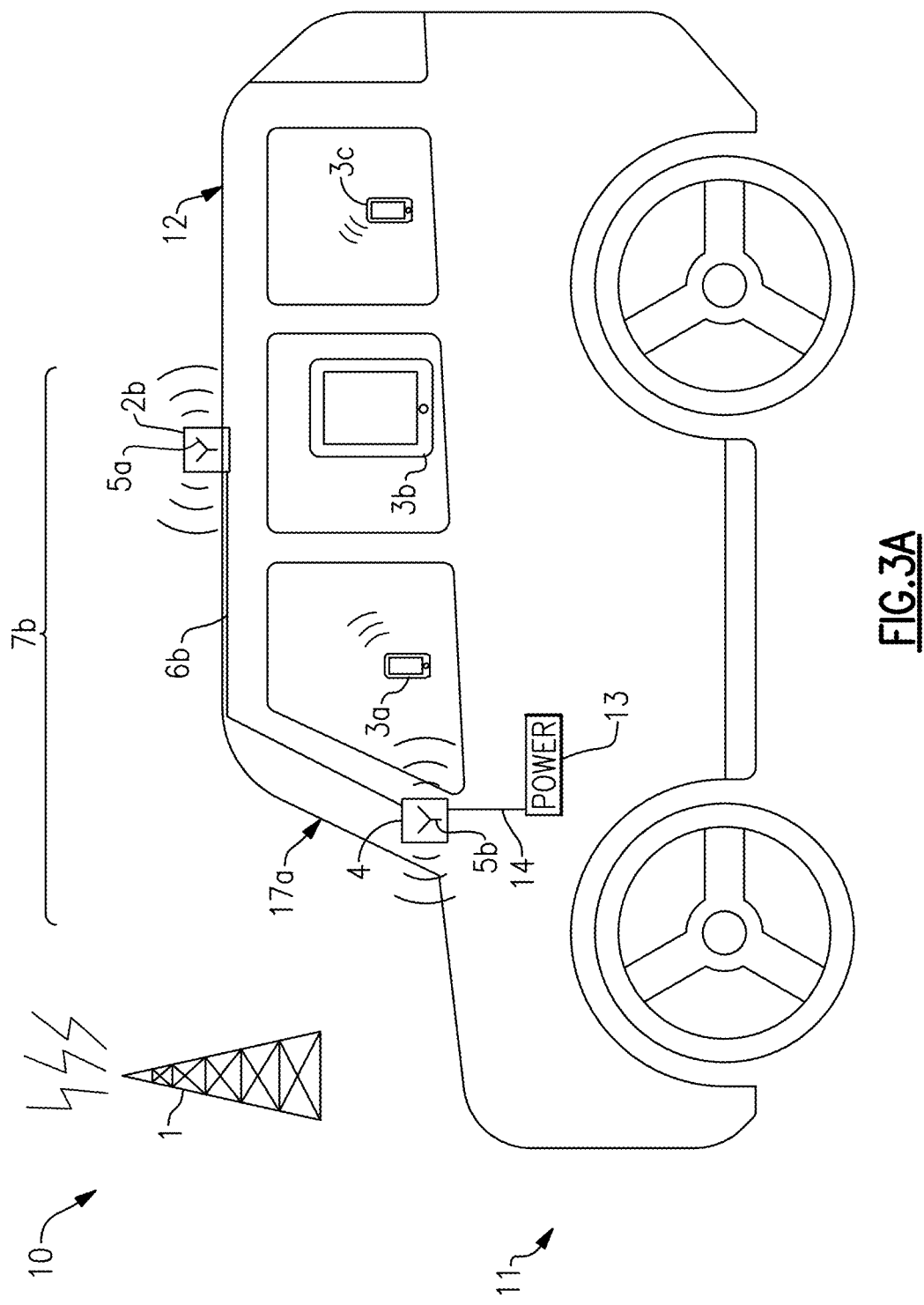
FIGS. 3A-3C are schematic diagrams of the mobile network of FIG. 1 according to various vehicular embodiments.
Figure 3B:
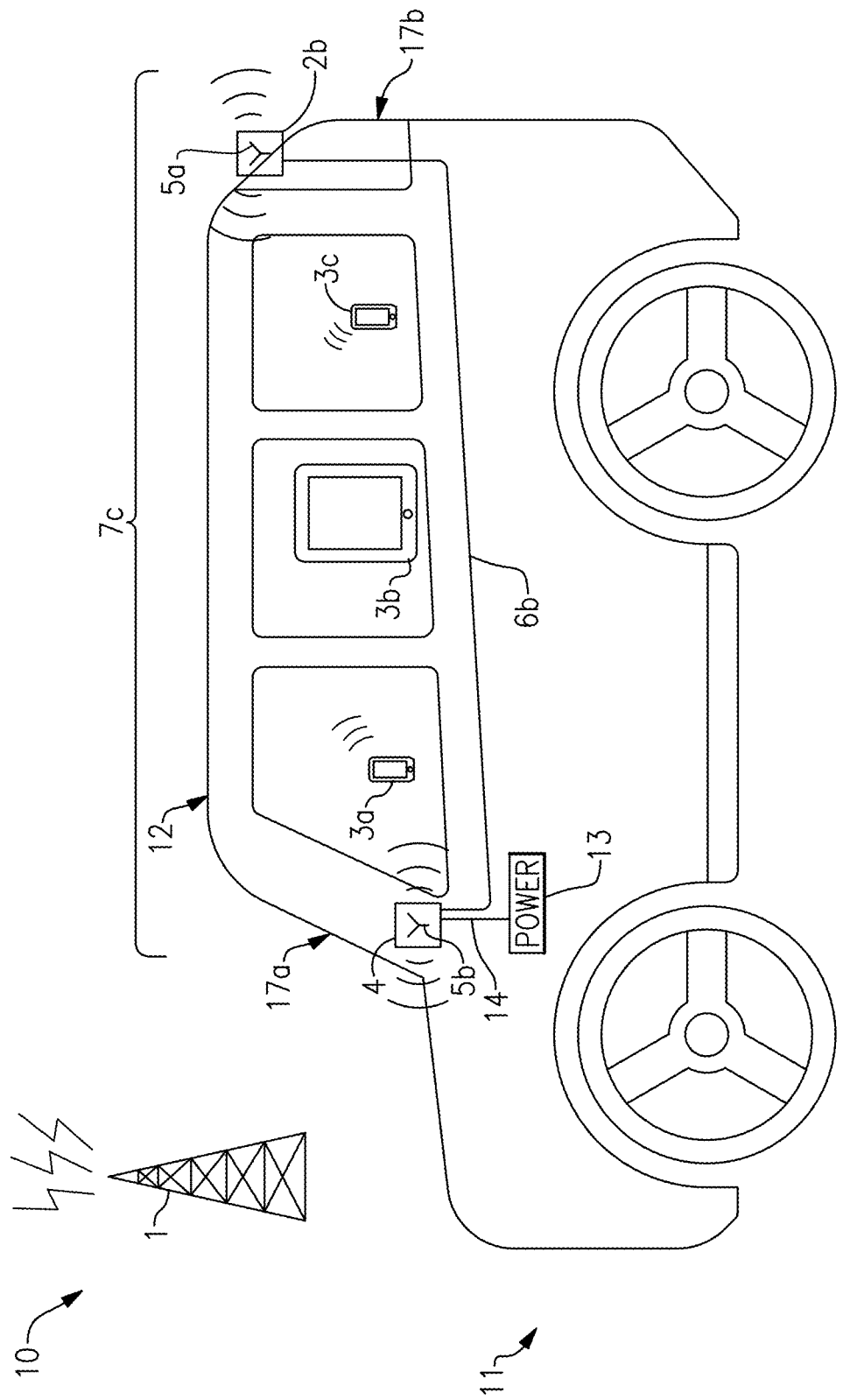
Figure 3C:
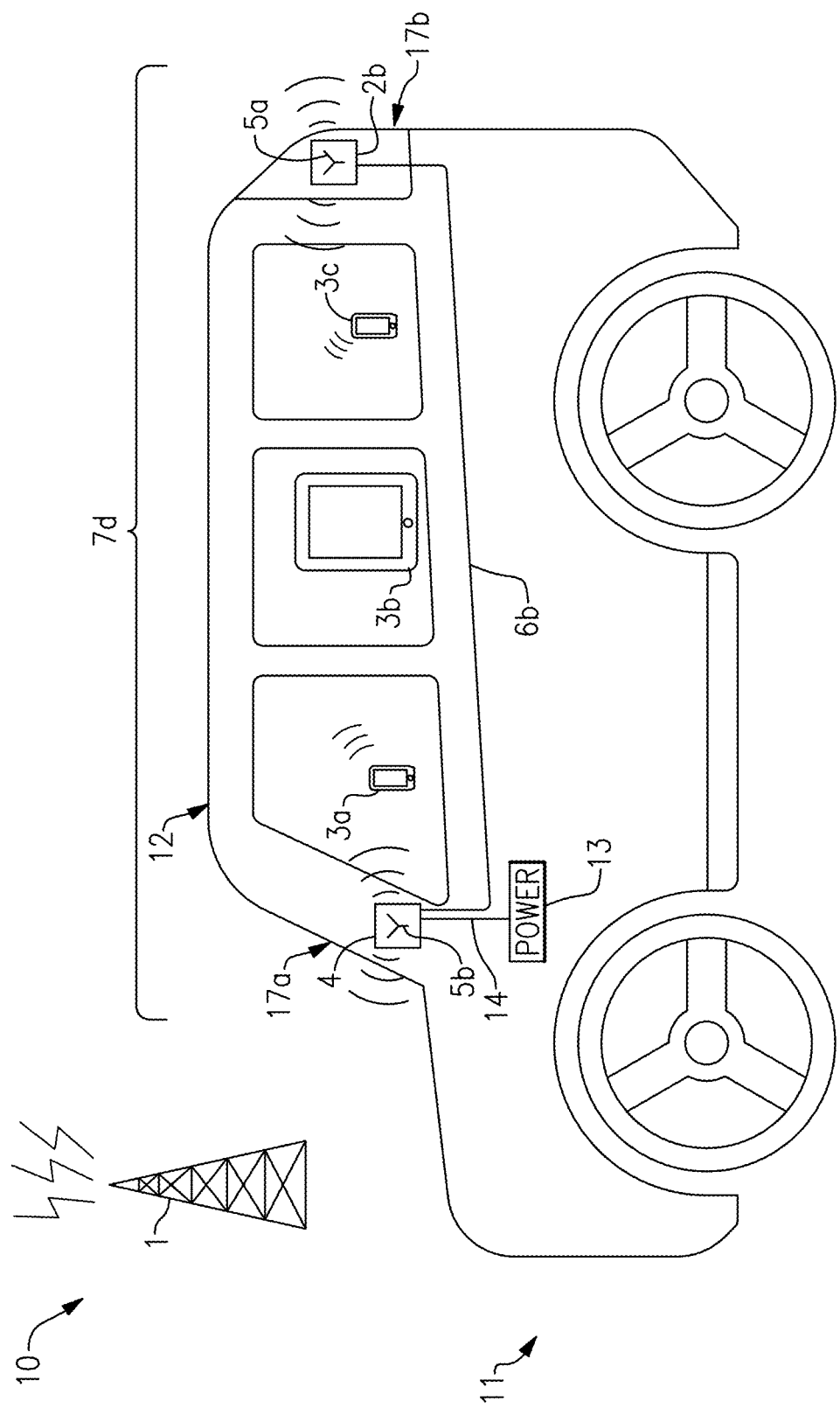

FIGS. 3A-3C are schematic diagrams of the mobile network of FIG. 1 according to various vehicular embodiments.

FIG. 3A is a schematic diagram of the mobile network 10, according to one vehicular embodiment. The mobile network 10 includes the base station 1, a signal booster system 7b, and the plurality of mobile devices 3a-3c (three shown). The signal booster system 7b includes a signal booster 2b, a vehicle interior mount 4, and a mobile station antenna cable 6b. The signal booster 2b includes an integrated base station antenna 5a, and the vehicle mount 4 includes an integrated mobile station antenna 5b.

In the illustrated embodiment, the signal booster 2b including the integrated base station antenna 5a is mounted on a roof 12 of vehicle 11. The signal booster 2b can be attached to the roof 12 in a variety of ways, such as using fasteners and/or adhesives. In certain implementations, the signal booster's housing is enclosed in a roof fin and/or the housing is shaped as a fin to enhance aesthetics. Furthermore, the signal booster's housing can also be integrated as part of the roof or another portion of a vehicle structure or body.

Although FIG. 3A illustrates an example in which the signal booster is attached to a top of the roof 12, the teachings are applicable to configuration in which a signal booster is integrated into the roof 12. In one example, a portion of the signal booster 2b that includes the base station antenna 5a protrudes from the roof 12, but a second portion of the signal booster (for instance a portion including booster circuitry and/or other components) is integrated into or internal to the roof 12. For instance, the signal booster can be integrated into the roof during vehicle manufacture.

The illustrated base station antenna 5a is subject to shielding effects from metal and/or other components of the roof 12, which provides enhanced antenna-to-antenna isolation but also higher loss. In certain implementations, the base station antenna 5a is an omnidirectional antenna operable to transmit and receive signals a full 360 degrees around a perimeter of a vehicle such that the antenna 5a radiates primarily in the horizontal plane in which the vehicle moves.

The vehicle interior mount 4 including the mobile station antenna 5b is remote from the signal booster 2b and can be mounted in a wide variety of ways, for example, on a dashboard adjacent to a front windshield 17a as shown in FIG. 3A. However, the vehicle interior mount 4 can be mounted elsewhere in or around the interior of the vehicle 11. In another embodiment, the vehicle interior mount 4 can be omitted in favor of a mobile station antenna that is not integrated or within a vehicle interior mount.

In certain implementations, the signal booster 2b can include an isolator configured to provide isolation between the base station antenna 5a and the mobile station antenna 5b. In certain implementations, the mobile station antenna 5b is an omnidirectional or directional antenna configured to primarily radiate within the passenger compartment (including, but not limited to, a driver compartment) of the vehicle 11. Thus, the mobile station antenna 5b can communicate with any passenger or driver.

As shown in FIG. 3A, the vehicle interior mount 4 receives power from a vehicle power source 13 over a power cable 14. In certain implementations, the mobile station antenna cable 6b corresponds to a shared DC power and RF cable used both for communicating RF signals between the mobile station antenna 5b and the signal booster 2b and for providing the signal booster 2b with a DC supply voltage.

The signal booster system 7b can be implemented using any suitable combination of features disclosed herein.

In one example, the signal booster 2b, the cable 6b, and/or the vehicle interior mount 4 are implemented in accordance with one or more features of the vehicle signal booster system 200 of FIG. 2. In another example, the signal booster 2b, the cable 6b, and/or the vehicle interior mount 4 are implemented in accordance with one or more features of FIGS. 4B-11B and/or 14A-15.

FIG. 3B is a schematic diagram of the mobile network 10, according to another vehicular embodiment. The mobile network 10 includes the base station 1, a signal booster system 7c, and the plurality of mobile devices 3a-3c (three shown). The signal booster system 7c includes a signal booster 2b, a vehicle interior mount 4, and an antenna cable 6b.

The signal booster system 7c of FIG. 3B is similar to the signal booster system 7b of FIG. 3A, except for the illustrated positioning of the signal booster 2b.

In the illustrated embodiment, the signal booster 2b including the integrated base station antenna 5a is mounted on the rear window or windshield 17b of the vehicle 11. The signal booster 2b is mounted externally to the vehicle in this example, but the teachings herein are also applicable to configurations in which the signal booster 2b is internal to the vehicle. In one example, the signal booster 2b is located in an upper portion of rear windshield 17b adjacent to roof 12. In such an implementation, the signal booster 2b may not obstruct a driver's view through rear windshield 17b, but also experiences shielding effects from metal components of the roof 12. In certain implementations, the base station antenna 5a is a directional antenna is operable primarily radiate out a window 17b of the vehicle 11. However, an antenna that radiates either omni-directionally or 360 degrees in a horizontal plane can provide enhanced communications with base stations as a vehicle changes directions.

The vehicle interior mount 4 including the mobile station antenna 5b is remote from the signal booster 2b and mounted elsewhere. For instance, in the illustrated example, the vehicle interior mount 4 is attached on or near the front windshield 17a or dashboard. In other examples, vehicle interior mount 4 can be mounted anywhere else in or around the vehicle.

FIG. 3C is a schematic diagram of the mobile network 10, according to another vehicular embodiment. The mobile network 10 includes the base station 1, a signal booster system 7d, and the plurality of mobile devices 3a-3c (three shown). The signal booster system 7d includes a signal booster 2b, a vehicle interior mount 4, and an antenna cable 6b.

The signal booster system 7d of FIG. 3C is similar to the signal booster system 7c of FIG. 3B, except for the positioning of the signal booster 2b including the integrated base station antenna 5a.

In the illustrated embodiment, the signal booster 2b is mounted on the rear window 17b of vehicle 11 and inside of the vehicle 11. In one example, the signal booster 2b is located in an upper portion or lower portion of rear windshield 17b to provide enhanced driver visibility through a center of the rear window 17b. In another example, the signal booster 2b is located in a middle portion of rear windshield 17b to reduce loss from shielding effects from metal components of the vehicle's roof and frame.

Although FIGS. 3A-3C illustrate the mobile station antenna 5b housed within the mount 4, other implementations are possible, such as implementations in which the mobile station antenna 5b is not housed and implementations in which the mobile station antenna is separated from the mount by space to provide distance for wirelessly communicating with a mobile device secured to the mount.

Figure 4A:
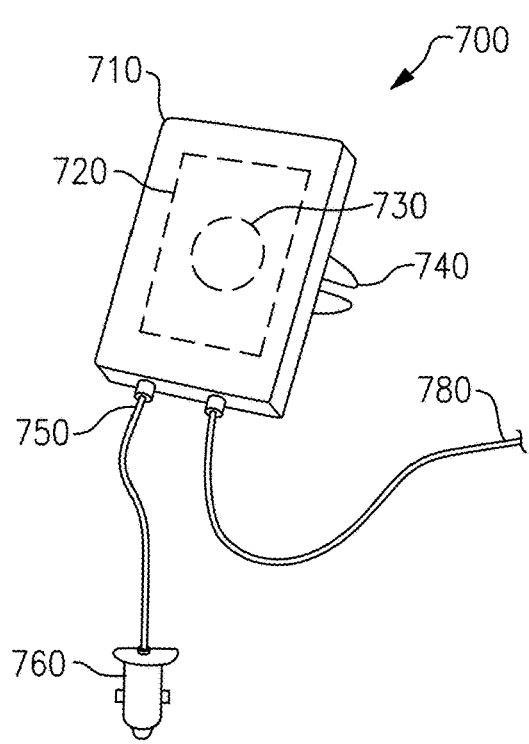
FIG. 4A is a front perspective view of one embodiment of a vehicle interior mount including a mobile station antenna.
Figure 4B:
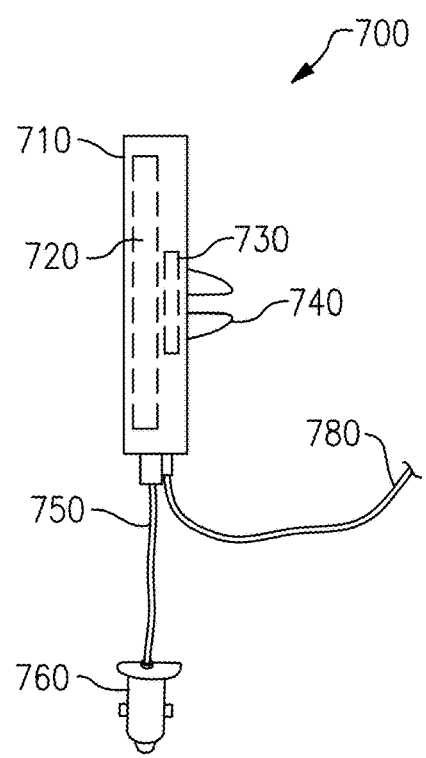
FIG. 4B is a side view of the vehicle interior mount of FIG. 4A.

FIG. 4A is a front perspective view of one embodiment of a vehicle interior mount 700. FIG. 4B is a side view of the vehicle interior mount 700 of FIG. 4A. The vehicle interior mount 700 illustrates one embodiment of the vehicle interior mount of FIGS. 2-3C. However, other implementations of vehicle interior mounts are possible.

The vehicle interior mount 700 includes a housing 710 including a mobile station antenna 720 and a magnet 730 therein. The vehicle interior mount 700 further includes ventilation grips 740 extending from the housing 710, a shared DC power and RF cable 780, and a power cable 750.

In certain implementations, the housing 710 includes plastic and/or a rubber suitable for securely holding a mobile device. Additionally, the magnet 730 provides a magnetic field that attracts a magnetic material attached or adhere to or embedded in a mobile device, thereby allowing a user to securely suspend the mobile device to the vehicle interior mount 700 for display and/or use hands free.

For example, the mobile device can include a metal or other ferromagnetic material that is magnetically attracted to the magnet 730. In certain implementations, the ferromagnetic material is an explicit structure designed into the mobile device for purposes of securely suspending a mobile device to a magnet for display, communications, and/or wireless charging. In other implementations, the ferromagnetic material corresponds to various components and structures of the mobile design that are attracted to the magnet 730.

In one embodiment, the vehicle interior mount 700 is integrated into a vehicle during manufacture. For example, one or more integrated magnetic structures can be included in a vehicle for securely suspending mobile devices thereto. In certain implementations, the integrated magnetic structures can also provide communications and/or wireless charging.

In certain configurations, the mobile station antenna 720 communicates with a mobile device that is suspended to the vehicle interior mount 700 using near-field communications, which can also be referred to herein as touched communications or direct coupling communications.

With continuing reference to FIGS. 4A-4B, ventilation grip 740 is used to secure the vehicle interior mount 700 to a vehicle's air vent or ventilation grate. However, a vehicle interior mount can be mounted or secured in other ways. In one embodiment, a vehicle interior mount includes multiple user-selectable fasteners (for instance, a ventilation grip, a suction cup, and/or other fasteners) which are attachable and detachable from the vehicle interior mount to permit a user to select a desired type of fastener.

The mobile station antenna 720 is used to communicate with mobile devices in a passenger compartment of a vehicle. Furthermore, when a mobile device is attached to the vehicle interior mount 700 via the magnet 730, a communication distance is relatively small, which in turn can lead to lower interference, higher signal integrity, and/or reduced transmit power.

The power cable 750 includes a plug 760 for insertion in a vehicle power source, corresponding to a cigarette lighter plug, in this example. The power cable 750 provides power to the vehicle interior mount 700 in implementations in which the vehicle interior mount 700 includes externally powered circuitry. The vehicle interior mount 700 provides a DC supply voltage to the shared DC power and RF cable 780, which is used to power a signal booster. RF signals transmitted and received by the mobile station antenna 720 are also provided over the shared DC power and RF cable 780, in this embodiment.

Figure 4C:
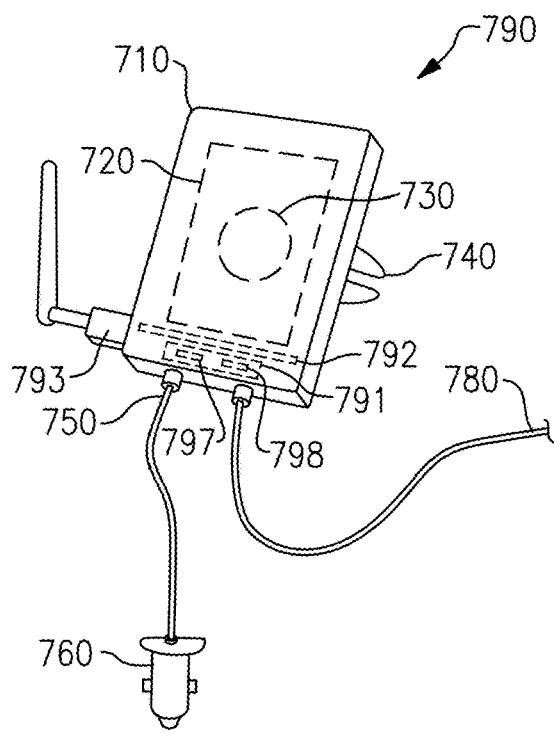
FIG. 4C is a front perspective view of another embodiment of a vehicle interior mount including a mobile station antenna.

FIG. 4C is a front perspective view of another embodiment of a vehicle interior mount 790. The vehicle interior mount 790 of FIG. 4C is similar to the vehicle interior mount 700 of FIGS. 4A-4B, except that the vehicle interior mount 790 further includes a circuit board 791 and RF shield 792 in the housing 710, and includes a port that receives an insertable adapter 793.

The insertable adapter 793 can correspond to a wide variety of adapters, such as a cellular modem (for instance, a 3G/4G modem), a Wi-Fi dongle, an insertable antenna, etc. The port can be implemented in a variety of ways, for instance via USB or another interface. With a cellular modem or Wi-Fi dongle, a cellular signal can be boosted first then transformed into Wi-Fi, through air or conducted. Accordingly, both cellular and Wi-Fi signal service can then be provided over the air at the same time to occupants of the vehicle.

Implementing the vehicle interior mount 790 to include a port for receiving an adapter provides a number of advantages. In one example, a cellular modem can be provided for providing mobile devices in the vehicle with Wi-Fi access. In another example, an antenna can be attached to provide robust communication with one or more mobile devices, for instance, when a mobile device is attached to the mount via the magnet 730.

In the illustrated embodiment, the circuit board 791 includes a router 797, such as a Wi-Fi router. The router 797 is connected to insertable adapter 793 via the port, in this example. In another example, rather than using an insertable adapter 793, circuitry of the adapter (for instance, a cellular modem) can be integrated with or within the vehicle interior mount 790.

The circuit board 791 also includes a power management circuit 798, which can be used to regulate, filter, isolate, and/or otherwise manage power received from the power cable 750 to generate a DC supply voltage for the shared DC power and RF cable 780. The power management circuit 798 can also include circuitry for combining RF and DC while providing isolation. For example, the power management circuit 798 can be used to superimpose an RF signal onto the DC supply voltage.

In the illustrated embodiment, the RF shield 792 is interposed between the mobile station antenna 720 and the circuit board 791. The RF shield 792 can provide a number of advantages, such as helping to prevent operation of the circuit board 791 from interfering with RF communications of the mobile station antenna 720.

In one embodiment, a vehicle interior mount includes a width and a length of less than 15 cm and a thickness of less than 5 cm. However, other dimensions are possible.

FIG. 4D is a side view of another embodiment of a vehicle interior mount 794 including a mobile station antenna 720. The vehicle interior mount 794 of FIG. 4D is similar to the vehicle interior mount 700 of FIGS. 4A and 4B, except that the vehicle interior mount 794 illustrates an implementation in which the mobile station antenna 720 is positioned between the magnet 730 and the ventilation grips 740.

FIG. 4E is a side view of another embodiment of a vehicle interior mount 795 including a mobile station antenna 720. The vehicle interior mount 795 of FIG. 4E is similar to the vehicle interior mount 700 of FIGS. 4A and 4B, except that the vehicle interior mount 795 illustrates an implementation in which the mobile station antenna 720 includes a hole in which the magnet 730 is positioned. Implementing the vehicle interior mount 795 in this manner aids in securing a mobile device to the mount via magnetization while maintaining a robust wireless communication link with the mobile device. The vehicle interior mount 795 further includes fasteners 796 for securing the mobile station antenna 720 to the housing 710.

FIG. 4F is a plan view of one embodiment of a circuit board 786 for a vehicle interior mount. The circuit board 786 includes a patterned conductor 782 that is formed on a non-conductive layer 781. The patterned conductor 782 serves as a mobile station antenna. The circuit board 786 further includes a combining and isolation circuit 783, which serves to combine RF and DC for transmission over a shared DC power and RF cable.

Although various examples of vehicle interior mounts and structures therein have been discussed above with reference to FIGS. 4A-4F, other implementations are possible.

FIG. 5 is a perspective view of one example of a shared DC power and RF cable 500 for a vehicle signal booster system. In this example, the shared DC power and RF cable 500 is implemented as a coaxial cable including outside insulation 510, metal mesh conductor 520, interior insulation 530, and metal inner conductor 540.

The outside insulation 510 protects the coaxial cable from external friction, interference, or damage. The metal mesh conductor 520 aids in containing signal leakage from metal inner conductor 540 and also shields the signal transmitted on the metal inner conductor 540 from external electric and/or magnetic fields while serving as ground.

In the illustrated embodiment, the metal mesh conductor 520 carries a ground voltage to a signal booster, and the metal inner conductor 540 carries an RF voltage superimposed on a DC supply voltage. Thus, a common conductor carries both DC power and RF signals, in this embodiment.

The shared DC power and RF cable 500 illustrated one embodiment of a shared DC power and RF cable that can be used for carrying both RF signals and DC supply voltage to a signal booster. In another embodiment, a pair of separate cables are physically bundled together to carry RF and DC power, respectively. However, the teachings herein are application to other implementations of shared DC power and RF cables, as well as to signal booster systems that do not include a shared DC power and RF cable.

FIGS. 6A-6D illustrate various views of a signal booster 600 according to one embodiment. The signal booster 600 includes a housing including a first portion 610 and a second portion 650. The signal booster further includes a circuit board 620 and an antenna board 660 substantially parallel to circuit board 620 within the housing. Although an example with two boards is shown, in another embodiment a circuit board and antenna board are combined on a common board to save cost and space. In one embodiment, the boards are spaced apart by at least one-half an inch horizontally to enhance antenna radiation characteristics. As shown in FIGS. 6A-6D, the housing includes an opening for a cable port 630. In certain implementations, the cable port 630 receives a cable through which DC power is provided to the signal booster 600 and through which RF signals are communicated.

The signal booster 600 illustrates one embodiment of a signal booster including an integrated base station antenna. For example, the signal booster 600 can serve as the signal booster 202 of FIG. 2 and/or as the signal booster 2b of 3A-3C and 12E-12H. However, other implementations of signal boosters can be used in accordance with the teachings herein.

Figure 6D:
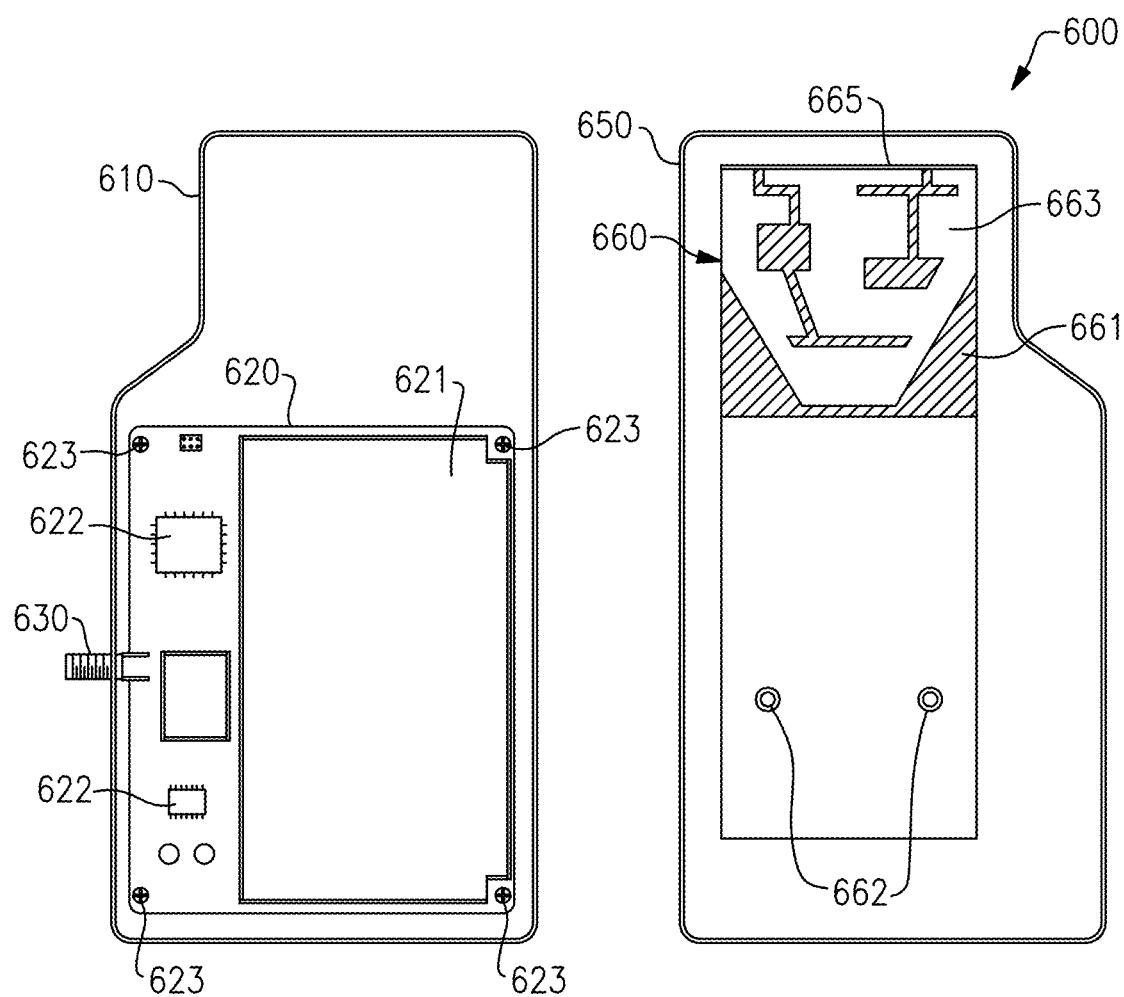
FIG. 6D is a side view of two portions of the signal booster of FIG. 6A when opened.

FIG. 6A is a perspective view of the signal booster 600. FIG. 6B is a perspective view of two portions 610, 650 of the signal booster 600. FIG. 6C is a side view of the signal booster 600. FIG. 6D is a side view of the two portions 610, 650 of the signal booster 600.

In the illustrated embodiment, the housing includes a circuit board 620 and an antenna board 660 therein. Additionally, the circuit board 620 is attached to the first portion 610 of the housing via fasteners 623, and the antenna board 660 is attached to the second portion 650 of the housing via fasteners 662, in this example. Although an example of a signal booster housing with two pieces is shown, the teachings herein are applicable to signal booster housings including more or fewer pieces.

In the illustrated embodiment, the circuit board 620 includes further comprises an RF shield over the booster circuitry, wherein the antenna board is substantially parallel to the circuit board, wherein a portion of the antenna board comprising the base station antenna extends beyond the RF shield The circuit board 620 can include a wide variety of electronics and components, including, but not limited to, signal booster circuitry, a heat sink for dissipating heat, and/or shielding structures. In the illustrated embodiment, the circuit board 620 includes booster circuitry enclosed by an RF shield or lid 621 and other electronic circuitry 622 that provides various functions. In one example, the other electronic circuitry 622 includes a control circuit (for instance, a MPU) for setting gain and/or attenuation values of the booster circuitry. In another example, the other electronic circuitry 622 includes a DC power and RF processing circuit for powering the signal booster circuitry using a DC supply voltage received from the cable port 630 and for handling RF signals transmitted and received over the cable port 630. In yet another example, the electronic circuitry 622 includes a signal processor (for instance, a MPU) that performs at least one of isolation dynamic testing, dynamic gain adaptation, or automatic selection of an operating band. In yet another example, the electronic circuitry 622 includes a detection circuit for detecting signal strength and a gain control circuit operable to automatically adjust a gain of a downlink amplifier and/or the uplink amplifier based on the detected signal strength.

In the illustrated embodiment, the antenna board 660 includes a base station antenna 663 formed as a conductors on a dielectric substrate 661.

When the signal booster 600 is closed, the base station antenna 663 extends beyond the RF shield 621, and serves to transmit and receive RF signals in a wide variety of directions, for instance, a full 360 degrees around a perimeter of a vehicle such that the antenna radiates primarily in the horizontal plane in which the vehicle moves. In certain implementations, the base station antenna 663 is implemented for omnidirectional communication. In one embodiment, the signal booster 600 is integrated in a roof of a vehicle, with the base station antenna 663 protruding from the roof's surface and at least a portion of the circuit board 620 internal to the roof. By implementing the booster in this manner, the base station antenna 663 is isolated from a mobile station antenna within the vehicle's passenger compartment at least in part by the vehicle's body.

In certain implementations, when the signal booster 600 is installed in a vehicle a top edge 665 of the base station antenna 663 is orientated parallel to an exterior surface of a vehicle (or vertical to the surface of the earth), for instance, within about 20 degrees.

In one embodiment, a signal booster includes a width and a length of less than 20 cm and a thickness of less than 5 cm. However, other dimensions are possible.

Figure 6E:
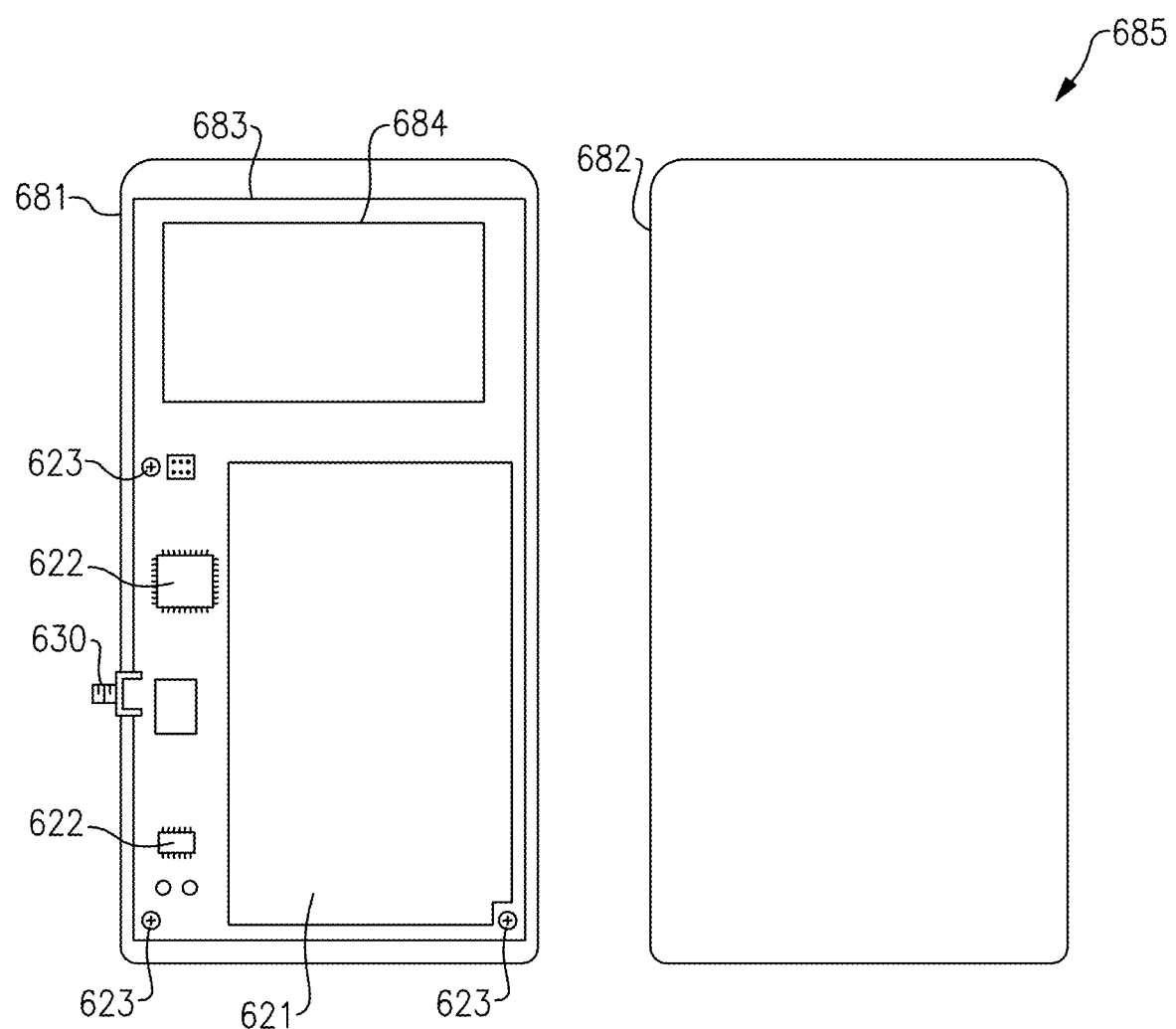
FIG. 6E is a side view of two portions of a signal booster when opened, according to another embodiment.

FIG. 6E is a side view of two portions of a signal booster 685 when opened, according to another embodiment. The signal booster 685 of FIG. 6E is similar to the signal booster 600 of FIGS. 6A-6D, except that the signal booster 685 includes a different shaped housing, and includes a circuit board 683 including both the signal booster's circuitry and a base station antenna 684.

Accordingly, rather than including a separate antenna board, the signal booster 685 illustrates an implementation in which the base station antenna 684 is on the circuit board 683 or part of the PCB itself.

Figure 6F:
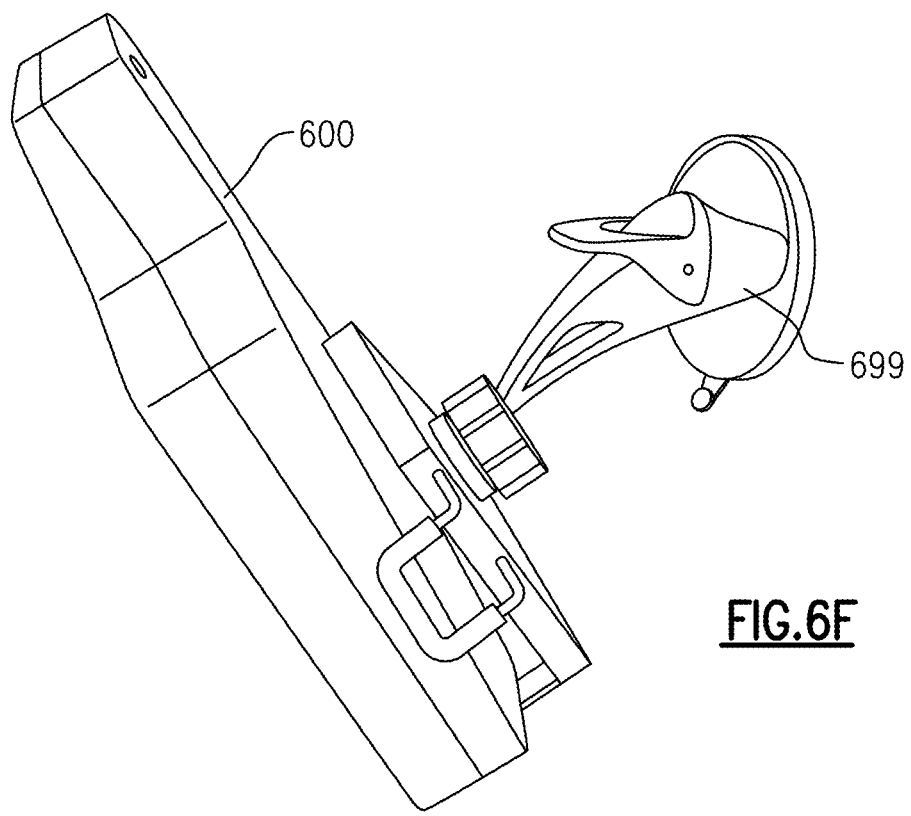
FIG. 6F is perspective view of the signal booster of FIG. 6A with a mounting structure, according to one embodiment.
Figure 6G:
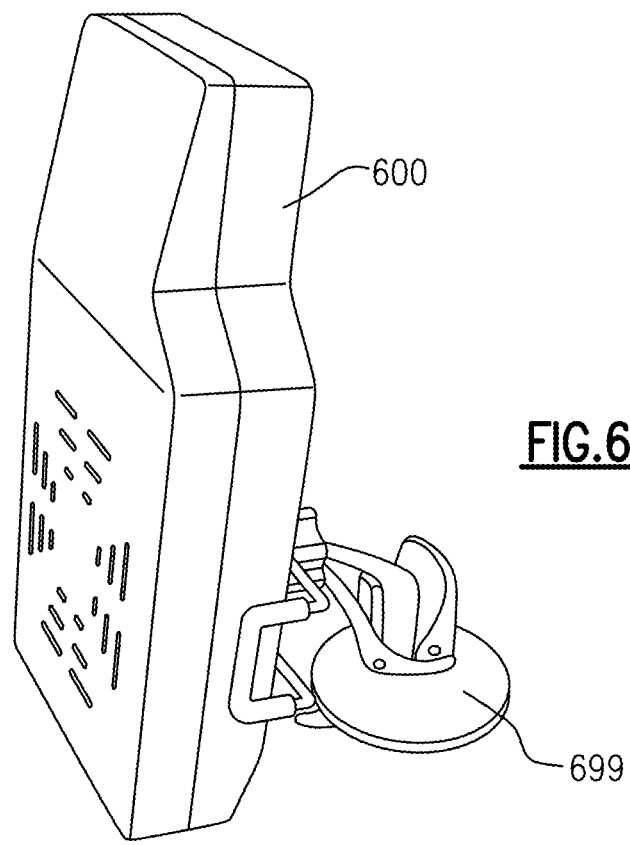
FIG. 6G is perspective view of the signal booster of FIG. 6A with a mounting structure, according to one embodiment.

FIG. 6F is perspective view of the signal booster 600 of FIG. 6A with a mounting structure 699, according to one embodiment. FIG. 6G is another perspective view of the signal booster of FIG. 6A with the mounting structure 699. In certain implementations, the mount structure 699 is detachable.

Including the mounting structure 699 allows the signal booster 600 to be connected to a wide variety of surfaces of a vehicle, such as a roof, window, or other part of the body. The mounting structure 699 of FIGS. 6F and 6G can advantageously control an angle of the signal booster 600 relative to a vehicle, thereby allowing the integrated base station antenna to be positioned at an angle suitable for communicating with base stations, for instance, substantially vertical to the surface of the earth. As shown in FIG. 6G, the housing of the signal booster 600 includes holes for heat dissipation, in certain implementations.

Figure 7A:
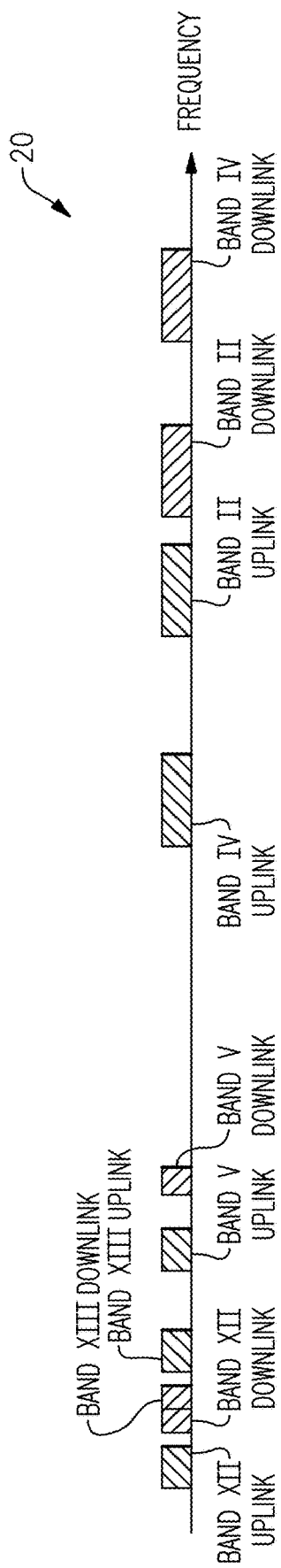
FIG. 7A is a schematic diagram of one example of a portion of a frequency spectrum.

FIG. 7A is a schematic diagram of one example of a portion of a frequency spectrum 20. The frequency spectrum 20 includes a Band XII uplink channel, a Band XII downlink channel, a Band XIII downlink channel, a Band XIII uplink channel, a Band V uplink channel, a Band V downlink channel, a Band IV uplink channel, a Band II uplink channel, a Band II downlink channel, and a Band IV downlink channel. The frequency spectrum 20 of FIG. 7A illustrates one example of the frequency bands that a signal booster described herein can be used for boosting. However, other configurations are possible, such as implementations in which the signal booster amplifies signals of more or fewer frequency bands and/or a different combination of frequency bands.

In certain implementations, the Band XII uplink channel can have a frequency range of about 698 MHz to about 716 MHz, and the Band XII downlink channel can have a frequency range of about 728 MHz to about 746 MHz. Additionally, in certain implementations the Band XIII uplink channel can have a frequency range of about 776 MHz to about 787 MHz, and the Band XIII downlink channel can have a frequency range of about 746 MHz to about 757 MHz. Furthermore, in certain implementations the Band V uplink channel can have a frequency range of about 824 MHz to about 849 MHz, and the Band V downlink channel can have a frequency range of about 869 MHz to about 894 MHz. Additionally, in certain implementations the Band IV uplink channel can have a frequency range of about 1710 MHz to about 1755 MHz, and the Band IV downlink channel can have a frequency range of about 2110 MHz to about 2155 MHz. Furthermore, in certain implementations the Band II uplink channel can have a frequency range of about 1850 MHz to about 1910 MHz, and the Band II downlink channel can have a frequency range of about 1930 MHz to about 1990 MHz.

Although specific frequency ranges have been provided above, persons of ordinary skill in the art will appreciate that the frequencies of the bands can vary by geographical region and/or can change over time based on regulations set by governing agencies such as the Federal Communications Commission (FCC), the Industry Canada (IC) or Canadian Radio-television and Telecommunications Commission (CRTC), or equivalent regulatory agencies in other countries. Additionally, the teachings herein are applicable to configurations in which a signal booster provides amplification to signals of a portion of the sub-bands associated with one or more frequency bands. For example, certain frequency bands, including, for example, the PCS band, can be associated with a plurality of sub-bands, and the teachings herein are applicable to configurations in which the signal booster operates to provide boosting for signals of only some of the sub-bands.

Certain signal boosters can use a separate amplification path for each channel of each frequency band that the signal booster is used for. For example, each amplification path of the signal booster can include a band-pass filter having a passband for passing a particular uplink or downlink channel signal while attenuating or blocking signals of other frequencies. Configuring the signal booster in this manner can aid in maintaining the booster's compliance with communication standards and/or regulator rules, such as those limiting spurious and/or out-of-band emissions.

The radio frequency spectrum has become increasingly crowded with signals as mobile technologies have advanced and the demand for high speed wireless communication has expanded. For example, there has been an increase in a number and proximity of frequency bands that are being utilized by mobile devices and networks.

The increased crowding of the radio frequency spectrum has constrained the design and development of signal boosters, particular multi-band signal boosters that provide boosting across multiple frequency bands, including, for example, adjacent frequency bands. For example, a band-pass filter used to select a particular uplink or downlink channel for boosting can have a non-ideal passband associated with roll-off near the passband's edges. The filter's roll-off can lead to an increase in undesired spurious and/or out-of-band emissions associated with amplification of signals outside of the particular channel's frequency band. Although a particular uplink or downlink channel may be selected by using a relatively sharp filter such as a cavity filter, such filters can be prohibitive in cost and/or size.

Certain RF signal boosters herein can employ separate bandpass filter mechanisms and separate amplification paths for each uplink and downlink channel for each separate path. Alternatively, one or more channels can be filtered and amplified together. For example, in certain implementations a signal booster is used to boost the signals of the uplink and downlink channels of at least a first frequency band and a second frequency band. The first and second frequency bands can be closely positioned in frequency, and the uplink channel of the first frequency band and the uplink channel of the second frequency band can be adjacent. Or, alternatively, the downlink channel of the first frequency band and the downlink channel of the second frequency band can be adjacent. For example, the duplex of the first and second frequency bands can be reversed such that the order in frequency of the first frequency band's uplink and downlink channels is flipped or reversed relative to the second frequency band's uplink and downlink channels.

In certain configurations, the downlink channels of the first and second channels are adjacent, and the signal booster includes a first amplification path for boosting the uplink channel signals of the first frequency band, a second amplification path for boosting the uplink channel signals of the second frequency band, and a third amplification path for boosting the downlink channel signals of the first and second frequency bands. For example, the first amplification path can include a first band-pass filter for passing the first frequency band's uplink channel signals and for attenuating signals of other frequencies such as the first frequency band's downlink channel signals, and the second amplification path can include a second band-pass filter for passing the second frequency band's uplink channel signals and for attenuating signals of other frequencies such as the second frequency band's downlink channel signals. Additionally, the third amplification path can include a third band-pass filter for passing the downlink channel signals of the first and second frequency bands and for attenuating signals of other frequencies such as the uplink channel signals of the first and second frequency bands. Thus, the signal booster can include a shared amplification path that operates to boost the signals on the downlink channels of adjacent frequency bands.

However, in other configurations, the uplink channels of the first and second channels are adjacent, and the signal booster includes a first amplification path for boosting the signals on the downlink channel of the first frequency band, a second amplification path for boosting the signals on the downlink channel of the second frequency band, and a third amplification path for boosting the signals on the uplink channels of the first and second frequency bands. In other arrangements, two amplification paths can be employed for boosting the signals on both uplink channels and both downlink channels of the first and second frequency bands.

The signal boosters described herein can be used to boost signals of multiple frequency bands, thereby improving signal strength for devices using different communications technologies and/or wireless carriers. Configuring the signal booster in this manner can avoid the cost of multiple signal boosters, such as having a specific signal booster for each frequency band. Additionally, the signal boosters can have reduced component count and/or size, since band-pass filters, amplifiers, attenuators and/or other circuitry can be shared for at least two channels. Furthermore, the signal boosters herein can be implemented without the cost of filters with relatively sharp passbands, such as cavity filters, which can have a high cost and/or occupy a large area. Thus, the signal boosters herein can be implemented using filters having a relatively low cost and/or a relatively small size, such as surface acoustic wave (SAW) filters and/or ceramic filters.

Figure 7B:
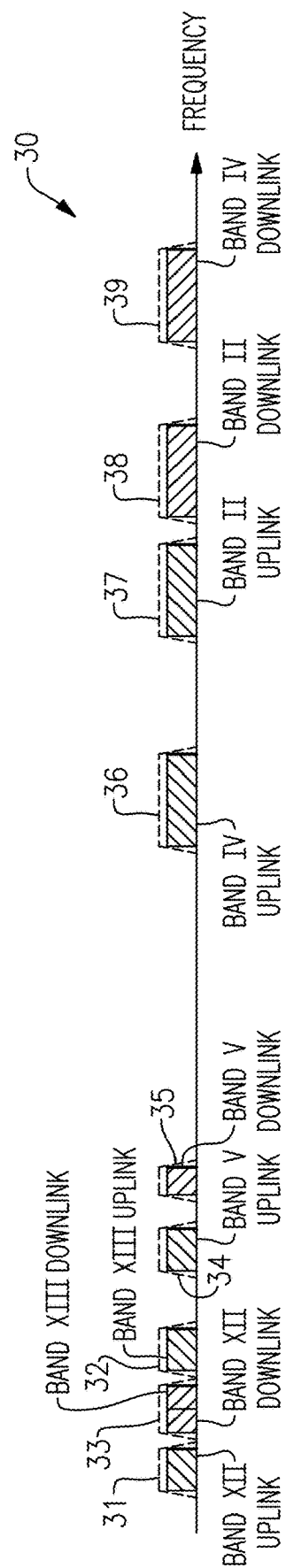
FIG. 7B is schematic diagram of the frequency spectrum of FIG. 7A with annotations showing frequency locations of band-pass filter passbands according to one embodiment.

FIG. 7B is schematic diagram of the frequency spectrum of FIG. 7A with annotations showing frequency locations of band-pass filter passbands according to one embodiment.

In the illustrated configuration, a first band-pass filter passband 31 has been implemented to pass or select signals of a Band XII uplink channel, and a second band-pass filter passband 32 has been implemented to pass signals of a Band XIII uplink channel. Furthermore, a third band-pass filter passband 33 has been implemented to pass signals of both a Band XII downlink channel and a Band XIII downlink channel. Additionally, a fourth band-pass filter passband 34 has been implemented to pass signals of a Band V uplink channel, and a fifth band-pass filter passband 35 has been implemented to pass signals of a Band V downlink channel. Furthermore, a sixth band-pass filter passband 36 has been implemented to pass signals of a Band IV uplink channel, and a seventh band-pass filter passband 37 has been implemented to pass signals of a Band II uplink channel. Additionally, an eighth band-pass filter passband 38 has been implemented to pass signals of a Band II downlink channel, and a ninth band-pass filter passband 39 has been implemented to pass signals of a Band IV downlink channel. Although FIG. 7B illustrates a single passband for each frequency channel, a signal booster can include a plurality of band-pass filters that are cascaded, with or without intervening circuitry, to achieve an overall channel filtering.

As used herein, a band-pass filter can "pass" a particular frequency channel signal when the frequency channel is substantially within the band-pass filter's passband, even when the filter provides gain or loss in the passband. Accordingly, the teachings herein are not limited to band-pass filters having unity-gain passbands. Furthermore, in certain implementations, a band-pass filter herein can be implemented by cascading a low-pass filter and a high-pass filter. For example, cascading a high-pass filter having a cutoff frequency of $f_1$ and a low-pass filter having a cutoff frequency of $f_2$, where $f_2$ is greater than $f_1$, can operate to provide a band-pass filter having a passband between about $f_1$ and about $f_2$.

As shown in FIG. 7B, the third band-pass filter passband 33 advantageously passes the downlink channel signals of both Band XII and Band XIII, which are adjacent frequency bands. The illustrated configuration takes advantage of the reverse duplex of the Band XIII frequency band relative to that of the Band XII frequency band. For example, a typical frequency band, such as Band XIII, Band II, Band IV, and Band V, uses an uplink channel that is at a lower frequency than a corresponding downlink channel of the same band. However, Band XIII uses a reverse configuration in which the downlink channel is at a lower frequency relative to the uplink channel. Configuring a signal booster to have a band-pass filter that passes both the Band XII and Band XIII downlink signals can avoid a need for sharp band-pass filters for separately filtering the signals of the downlink bands, which can be difficult using relative small and/or low-cost filters such as SAW filters and/or ceramic filters, which can have a non-ideal passband and can provide insufficient channel filtering or selectivity.

Figure 8A:
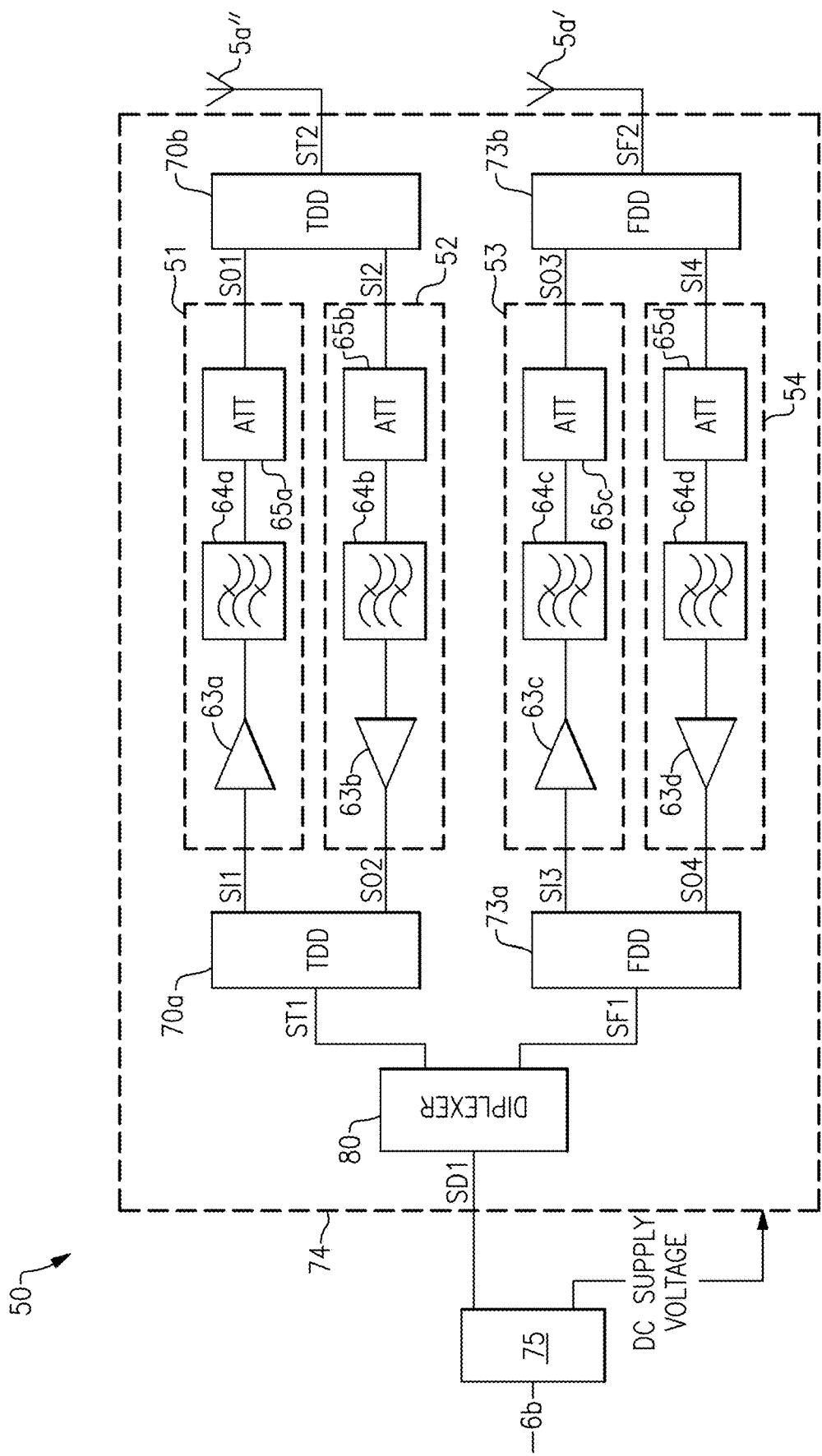
FIG. 8A is a schematic diagram of a signal booster according to another embodiment.

FIG. 8A is a schematic diagram of a signal booster 50 according to another embodiment.

The signal booster 50 includes an integrated FDD antenna 5a', an integrated TDD antenna 5a", a DC power and RF processing circuit 75, and booster circuitry 74 including both time division duplex (TDD) circuitry or TDD switch for boosting TDD signals bi-directionally and frequency division duplex (FDD) circuitry for boosting FDD signals bi-directionally. The booster circuitry 74 includes a diplexer 80, a frequency division duplexer 73a, a frequency division duplexer 73b, a FDD uplink signal path 53, a FDD downlink signal path 54, a time division duplexer 70a or switching control circuit, a time division duplexer 70b or switching control circuit, a TDD uplink signal path 51, and a TDD downlink signal path 52. Although not illustrated in FIG. 8A, an amount of attenuation or amplification of each path can be adjusted by control signals from a control circuit.

As shown in the embodiment of FIG. 8A, the TDD uplink signal path 51 and the TDD downlink signal path 52 are connected between the time division duplexers 70a and 70b. Additionally, the TDD uplink signal path 51 receives an input signal SI1 from the time division duplexer 70a and transmits an output signal SO1 to the time division duplexer 70b. The TDD uplink signal path 51 can provide signal amplification via an amplifier 63a, filtering via a filter 64a, and attenuation via an attenuator 65a. Although one example of components is shown, other implementations are possible and/or a different order of components is possible. Additionally, the TDD downlink signal path 52 receives an input signal SI2 from the time division duplexer 70b and transmits an output signal SO2 to the time division duplexer 70a. The TDD downlink signal path 52 can provide signal amplification via an amplifier 63b, filtering via a filter 64b and attenuation via an attenuator 65b.

The time division duplexer 70b can transmit or receive a TDD antenna signal ST2 at the antenna 5a". For instance, when the time division duplexer 70b receives the output signal SO1 from the TDD uplink signal path 51, the output signal SO1 is transmitted as the TDD antenna signal ST2 at the antenna 5a". Also, when the antenna 5a" receives the TDD antenna signal ST2, the time division duplexer 70b provides the TDD antenna signal ST2 as the input signal SI2. The time division duplexer 70a can transmit or receive a TDD duplex signal ST1 via connection to the diplexer 80. For instance, when the time division duplexer 70a receives the output signal SO2 from the TDD downlink signal path 52, the output signal SO2 is transmitted as the TDD duplex signal ST1. Or when the diplexer 80 provides the TDD duplex signal ST1 to the time division duplexer 70a, the time division duplexer 70a provides the TDD duplex signal ST1 as the input signal SI1.

The FDD uplink signal path 53 and the FDD downlink signal path 54 are connected between the frequency division duplexers 73a and 73b. The FDD uplink signal path 53 receives an input signal SI3 from the frequency division duplexer 73a and transmits an output signal SO3 to the frequency division duplexer 73b. The FDD uplink signal path 53 can provide signal amplification via an amplifier 63c, filtering via a filter 64c, and attenuation via an attenuator 65c. Although one example of components is shown, other implementations are possible and/or a different order of components is possible. Similarly the FDD downlink signal path 54 receives an input signal SI4 from the frequency division duplexer 73b and transmits an output signal SO4 to the frequency division duplexer 73a. The FDD downlink signal path 54 can provide signal amplification via an amplifier 63*d*, filtering via a filter 64*d*, and attenuation via an attenuator 65*d*.

The frequency division duplexer 73*b* can simultaneously transmit and receive mobile signals at the antenna 5*a'*. For instance, mobile signals of one frequency band can be received by the antenna 5*a'* as signal SF2 and duplexed by the frequency division duplexer 73*b* as the input signal SI4. Also, the output signal SO3, having a non-overlapping frequency band with that of the input signal SI4, can be transmitted to the antenna 5*a'* as signal SF2. The frequency division duplexer 73*a* can transmit or receive a mobile signal SF1 via connection to the diplexer 80; and transmission of the output signal SO4 to and reception of the input signal SI3 from the diplexer 80 via signal SF1 can be similar to that of the output signal SO3 to and the input signal SI4 from the antenna 5*a'*.

The diplexer 80 receives and transmits signals ST1 and SF1 from the time division duplexer 70*a* and the frequency division duplexer 73*a*, respectively. As one of ordinary skill in the art can appreciate, the diplexer 80 can implement frequency domain multiplexing of the signals ST1 and SF1 to provide the cable 6*b* with signal SD1. Although an example with a diplexer is shown, other implementations of combiners are possible.

In one embodiment, the gain of each of the signal paths 51-55 can be variable up to about 50 dB, which is currently maximum for normal size vehicle application, as also limited to the same value by FCC. In certain configurations, the gain of one or more of the first to fifth signal paths 51-54 can be externally controlled, such as by using one or more switches and/or by using digital configuration and with AGC. Although one example of gain values has been provided, other configurations are possible.

The attenuators 65*a*-65*d* can serve to control (for instance, automatically control) signal path gain of the signal paths 51-54, respectively. For example, it can be desirable to provide attenuation in one or more of the signal paths 51-54, such as in configurations in which one or more of the input signals to the signal paths has a relatively large amplitude, which can occur when the signal booster 50 is positioned relatively close to a base station, or when oscillation occurs or is close to occurring (pre-oscillation). In one embodiment, the attenuation of the attenuators 65*a*-65*d* can be controlled using one or more processing or control units. For example, one or more embedded CPUs can serve to provide gain control, such as programmable gain control. In certain implementations, the attenuators 65*a*-65*d* can be implemented using analog attenuation components. However, other configurations are possible, such as implementations using digital attenuators, such as digital step attenuators.

The amplifiers 63*a*-63*d* can serve to increase a signal path gain of the signal paths 51-54, respectively. The amplifiers can be low noise amplifiers (LNAs), power amplifiers (PAs), or gain block, or automatic gain control amplifiers (AGCs). In certain implementations a signal path can have more than one amplifier; for instance, a signal path can have both a LNA and a PA.

The filters 64*a*-64*d* can serve to filter unwanted frequency components within the signal paths 51-54, respectively. The filters 64*a*-64*d* can be band pass filters, high pass filters, low pass filters, or notch filters. In certain implementations a signal path can have more than one filter; for instance, a signal path can have both a low pass filter and a band pass filter. In other implementations a signal path can have more than one band pass filter.

The TDD circuitry can be used to process a wide variety of TDD signals, including, but not limited to Wi-Fi signals. In another example, TDD signals associated with 5G are processed using the TDD circuitry.

Although various implementations of a signal booster 50 are illustrated in FIG. 8A, other configurations are possible. For example, the signal booster can include more or fewer signal paths, frequency division duplexers, time division duplexers, diplexers, and/or antennas. For instance, the antenna 5*a'* and the antenna 5*a''* can be omitted in favor of a shared antenna. Additionally, one or more of the signal paths can be modified to include more or fewer components and/or a different arrangement of components. For example, in certain implementations, the position of a filter and an attenuator can be reversed in a cascade, the filters can be positioned before the amplifiers in one or more of the cascades, and/or additional components can be inserted in the cascade. In certain implementations, signal paths can include amplifiers placed in parallel, and signal paths can include detectors to measure signal strength.

In the illustrated embodiment, the signal booster 50 includes a DC power and RF processing circuit 75 coupled to shared DC power and RF cable 6*b*. The DC power and RF processing circuit 75 serves to extract a DC supply voltage from the cable 6*b*, and provide the DC supply voltage to the booster circuitry 74. The DC power and RF processing circuit 75 also serves to transmit and receive RF signals on the cable 6*b*.

Figure 8B:
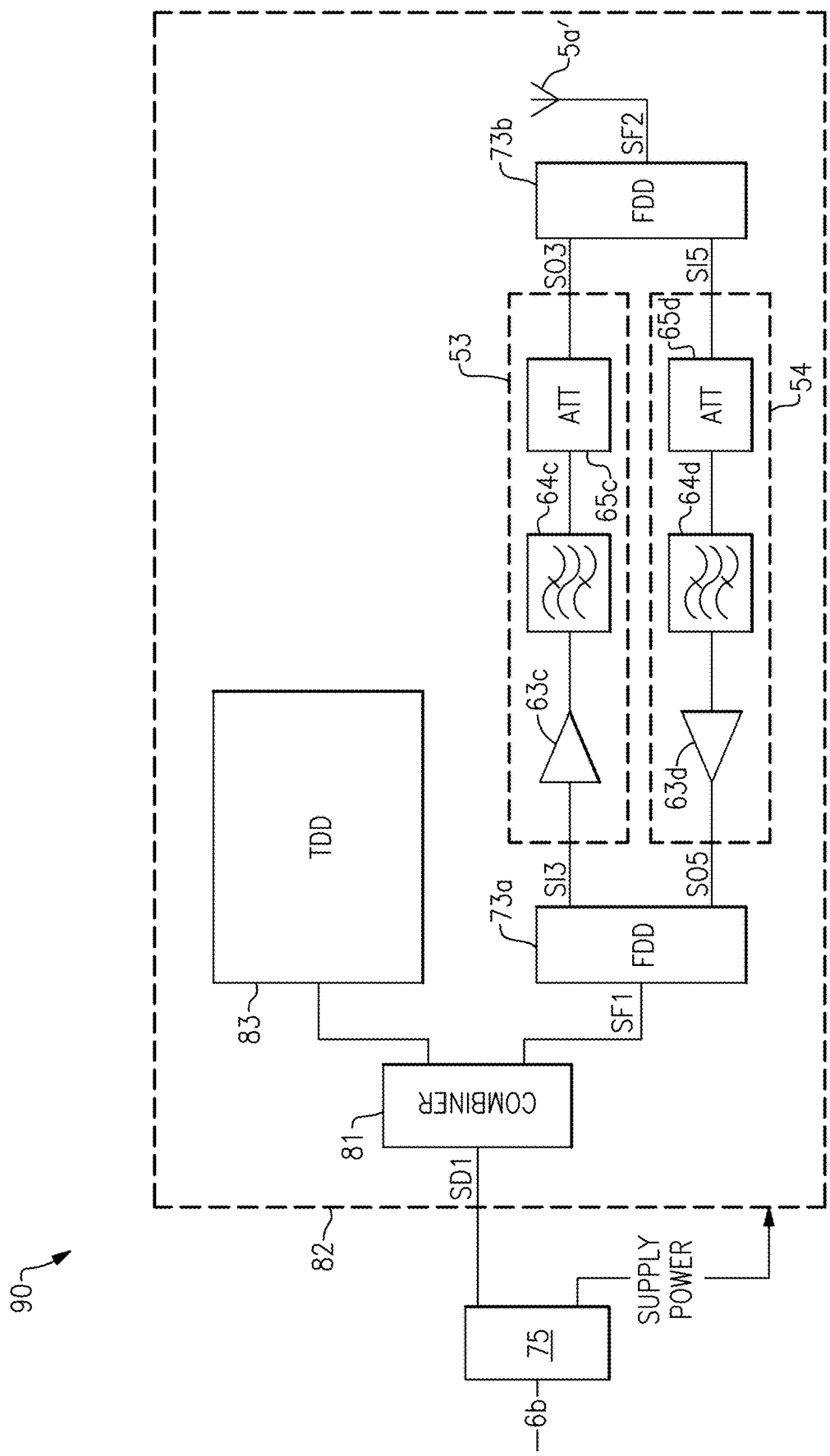
FIG. 8B is a schematic diagram of a signal booster according to another embodiment.

FIG. 8B is a schematic diagram of a signal booster 90 according to another embodiment. The signal booster 90 includes an integrated FDD antenna 5*a'*, a DC power and RF processing circuit 75, and booster circuitry 82 including a TDD circuit 83, a combiner 81, a frequency division duplexer 73*a*, a frequency division duplexer 73*b*, a FDD uplink signal path 53, and a FDD downlink signal path 54.

The TDD circuit 83 can be implemented in a wide variety of ways. In one implementation, the TDD circuit 83 includes a MiFi circuit. In another implementation, the TDD circuit 83 includes a WiMax circuit. In certain implementations, the TDD circuit 83 includes an integrated antenna. However, other implementations are possible, such as configurations using an external antenna and/or a shared antenna.

Additional details of the signal booster 90 can be similar to the signal booster 50 of FIG. 8A.

Figure 8C:
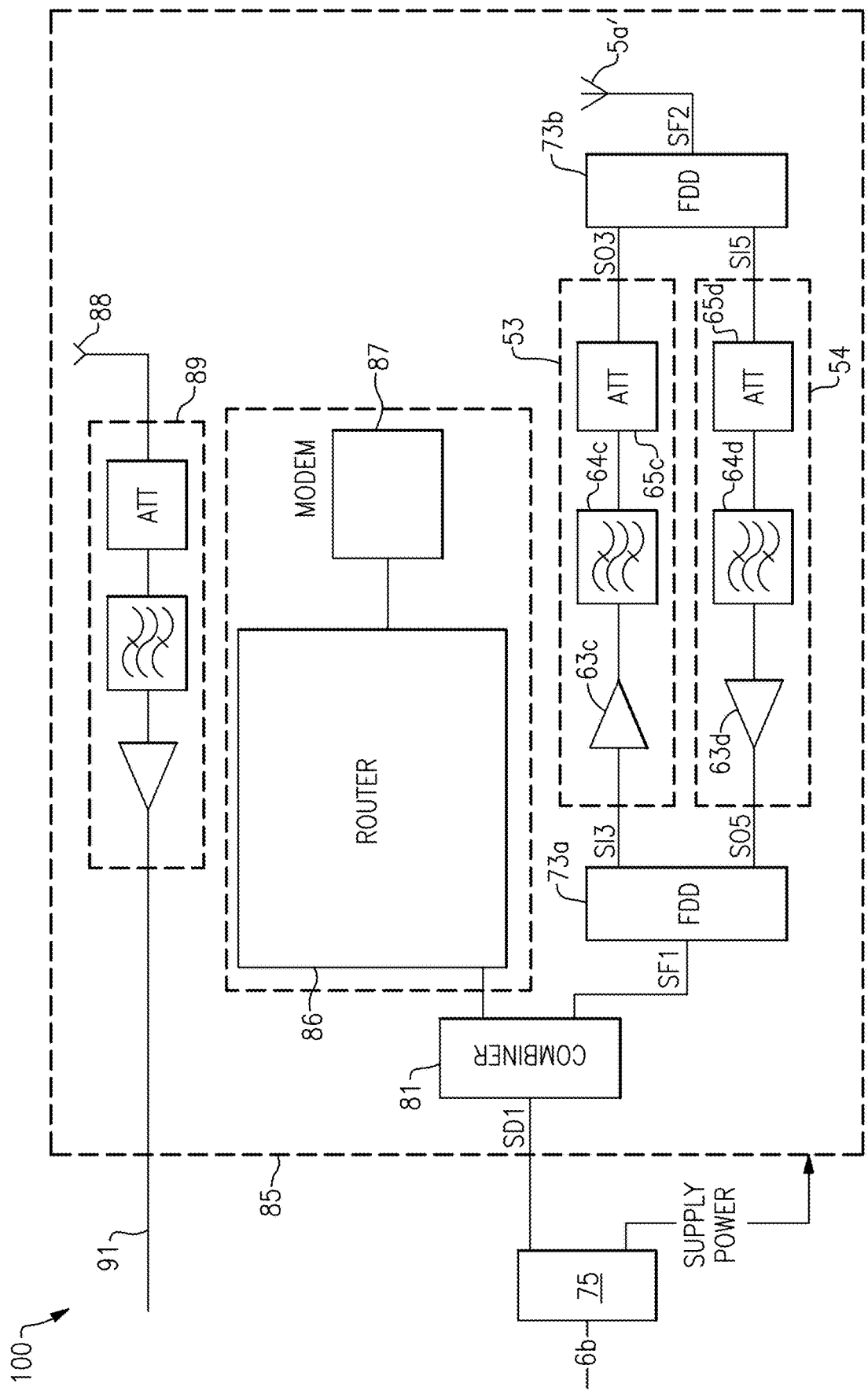
FIG. 8C is a schematic diagram of a signal booster according to another embodiment.

FIG. 8C is a schematic diagram of a signal booster 100 according to another embodiment. The signal booster 100 includes an integrated FDD antenna 5*a'*, a DC power and RF processing circuit 75, and booster circuitry 85 including a router 86, a modem 87 (for instance, a USB modem), an HDTV antenna 88, an HD TV signal path 89, a combiner 81, a frequency division duplexer 73*a*, a frequency division duplexer 73*b*, a FDD uplink signal path 53, and a FDD downlink signal path 54.

The signal booster 100 of FIG. 8C includes an HD TV signal path 89 for amplifying an HDTV signal received from the HDTV antenna 88. The amplifying HDTV signal is provided to an HDTV in an interior of the vehicle using cable 91. The modem 87 and router 86 can aid in providing a wide variety of functions, including, for example, providing a Wi-Fi network to wireless clients in the vehicle. In another embodiment, signals associated with cable 91 and cable 6*b* can be combined using a combiner (for instance, a diplexer) and communication over a common cable, with RF signal separation via filters and/or other circuitry at the other end.

Additional details of the signal booster 100 can be similar to the signal booster 50 of FIG. 8A.

Figure 9:
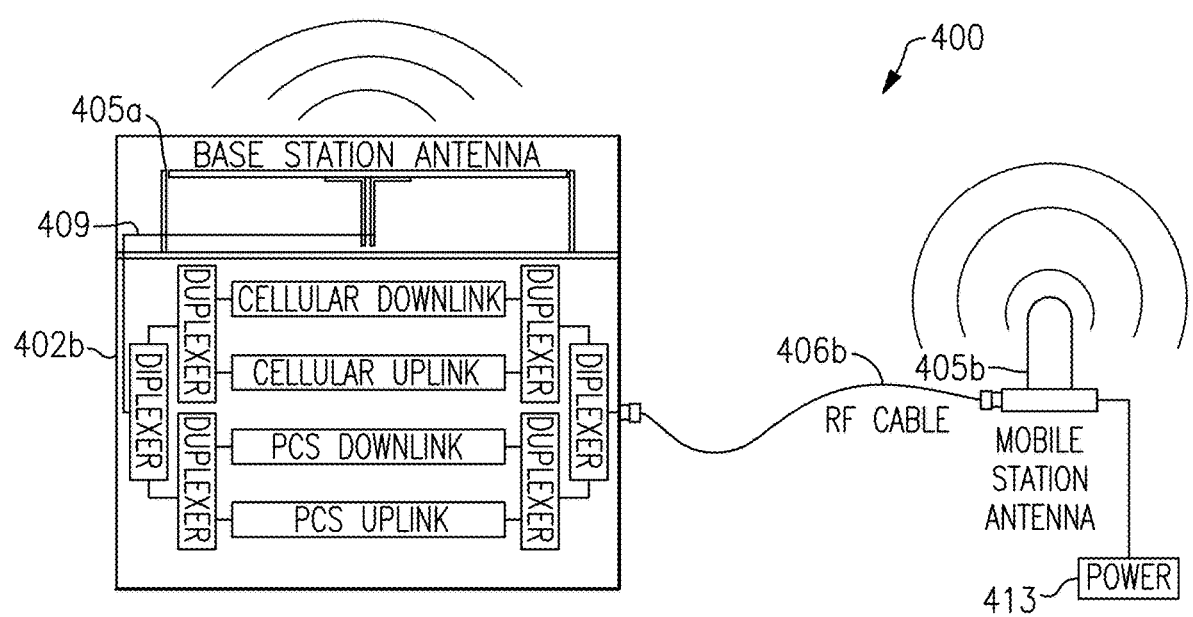
FIG. 9 is a schematic diagram of a vehicle signal booster system according to another embodiment.

FIG. 9 is a schematic diagram of a vehicle signal booster system 400 according to another embodiment. The vehicle signal booster system 400 includes a signal booster 402b, a mobile station antenna 405b, and an RF cable 406b.

The signal booster 402b, including electronics and housing, is integrated with the base station antenna 405a and is electrically coupled to the mobile station antenna 405b via the RF cable 406b, which can be a coaxial cable in certain implementations.

Because the base station antenna 405a is integrated into the signal booster 402b, the base station antenna 405a can be electrically coupled to the signal booster 402b via a local cable 409, which can serve as the cable 6a of FIG. 1. However, since the local cable 409 is internal to the signal booster 402b, cable 409 can be very short with commensurately low loss.

As with the signal booster 2a, discussed above with respect to FIG. 1, the signal booster 402b can retransmit signals to and receive signals from the base station 1 using the base station antenna 405a, and can retransmit signals to and receive signals from mobile devices 3a-3c using the mobile station antenna 405b. In particular, the signal booster 402b can be configured to receive downlink signals from one or more base stations, on one or more downlink channels, via the base station antenna 405a. The signal booster 402b can be configured to retransmit the downlink signals to one or more mobile devices, over the one or more downlink channels, via the mobile station antenna 405b. Similarly, the signal booster 402b can be configured to receive signals from the devices, over one or more uplink channels, via the mobile station antenna 405b. The signal booster 402b can be configured to retransmit the uplink signals to one or more base stations, over the one or more uplink channels, via the base station antenna 405a.

In various embodiments, the signal booster 402b can include multiple base station antennas 405a. For example, the signal booster 402b can include a separate base station antenna for high frequency bands (for example, those over 1 GHz) and a separate base station antenna for low frequency bands (for example, those 1 GHz and under). In another example, the signal booster 402b can include a separate base station antenna for uplink bands and a separate base station antenna for downlink bands. In yet another example, the signal booster 402b can include a separate base station antenna for FDD bands and a separate base station antenna for TDD bands. In various embodiments, separate base station antennas can be implemented as entire antenna modules 1600 (FIG. 15) or as separately connected traces 1620 on one or more antenna modules 1600.

Figure 10B:
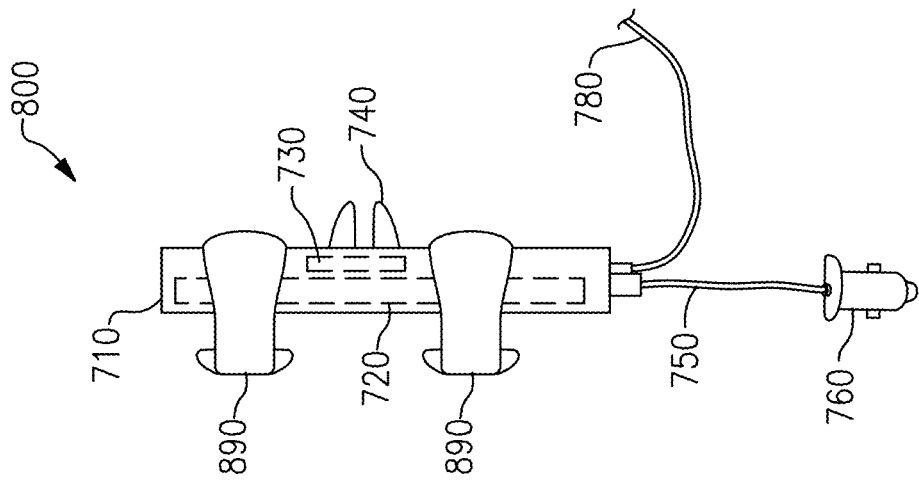
FIG. 10B is a side view of the vehicle interior mount of FIG. 10A.
Figure 10A:
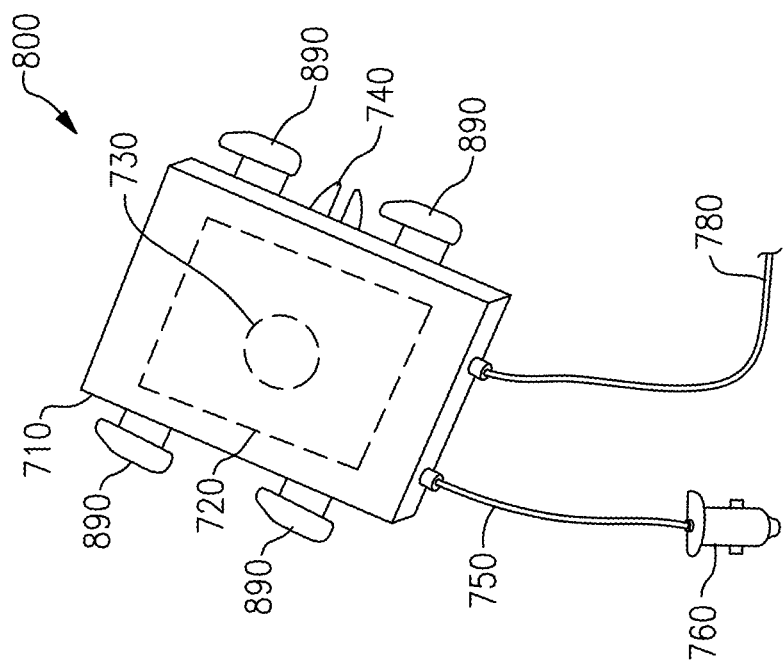
FIG. 10A is a front perspective view of another embodiment of a vehicle interior mount including a mobile station antenna.

FIG. 10A is a front perspective view of another embodiment of a vehicle interior mount 800 including a mobile station antenna. FIG. 10B is a side view of the vehicle interior mount 800 of FIG. 10A.

The vehicle interior mount 800 of FIGS. 10A-10B is similar to the vehicle interior mount 700 of FIGS. 4A-4B, except that the vehicle interior mount 800 further includes mobile device clamps 890 to aid in further securing a mobile device to the vehicle interior mount 800 when desired or as an alternative to the magnetic mounting.

FIG. 11A is a front perspective view of another embodiment of a vehicle interior mount 900 including a mobile station antenna. FIG. 11B is a side view of the vehicle interior mount 900 of FIG. 11A.

The vehicle interior mount 900 of FIGS. 11A-11B is similar to the vehicle interior mount 700 of FIGS. 4A-4B, except that the vehicle interior mount 900 omits the ventilation grips 740 in favor of including suction cup stand 940 for securing the vehicle interior mount 900 to a suitable interior surface of a vehicle, such as a dashboard, interior window surface, or console.

In certain implementations, the power cable 750 and/or the shared DC power and RF cable 780 connect to the vehicle interior mount 900 via a base 941 of the suction cup stand 940. Thus, cables can connect to a vehicle interior mount in a wide variety of ways. Furthermore, in certain implementations, one or more cables bypass the vehicle interior mount and go directly to signal booster.

FIGS. 12A-12H are schematic diagrams of the mobile network of FIG. 1 according to various vehicular embodiments.

Figure 12A:
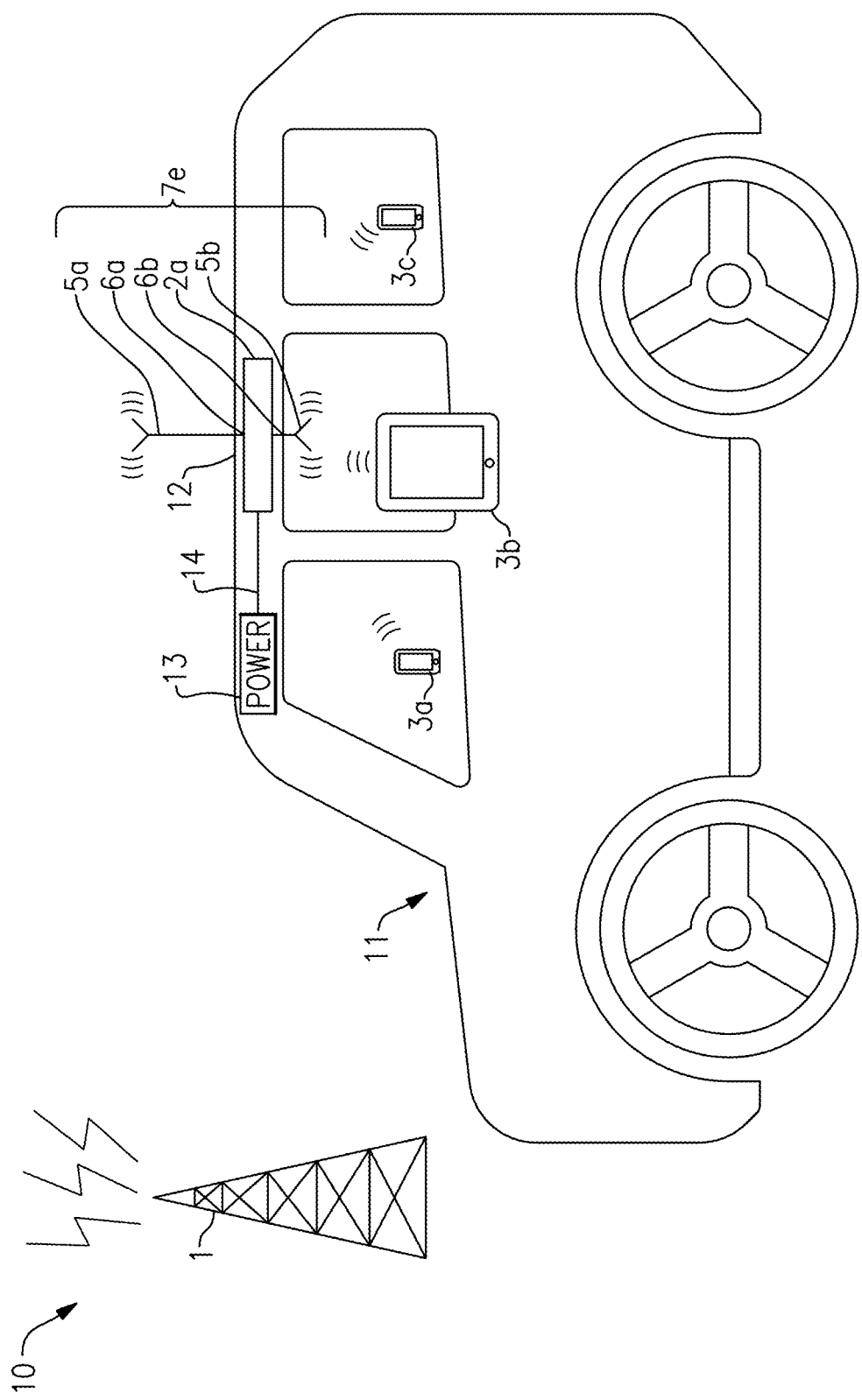

FIG. 12A is a schematic diagram of the mobile network 10, according to another vehicular embodiment. The mobile network 10 includes the base station 1 (which as noted above can represent multiple base stations for a moving vehicle), a signal booster system 7e, and the plurality of mobile devices 3a-3c (three shown). The signal booster system 7e includes the components of the signal booster system 7a of FIG. 1, and receives power from a power system 13 of the vehicle 11 via a power cable 14.

The signal booster 2a, including electronics and housing, is integrated with the vehicle 11, and can receive power from the vehicular power system 13 (for instance, a power system of about 12 VDC) via the power cable 14. The power cable 14 can be routed through interior paneling or structural body of the vehicle 11, or can be routed through the passenger compartment and connected to a power outlet, such as a cigarette-lighter-style accessory power outlet.

The signal booster 2a is mounted adjacent to the base station antenna 5a, which is mounted on an outer wall of the vehicle, particularly on a roof 12 of the vehicle 11. Accordingly, the signal booster 2a is electrically coupled with the base station antenna 5a by a relatively short cable 6a (for example, having a cable loss less than 4 dB at the frequencies of interest). In another embodiment, no cable is present. The mobile station antenna 5b is mounted adjacent to the signal booster 2a, and can be mounted on the interior ceiling of the vehicle 11. Accordingly, the signal booster 2a is electrically coupled with the base station antenna 5a by a relatively short cable 6b (for example, having a cable loss less than 4 dB at the frequencies of interest). In another embodiment, no cable is present. As skilled artisans will appreciate, cable loss is a frequency dependent parameter.

Since a vehicle's body serves in all or part to provide isolation, very short cables or no cables can be included, while the signal booster operates properly without oscillation. Thus, a vehicle body (including, roof and windows) serves as a shell for providing isolation.

In certain implementations, the base station antenna 5a is mounted on an exterior surface of the roof 12 of the vehicle 11. The signal booster 2a is integrated into the roof, and connects to the base station antenna 5a via a cable of relatively short length, for instance, a length in the range of about 1 cm to about 20 cm. In another embodiment, the base station antenna 5a is integrated with or within the signal booster 2a.

The mobile station antenna 5b is orientated to communicate with devices in the passenger compartment of the vehicle, and can be integrated into the roof 12 or mounted or an interior surface thereof. For example, the mobile station antenna 5b can be mounted on the ceiling of the passenger compartment of the vehicle 11 at a location beneath the base station antenna 5a and the signal booster 2a. The cable 6b serves to connect the mobile station antenna 5b to the signal booster 2a, and is of relatively short length, for instance, a length in the range of about 1 cm to about 20 cm. In another embodiment, the mobile station antenna 5b is integrated with or within the signal booster 2a. In yet another embodiment, both the base station antenna 5a and the mobile station antenna 5b are integrated with or within the signal booster 2a.

Thus, the base station antenna 5a can be positioned for a high likelihood of line-of-sight communication with respect to one or more base stations (e.g., base station 1), and isolated in part from the mobile station antenna 5a by the roof 12. In one embodiment, the base station antenna 5a can be an omnidirectional antenna configured to primarily radiate in a horizontal plane as the vehicle 11 moves.

In other embodiments, for example as described below with respect to FIGS. 12D-12E, the base station antenna 5a can be a directional antenna configured to primarily radiate out a window of the vehicle 11. The mobile station antenna 5b can be positioned to maximize connectivity (e.g., line-of-sight communication) with respect to one or more mobile stations (e.g., mobile devices 3a-3c) within the vehicle 11. In one embodiment, the mobile station antenna 5b can be an omnidirectional or directional antenna configured to primarily radiate within the vehicle 11 passenger compartment.

Positioning of the components and possible integration of multiple components allows one or more of the cables 6a and 6b to be relatively short in the vehicular embodiments, thereby decreasing signal degradation, improving sensitivity for reception of base station downlink signals for a given cable grade or improve transmit power going back to base station. In contrast, long RF cables can introduce, for example, 4-7 dB signal attenuation and increase installation costs.

Proximal location (or integration) of the base station antenna 5a to the signal booster 2a can provide advantages over, for example, the inverse configuration (e.g., proximal location of the mobile station antenna 5b into the signal booster 2a). For example, received power at the base station antenna 5a (from the base station 1) can be much lower than received power at the mobile station antenna 5b (from the mobile stations 3a-3c). Accordingly, reception through the base station antenna 5a is more sensitive to signal attenuation over the RF cable than reception from the mobile devices 3a-3c through the mobile station antenna 5b. Proximal location (or integration) of the base station antenna 5a into the signal booster 2a can reduce signal attenuation over the RF cable 6a.

On the other hand, proximal location (or integration) of the base station antenna 5a to the signal booster 2a can introduce unwanted effects in certain embodiments. For example, proximal location (or integration) of the base station antenna 5a to the signal booster 2a can increase proximity of the base station antenna 5a to the mobile station antenna 5b (for example, by locating both antennas 5a and 5b in the same passenger compartment, thereby creating unwanted feedback and/or interference effects in some configurations. In various embodiments discussed herein, the signal booster 2a can include various features to mitigate these effects. For example, the signal booster system 7e can be configured, in part by positioning the antennas, such that the outer body (e.g., roof 12) of the vehicle 11 acts as an isolator (or reflector) configured to provide isolation (or feedback attenuation) between the base station antenna 5a and the mobile station antenna 5b. In some embodiments, the signal booster system 7e can be configured such that the outer body (e.g., roof 12) of the vehicle 11 provides at least 40 dB of isolation between the base station antenna 5a and the mobile station antenna 5b. The skilled artisan will understand that the entire vehicle body need not be composed of metal in order to achieve this advantage.

Moreover, significant installation cost can be incurred for configurations in which cable 6a is longer. For example, routing cable 6a through one or more structures of the vehicle 11 can be significantly more expensive than integrating the signal booster 2a directly into the roof of the vehicle 11. Thus, proximal location (or integration) of the base station antenna 5a to the signal booster 2a can reduce or eliminate such installation costs for the cable 6a.

Although one embodiment of a vehicle signal booster is shown in FIG. 12A, a wide variety of vehicle signal booster systems are contemplated within the scope of this disclosure.

For example, various embodiments and components of vehicle signal booster systems have been described with reference to FIGS. 2-11B. Furthermore, in various embodiments, the mobile station antenna 5b can include dual antennas (e.g., FIG. 12B), the base station antenna 5a can be placed inside the vehicle 11 (e.g., FIGS. 12D-12H), the signal booster can be integrated or placed in the vehicle 11 interior rather than the vehicle 11 body (e.g., FIGS. 12D-12H), the mobile station antenna 5b can be integrated with a power cable (e.g., FIG. 12E), and so on. Each of these embodiments is described in more detail below.

FIG. 12B is a schematic diagram of the mobile network 10, according to another vehicular embodiment. The mobile network 10 includes the base station 1, a signal booster system 7f, and the plurality of mobile devices 3a-3c (three shown). The signal booster system 7f of FIG. 12B is similar to the signal booster system 7e of FIG. 12A, except for the addition of a second mobile station antenna 5c.

In certain implementations herein, a vehicle signal booster system includes multiple mobile device antennas that operate with phase differences that provide destructive interference to enhance isolation to the base station antenna. In particular, a signal booster can control a phase difference between a first mobile station antenna and a second mobile station antenna such that a boosted RF downlink signal transmitted from the first mobile station antenna and a boosted RF downlink signal transmitted from the second mobile station antenna destructively interfere or cancel each other at the base station antenna to provide enhanced isolation.

For example, the signal booster 2a can be configured to operate the dual mobile station antennas 5b and 5c with a phase difference of about 180 degrees. Accordingly, the mobile station antenna 5b can have a phase $\omega$, and the mobile station antenna 5b can have a phase of about $\omega \pm 180°$. The mobile station antennas 5b and 5c can be spaced symmetrically with respect to the base station antenna 5a, such that downlink signals transmitted from the mobile station antennas 5b and 5c are partially or entirely canceled out at the base station antenna 5a. Likewise, uplink signals transmitted from the base station antenna 5a, and received by the mobile station antennas 5b and 5c, are canceled out in phase processing at the signal booster 2a.

Accordingly, isolation between the base station antenna 5a and the mobile station antennas 5b and 5c is increased. Alternatively, the attenuation called for by physical isolation means (e.g., metallic reflector or shield) between the base station antenna 5a and the mobile station antennas 5b and 5c is reduced. Such out-of-phase dual antennas 5b and 5c can be advantageous in combination with embodiments where both the base station antenna 5a and the mobile station antenna 5*b* are within the vehicle, i.e., without an intervening metallic vehicle wall, such as the embodiments of FIGS. 12D-12H.

Although one example of a vehicle signal booster system with multiple mobile station antennas is shown in FIG. 12B, any of the embodiments disclosed herein can include multiple mobile station antennas, with or without phase differences.

Figure 12C:
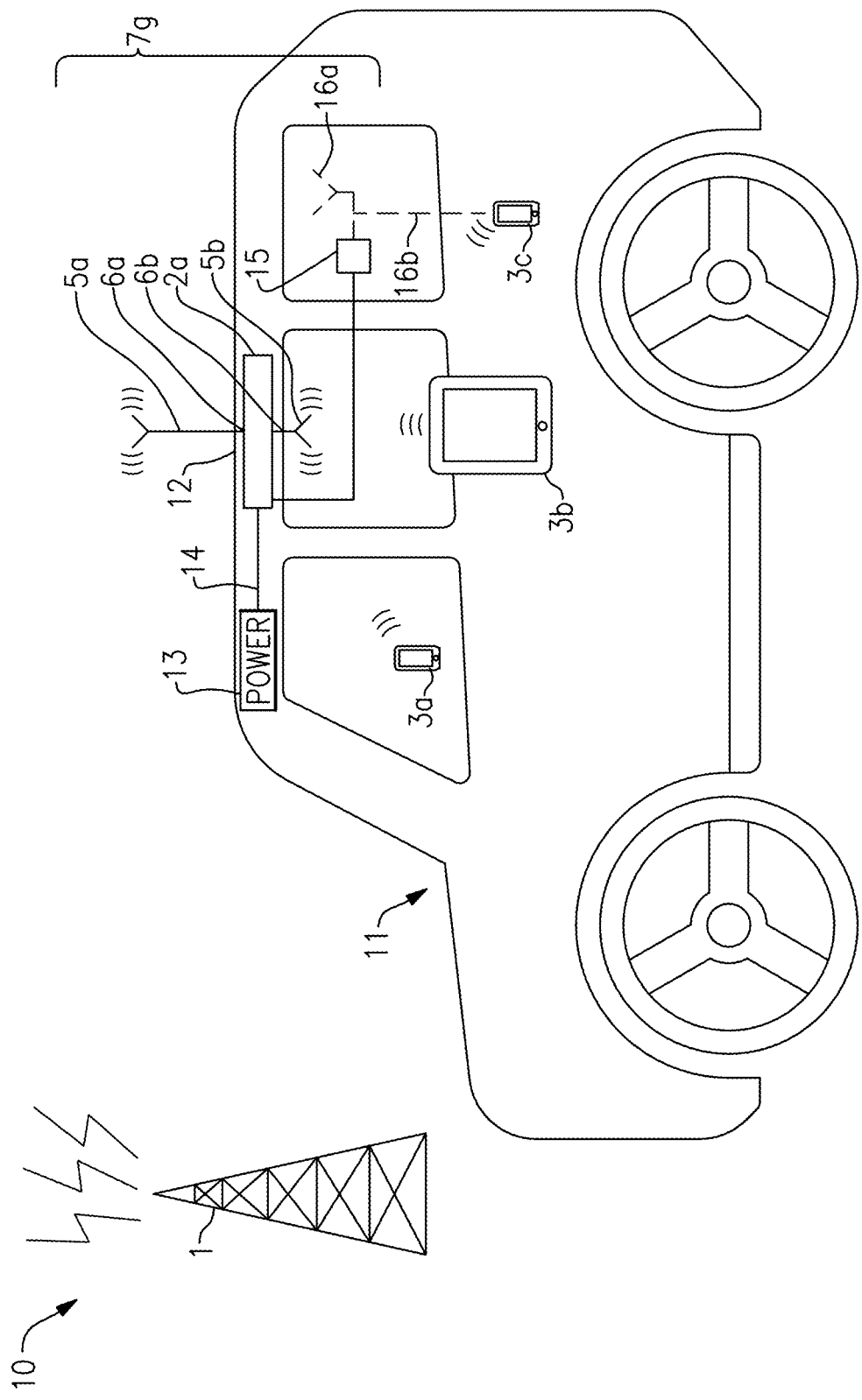

FIG. 12C is a schematic diagram of the mobile network 10, according to another vehicular embodiment. The mobile network 10 includes the base station 1, a signal booster system 7*g*, and the plurality of mobile devices 3*a*-3*c* (three shown). The signal booster system 7*g* of FIG. 12C is similar to the signal booster system 7*e* of FIG. 12A, except for the addition of a mobile station port 15.

The mobile station port 15 can be connected to an antenna (such as a direct contact coupling type antenna 16*a*) or directly connected to an antenna port of a mobile device (for example, connected to the mobile device 3*c* via cable 16*b*). The mobile station port 15 can provide the boosted downlink signal from the signal booster 2*a*, and can receive an uplink signal from the mobile devices 3*a*-3*c* via the antenna 16*a*, or directly from the mobile device 3*c* via the cable 16*b*, which in one example is a pigtail connector. In another example, the cable 16 is used as a charging cable for a battery of a mobile device. The illustrated mobile station port 15 is provided in addition to the mobile station antenna 5*b*.

In other variations, the mobile station antenna 5*b* can be omitted or can be replaced with the antenna 16*a* connected to the signal booster 2*a* via the mobile station port 15. In still other variations, the mobile station antenna 5*b* can be replaced with two or more out-of-phase antennas as described with respect to FIG. 12B.

Although one example of a vehicle signal booster system with a mobile station port is shown in FIG. 12C, any of the embodiments disclosed herein can include one or more mobile station ports.

Figure 12D:
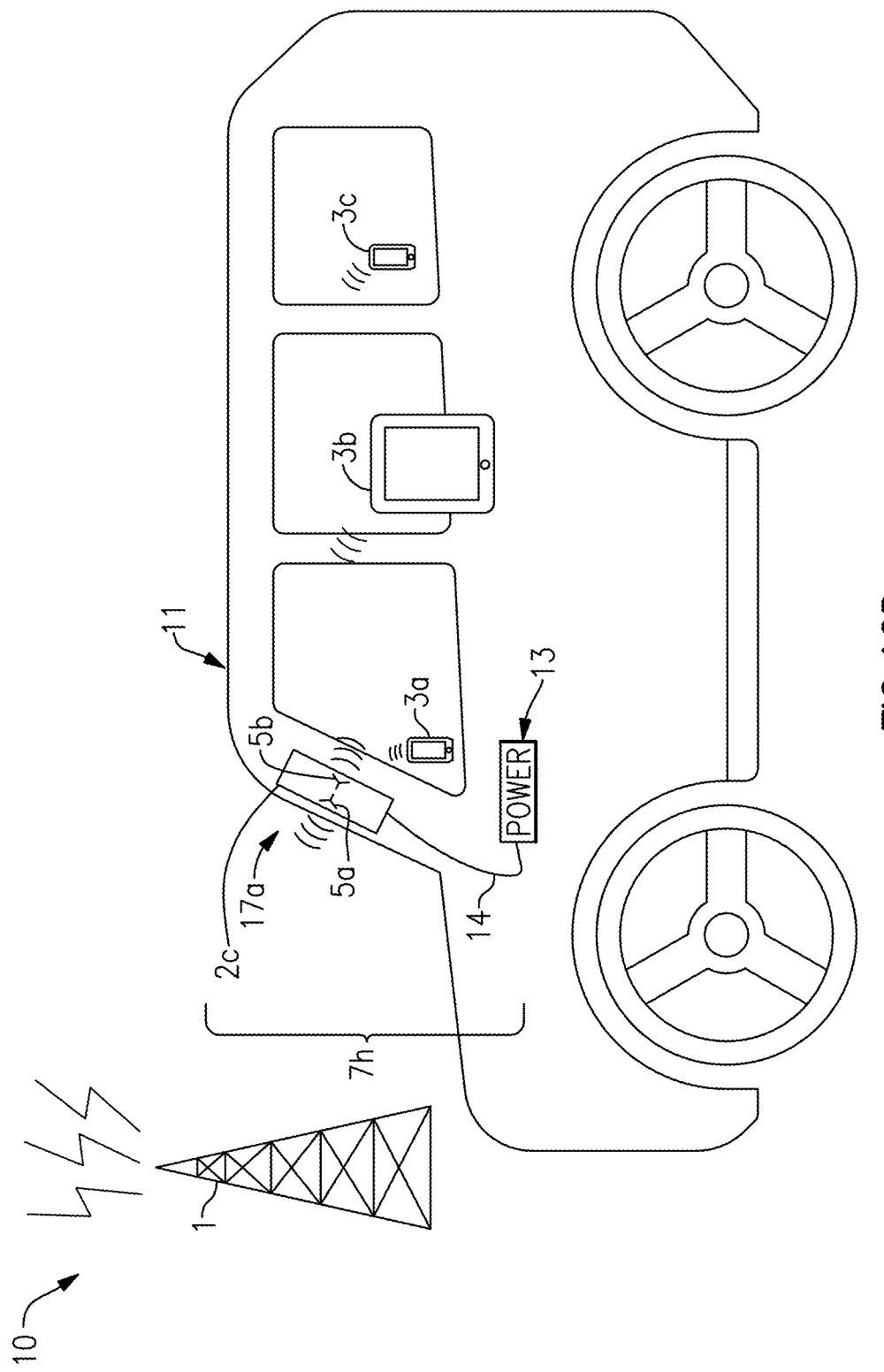

FIG. 12D is a schematic diagram of the mobile network 10, according to another vehicular embodiment. The mobile network 10 includes the base station 1, a signal booster system 7*h*, and the plurality of mobile devices 3*a*-3*c* (three shown).

The signal booster system 7*h* of FIG. 12D is similar to the signal booster system 7*e* of FIG. 12A, except for the illustrated positioning of the components and that both the base station antenna 5*a* and the mobile station antenna 5*b* are integrated into a signal booster 2*c* (see also FIG. 13 and corresponding description below).

In the illustrated embodiment, the signal booster 2*c* (with integrated base station antenna 5*a* and mobile station antenna 5*b*) is mounted on the inside of a front windshield 17*a* of the vehicle 11. In other embodiments, the signal booster 2*c* can be mounted anywhere else in or around the vehicle, such as a rear window of the vehicle. In various embodiments, the signal booster 2*c* can include an isolator configured to provide isolation between the integrated base station antenna 5*a* and the mobile station antenna 5*b*. For example, the signal booster 2*c* can include an isolator similar to the isolator 1530 and/or 1610 described herein with respect to FIGS. 14A-15, in addition to using a vehicle body as an isolator.

Figure 12E:
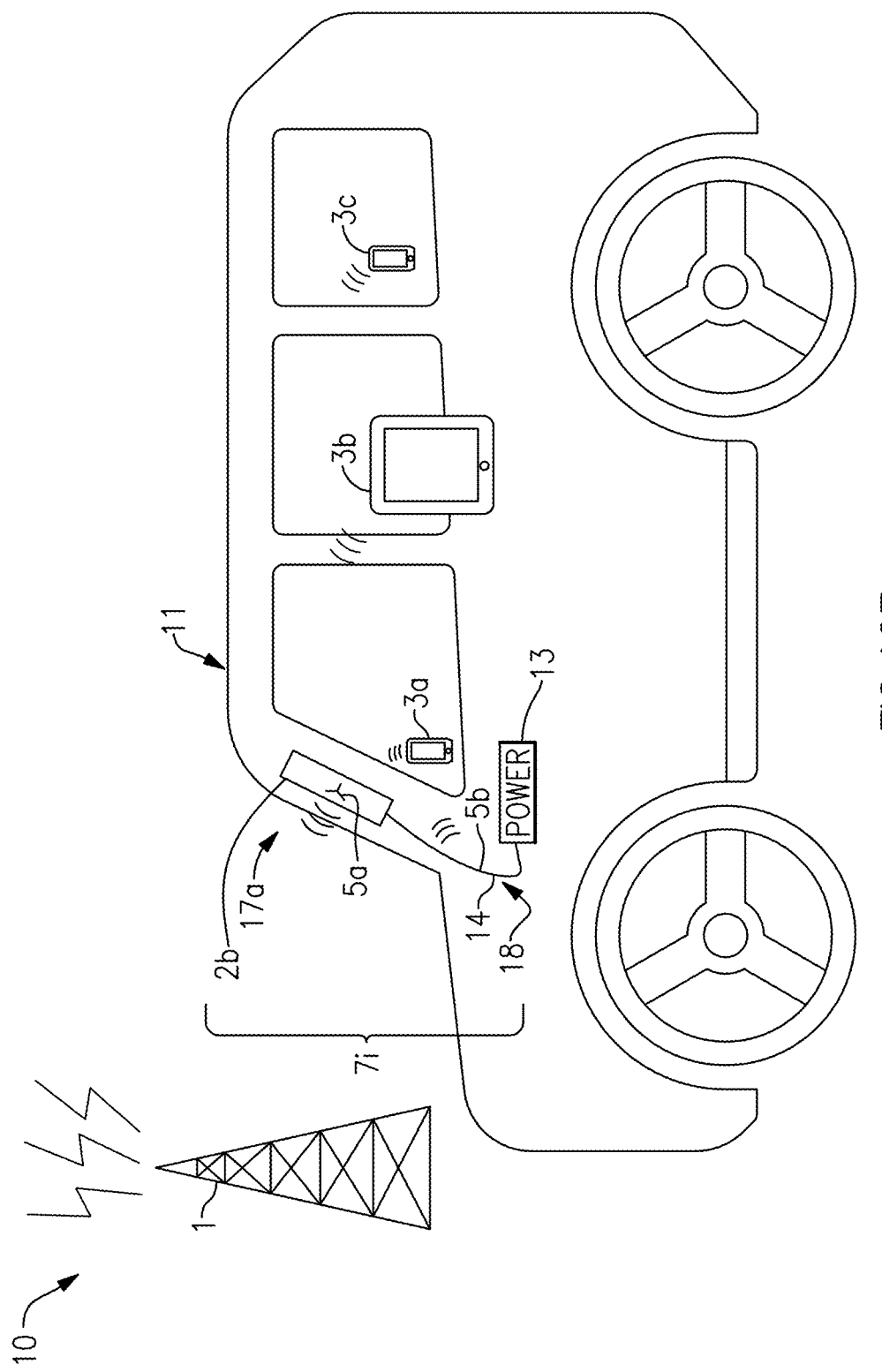

FIG. 12E is a schematic diagram of the mobile network 10, according to another vehicular embodiment. The mobile network 10 includes the base station 1, a signal booster system 7*i*, and the plurality of mobile devices 3*a*-3*c* (three shown).

The signal booster system 7*i* of FIG. 12E is similar to the signal booster system 7*h* of FIG. 12D, with the base station antenna 5*a* integrated into the signal booster 2*b* (see also FIG. 9 and corresponding description above), except that the mobile station antenna 5*b* is integrated with the power cable 14 (referred to in combination as a combined cable 18).

In one embodiment, the combined cable 18 is configured to plug into a power outlet of a vehicle, such as a USB outlet and/or cigarette-lighter-style accessory power outlet. In various embodiments, the signal booster 2*b* can include an isolator configured to provide isolation between the integrated base station antenna 5*a* and the mobile station antenna 5*b* (in combination with the power cable 14). For example, the signal booster 2*b* can include an isolator similar to the isolator 1530 and or the shield 1610 described herein with respect to FIGS. 14A-15.

Figure 12F:
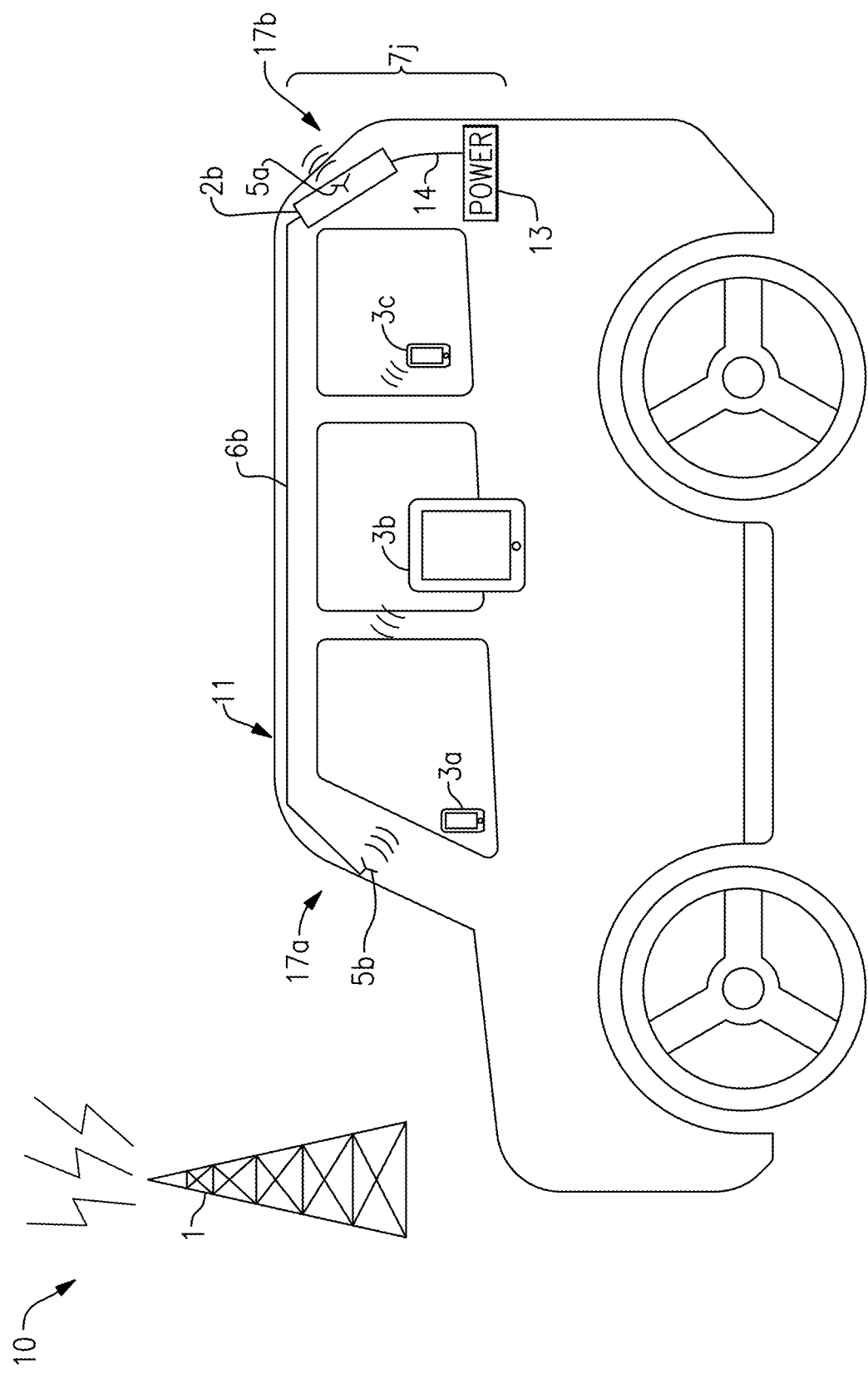

FIG. 12F is a schematic diagram of the mobile network 10, according to another vehicular embodiment. The mobile network 10 includes the base station 1, a signal booster system 7*j*, and the plurality of mobile devices 3*a*-3*c* (three shown).

The signal booster system 7*j* of FIG. 12F is similar to the signal booster system 7*e* of FIG. 12A, except for the illustrated positioning of the components and the fact that the base station antenna 5*a* is integrated into the signal booster 2*b*.

In the illustrated embodiment, the signal booster 2*b* (with integrated base station antenna 5*a*) is mounted in a rear windshield 17*b* of the vehicle 11 and the mobile station antenna 5*b* is remote from the signal booster 2*b* and mounted elsewhere, particularly in the front windshield 17*a* in the illustrated embodiment. In other embodiments, the signal booster 2*b* can be mounted anywhere else in or around the vehicle. In various embodiments, the signal booster 2*b* can include an isolator configured to provide isolation between the integrated base station antenna 5*a* and the mobile station antenna 5*b*. For example, the signal booster 2*b* can include an isolator similar to the isolator 1530 and/or the shield 1610 described herein with respect to FIGS. 14A-15.

FIG. 12G is a schematic diagram of the mobile network 10, according to another vehicular embodiment. The mobile network 10 includes the base station 1, a signal booster system 7*k*, and the plurality of mobile devices 3*a*-3*c* (three shown).

The signal booster system 7*k* of FIG. 12G is similar to the signal booster system 7*j* of FIG. 12F, except for the illustrated positioning of the signal booster 2*b* and mobile station antenna 5*b*. For example, the embodiment of FIG. 12G includes the signal booster 2*b* positioned internal to the vehicle near front window 17*a*, and the mobile station antenna 5*b* is positioned on an interior surface of the roof 11 facing the passenger compartment.

FIG. 12H is a schematic diagram of the mobile network 10, according to another vehicular embodiment. The mobile network 10 includes the base station 1, a signal booster system 7*l*, and the plurality of mobile devices 3*a*-3*c* (three shown).

The signal booster system 7*l* of FIG. 12H is similar to the signal booster system 7*k* of FIG. 12G, except that the signal booster system 7*l* includes multiple mobile station antennas 5*b*. Although an example, with three mobile station antennas is shown, more or fewer mobile station antennas can be included in a vehicle booster system.

In the embodiments of FIGS. 3A and 12A-12C, the vehicle's frame (e.g., roof 12) of the vehicle 11 can intervene between the base station antenna 5*a* and the mobile station antenna 5*b*, and accordingly provide a high degree of isolation between the antennas. However, the embodiments of FIGS. 3A and 12A-12C could benefit from additional isolation provided integrally with the signal booster. The embodiments of FIGS. 12D-12G integrate the base station antenna 5a with the signal booster, or integrate both the base station antenna 5a and the mobile station antenna 5b with the signal booster, and may benefit even more from additional isolation.

The skilled artisan will readily appreciate in view of the disclosure herein that isolation in the form of a reflector shield can beneficially be integrated with any of the signal boosters herein, and a reflector can be just be a vehicle body, for instance, a frame, roof, or portion of window that contains metal or an element of metal.

Although FIGS. 3A-3C and 12A-12F illustrate signal boosters communicating with one base station 1, a signal booster typically communicates with multiple base stations. For example, a signal booster can be used to communicate with base stations associated with different cells of a network. Furthermore, in certain implementations, a signal booster can communicate with base stations associated with different networks, including, for example, networks associated with different wireless carriers and/or networks associated with different RF frequencies or bands (such as any of the bands discussed above with respect to FIG. 1). For example, a signal booster can include at least two separate uplink/downlink paths: one for cellular bands and one for using Personal Communication Services (PCS) bands (see for, example, the signal boosters of FIGS. 9 and 13). A person having ordinary skill in the art will appreciate that any combination of wireless communications bands can be included.

Figure 13:
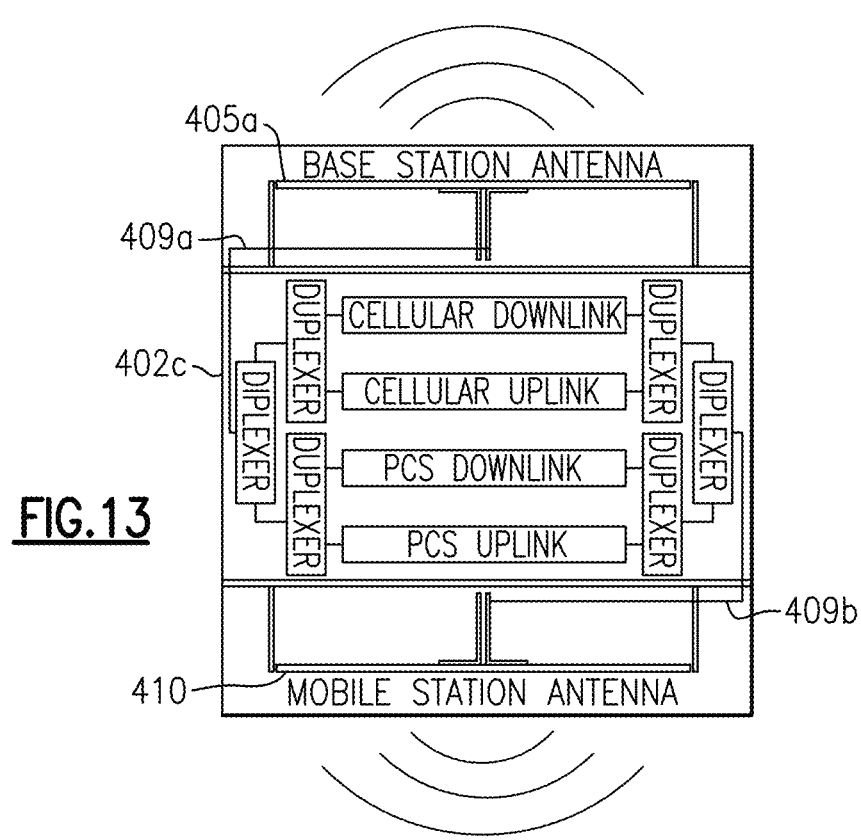
FIG. 13 is a schematic diagram of a signal booster according to another embodiment.

FIG. 13 is a schematic diagram of a signal booster 402c according to another embodiment. The signal booster 402c, including electronics and housing, is integrated with both the base station antenna 405a and the mobile station antenna 410. Because the base station antenna 405a is integrated into the signal booster 402c, the base station antenna 405a can be electrically coupled to the signal booster 402c via a local cable 409a, which can be a coaxial cable. Similarly, because the mobile station antenna 410 is integrated into the signal booster 402c, the mobile station antenna 410 can be electrically coupled to the signal booster 402c via a local cable 409b, which can also be a coaxial cable.

Accordingly, cables 409a and 409b operate as the cables 6a and 6b of FIG. 1. Because the cables 409a and 409b are local and can be internal to the signal booster 402c, they can be very short with commensurately low loss. As with the signal booster 2a, discussed above with respect to FIG. 1, the signal booster 402c can retransmit signals to and receive signals from the base station 1 using the base station antenna 405a, and can retransmit signals to and receive signals from the plurality of mobile devices 3a-3c using the mobile station antenna 410. In particular, the signal booster 402c can be configured to receive downlink signals from one or more base stations, on one or more downlink channels, via the base station antenna 405a. The signal booster 402c can be configured to retransmit the downlink signals to one or more mobile devices, over the one or more downlink channels, via the mobile station antenna 410. Similarly, the signal booster 402c can be configured to receive signals from the devices, over one or more uplink channels, via the mobile station antenna 410. The signal booster 402c can be configured to retransmit the uplink signals to one or more base stations, over the one or more uplink channels, via the base station antenna 405a.

When integrated into a vehicle, the signal booster system 402 the outer metal frame (e.g., roof) of the vehicle serves as an isolator that operates to provide isolation between the base station antenna 405a and the mobile station antenna 410. In one example, the signal booster system 402 is integrated into a roof such that the roof provides at least 40 dB of isolation between the base station antenna 405a and the mobile station antenna 410. In certain configurations, the signal booster system 402 can further include additional reflector/isolator structures for providing further isolation beyond that provided by the vehicle's body.

Figure 14A:
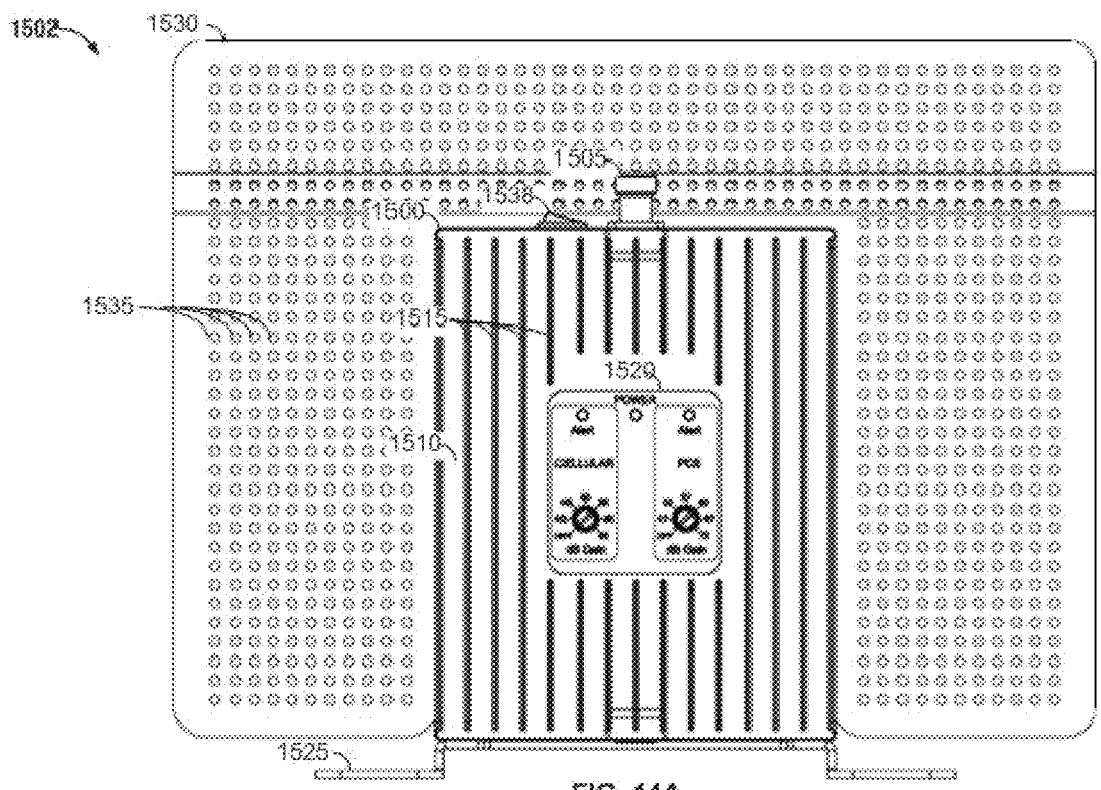
FIG. 14A is a front view of a signal booster according to another embodiment.
Figure 14B:
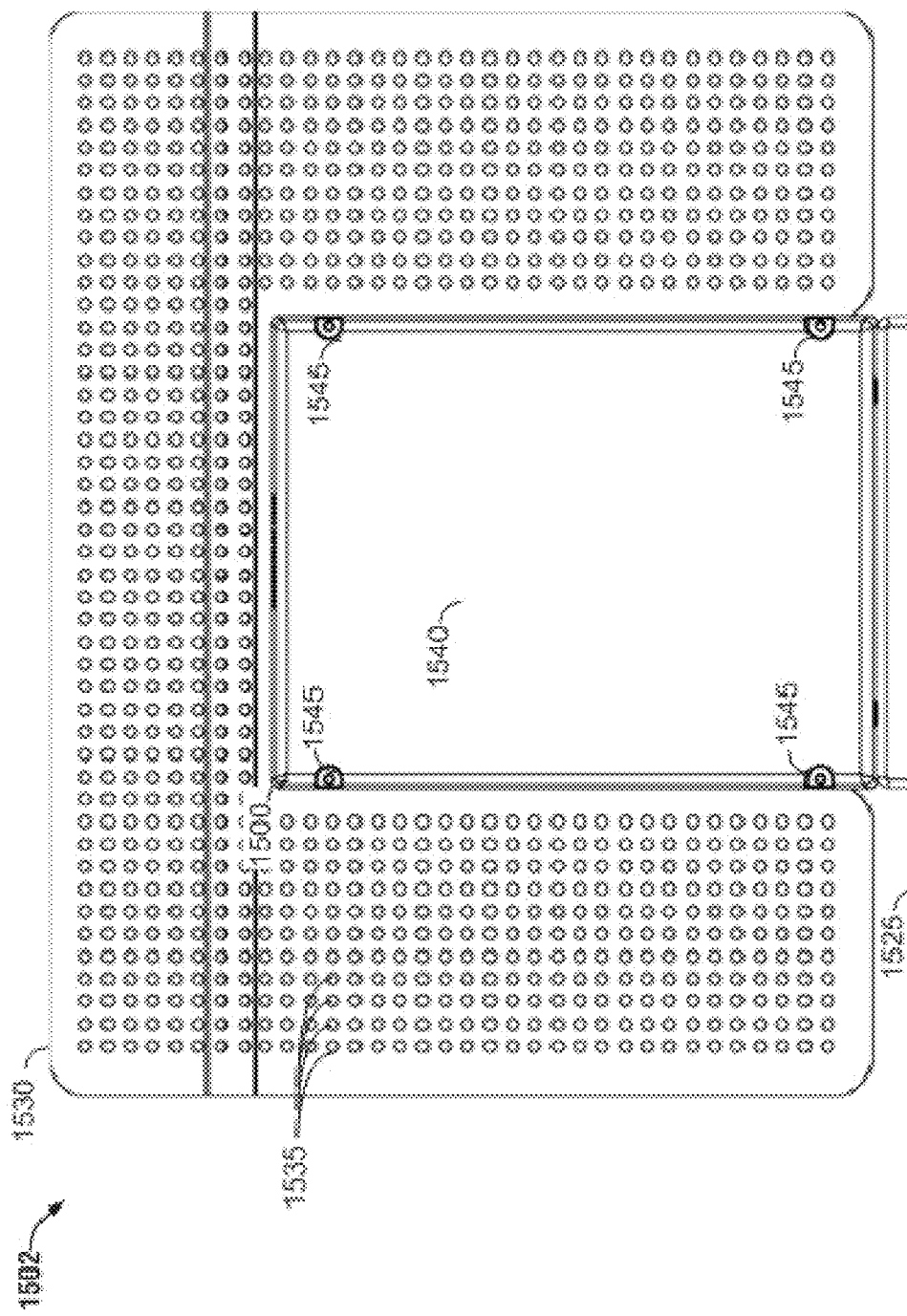
FIG. 14B is a rear view of the signal booster of FIG. 14A.
Figure 14C:
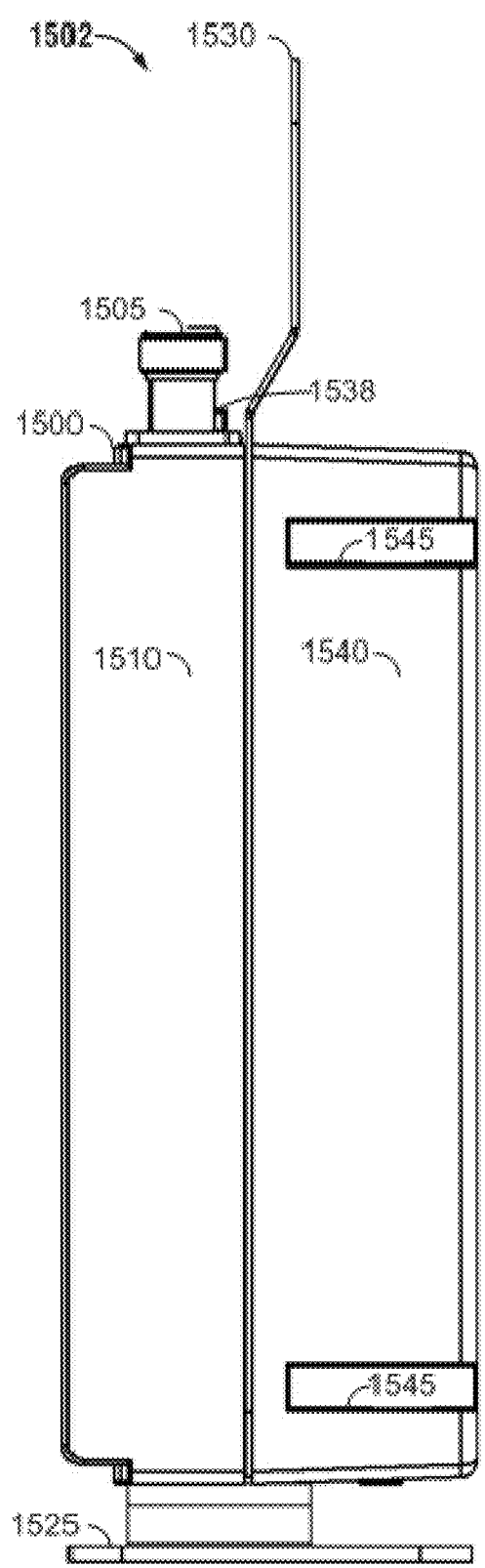
FIG. 14C is a right-side view of the signal booster of FIG. 14A.
Figure 14D:
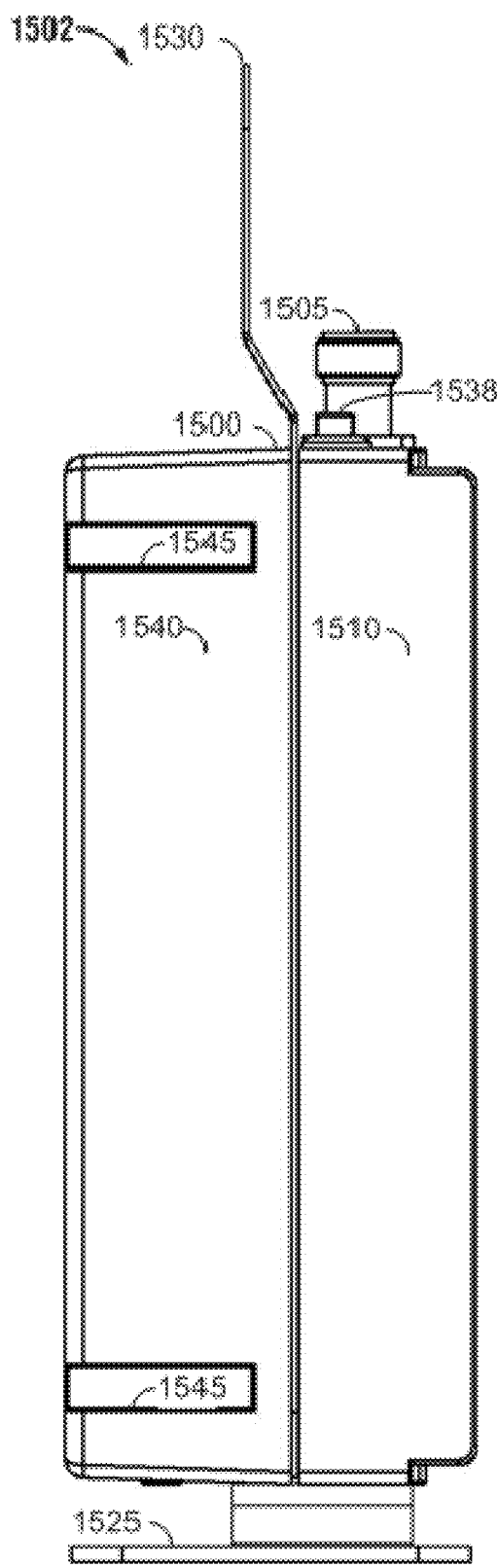
FIG. 14D is a left-side view of the signal booster of FIG. 14A.
Figure 14G:
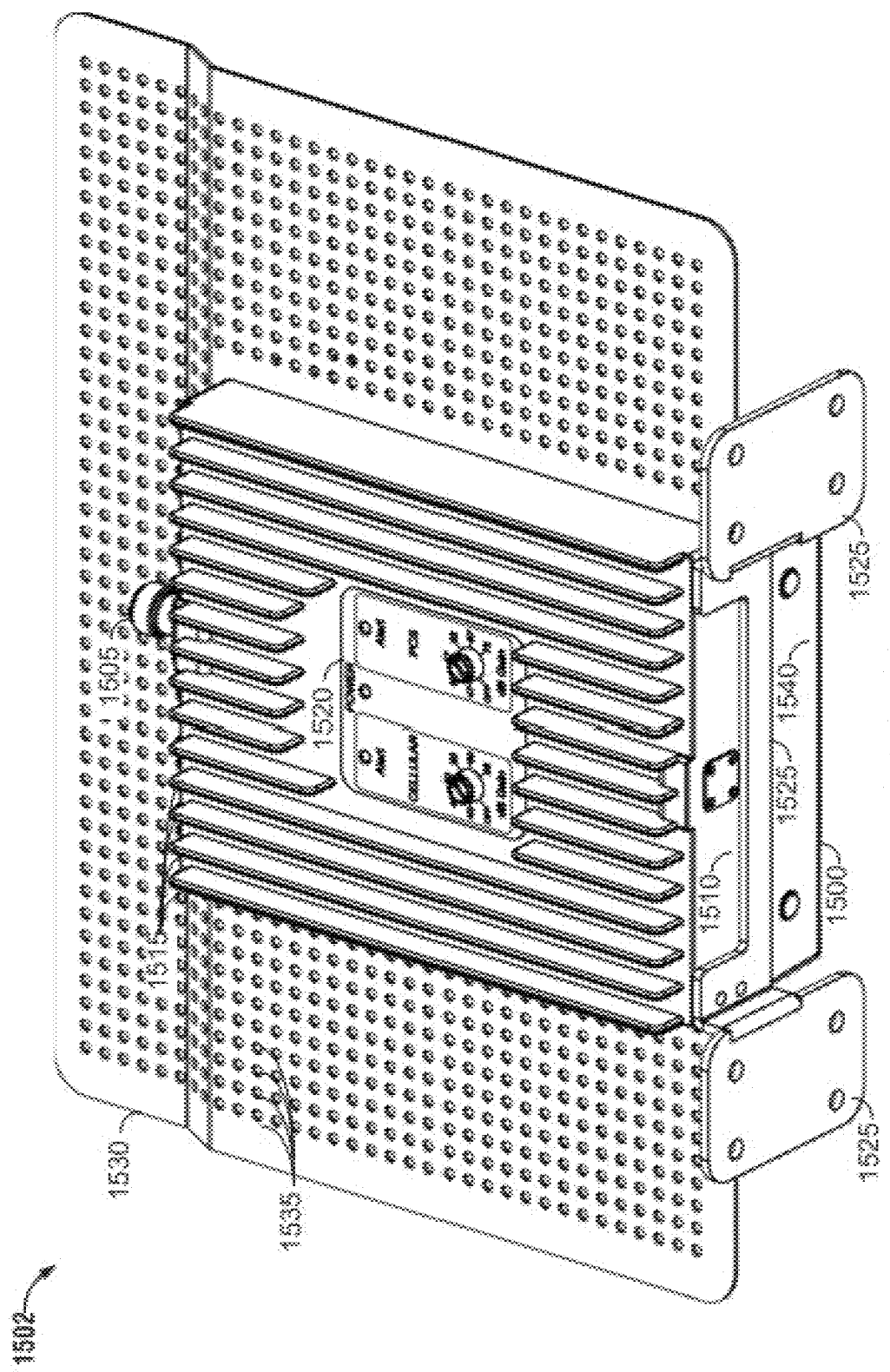
FIG. 14G is a front perspective view of the signal booster of FIG. 14A.
Figure 14H:
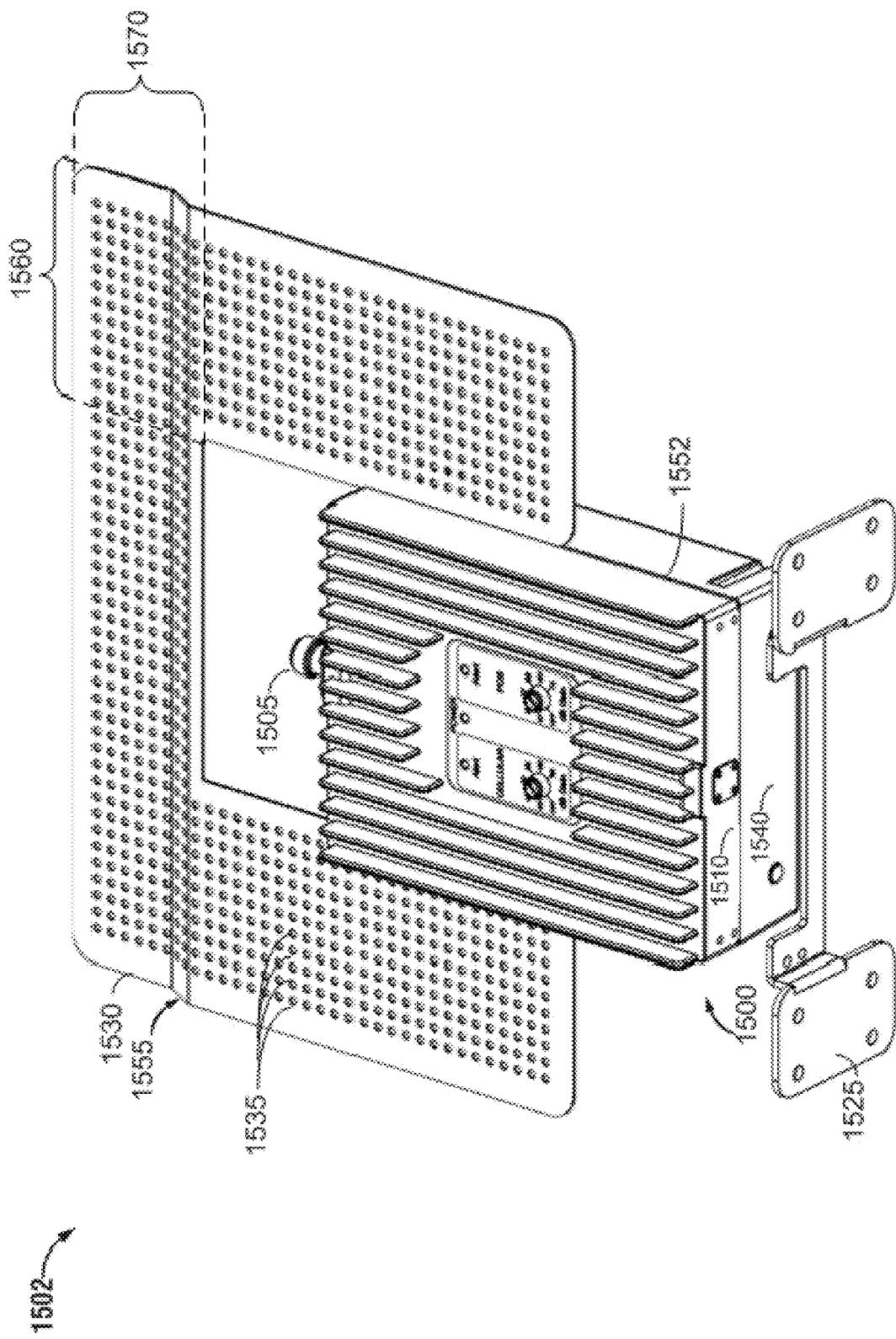
FIG. 14H is a front perspective view of the signal booster of FIG. 14A, with an isolator and a mounting bracket detached.
Figure 14I:
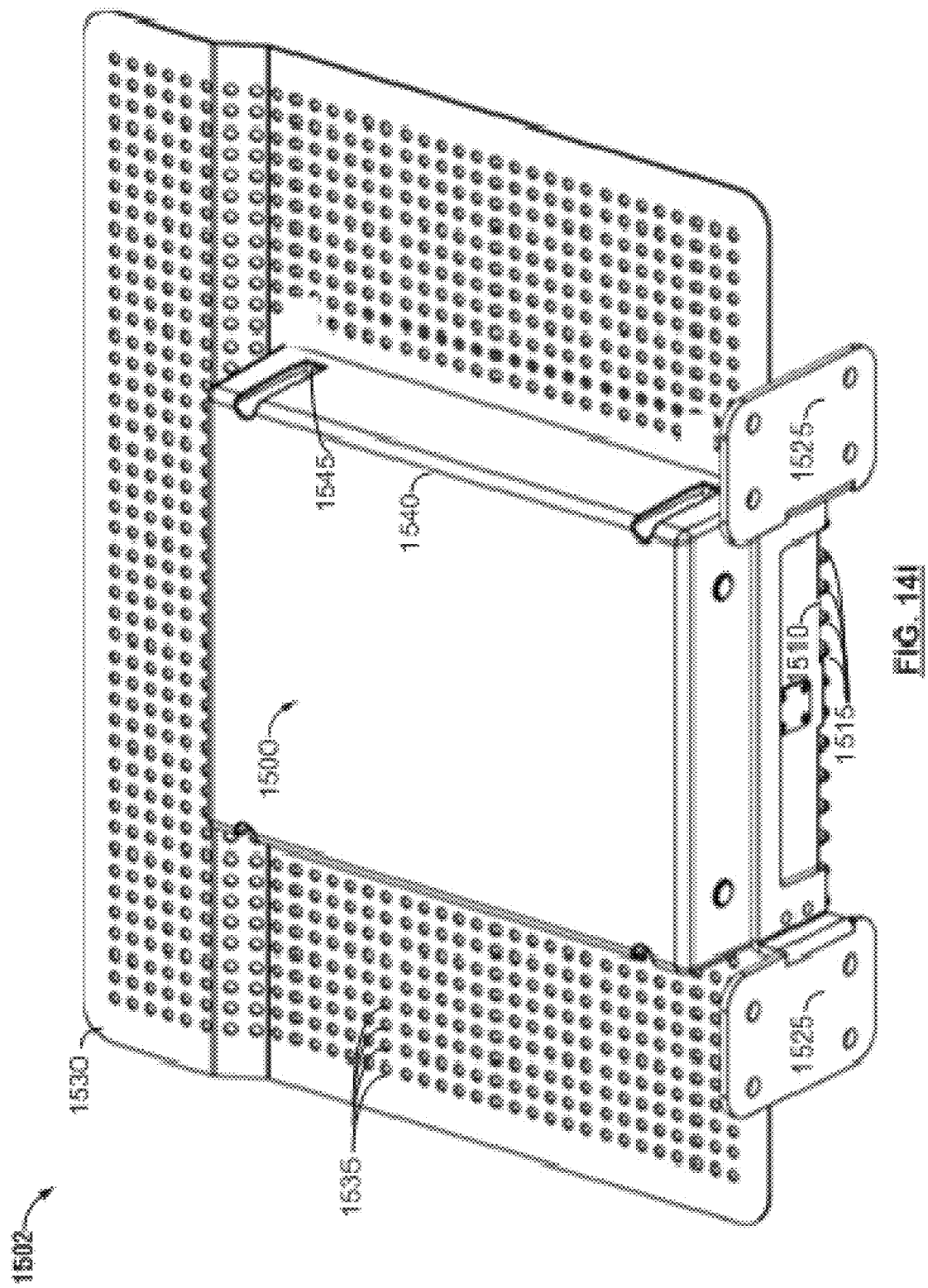
FIG. 14I is a rear perspective view of the signal booster of FIG. 14A.
Figure 14J:
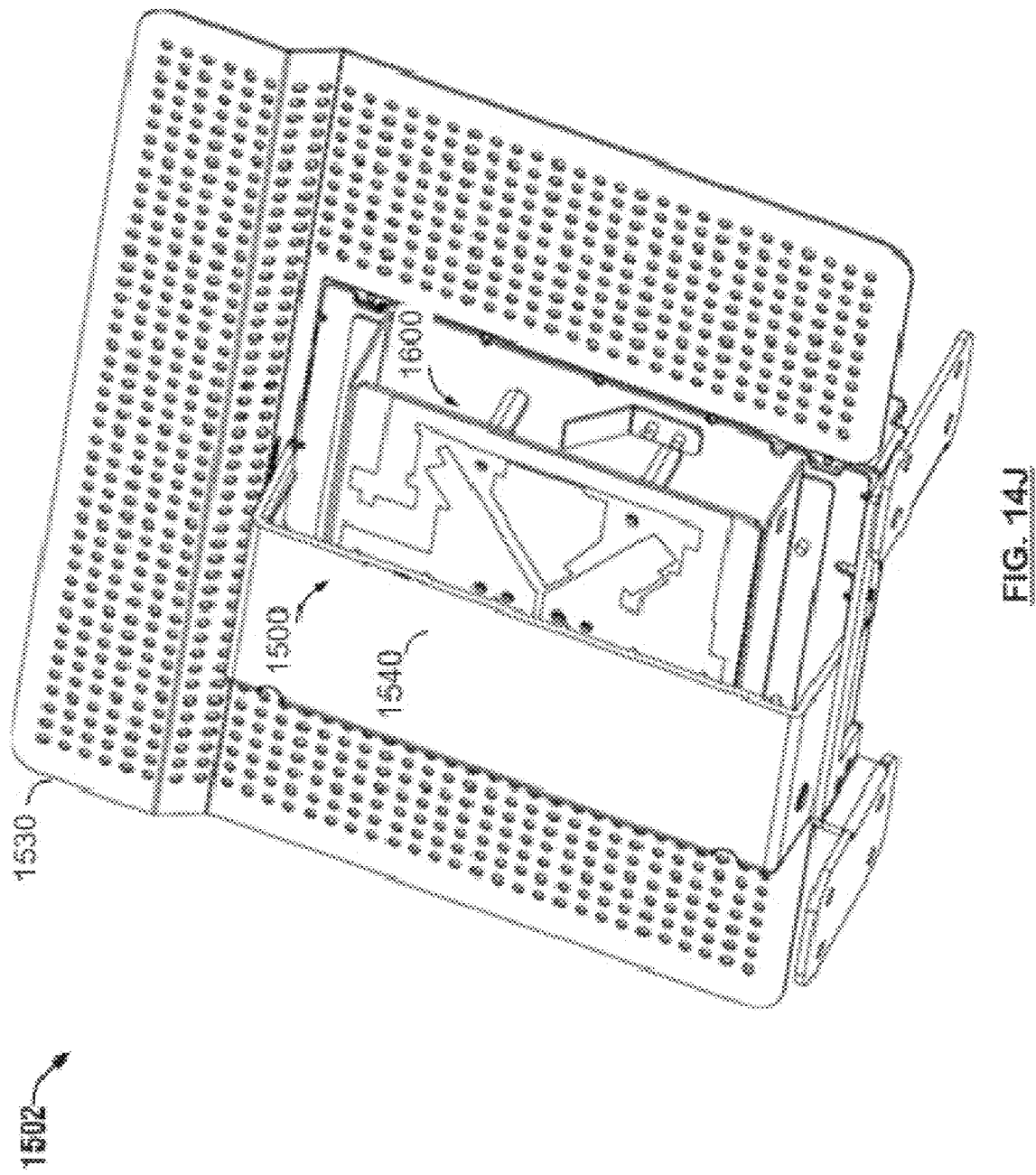
FIG. 14J is a rear perspective view of the signal booster of FIG. 14A, with a rear cover partially cut away and a base station antenna exposed.

FIGS. 14A-14J illustrate various views of a signal booster 1502 according to one embodiment. The signal booster 1502 includes a housing 1500 (FIG. 14A), a mobile station antenna port 1505 (FIG. 14A), a front cover 1510 (FIG. 14A), a plurality of heat fins 1515 (FIG. 14A), an input/output panel 1520 (FIG. 14A), a mounting bracket 1525 (FIG. 14A), an isolator 1530 (FIG. 14A) including a plurality of perforations 1535 (FIG. 14A), a power switch 1538 (FIG. 14A), a back cover 1540 (FIG. 14B), a plurality of back cover attachments 1545 (FIG. 14B), a power input port 1550 (FIG. 14F), and the base station antenna 1600 (FIG. 14J). Although the signal booster 1502 is described herein with reference to particular components arranged in a particular configuration, in various embodiments, components herein can be combined, divided, arranged in a different order, or omitted, and additional components can be added.

FIG. 14A is a front view of the signal booster 1502. FIG. 14B is a rear view of the signal booster 1502. FIG. 14C is a right-side view of the signal booster 1502. FIG. 14D is a left-side view of the signal booster 1502. FIG. 14E is a bottom view of the signal booster 1502. FIG. 14F is a top view of the signal booster 1502. FIG. 14G is a front perspective view of the signal booster 1502. FIG. 14H is a front perspective view of the signal booster of 1502, with the isolator 1530 and the mounting bracket 1525 detached. FIG. 14I is a rear perspective view of the signal booster 1502. FIG. 14J is a rear perspective view of the signal booster 1520 of FIG. 14A, with the rear cover partially cut away and the base station antenna 1600 exposed. It will be understood that the orientations are relative and the entire signal booster 1502 can be placed and held in any desired orientation.

The housing 1500 of the signal booster 1502 can be used to house the circuitry and components of the signal booster 1502 (including, but not limited to, downlink and uplink amplification circuitry), and can include front and rear covers 1510 and 1540. The housing 1500 can have a variety of form factors. In the illustrated configuration, the housing 1500 can have a rectangular perimeter when viewed from the front or back. However, other configurations are possible. For instance, the housing 1500 can have a circular perimeter. In one embodiment, the housing 1500 has a height in the range of about 10 cm to about 50 cm, a width in the range of about 10 cm to about 50 cm, and a depth in the range of about 2 cm to about 20 cm. Although one example of dimensional ranges for the housing 1500 has been provided, other configurations are possible. For example, in embodiments where the housing 1500 is configured for mounting in a vehicle window, the housing 1500 can have a height in the range of about 5 cm to 20 cm, a width in the range of about 5 cm to about 10 cm, and a depth in the range of about 1 cm to about 5 cm. In embodiments where the housing 1500 is configured for mounting within a structural component of a vehicle, inside the headliner of a vehicle, or omitted altogether, the booster can have a height in the range of about 5 cm to 20 cm, a width in the range of about 5 cm to about 10 cm, and a depth in the range of about 0.5 cm to about 3 cm.

The mobile station antenna port 1505 can be used to connect the signal booster 1502 to a mobile station antenna via a cable. However, other configurations are possible, such as configurations having additional antenna ports for additional antennas for each or different frequency bands and/or to support multiple-input multiple-output (MIMO) communications.

In the illustrated embodiment, the mobile station antenna port 1505 is located on a top surface of the front cover 1510. In other embodiments the mobile station antenna port 1505 can be located on the same side with the signal booster 1502.

In the illustrated embodiment, one or more PCBs (including multiplexers, filtering and amplification circuitry, such as any of the booster circuitry discussed earlier, positioned in one or more cavities of the front cover 1510. In certain configurations, a first PCB includes circuitry associated with one or more low frequency RF bands, such as RF bands having a frequency less than 1 GHz, and a second PCB includes circuitry associated with one or more high frequency RF bands, such as RF bands having a frequency greater than 1 GHz. For example, in one embodiment, a first PCB includes circuitry for boosting at least one signal of Band XII, Band XIII, and Band V, and a second PCB includes circuitry for boosting at least one signal of Band II and Band IV. However, other configurations are possible. Although booster circuitry for various bands is discussed herein, in some embodiments only circuitry for boosting PCS (e.g., Band II) and cellular (e.g., Band V) bands is employed.

The front cover 1510 can be made from a conductive material, and can thereby act as a Faraday cage in conjunction with an RF shield or isolator 1610 (see FIG. 15) positioned between the front cover 1510 and the rear cover 1540. Configuring the signal booster 1502 in this manner can aid in providing RF shielding or isolation for circuitry within the front cover 1510. The shield 1610 can thus also or alternatively serve as an isolator between the integrated base station antenna 1505*a* and the integrated or remote mobile station antenna 1505*b*. The shielding or isolator portion 1610 can also aid in providing thermal dissipation for booster circuitry.

In various embodiments, the front cover 1510 can be implemented using a variety of materials, including, for example, metals, such as aluminum or steel. In one embodiment, the front cover 1510 has a height in the range of about 10 cm to about 50 cm, a width in the range of about 10 cm to about 50 cm, and a depth in the range of about 1 cm to about 10 cm. Although one example of dimensional ranges for the front cover 1510 has been provided, other configurations are possible.

To aid in removing heat, the housing 1500 can include one or more fin structures used to dissipate heat. For example, in the illustrated configuration, the front cover 1510 has been implemented to include heat fins 1515. The heat fins 1515 can be used to dissipate heat, including, for example, heat dissipated through the front cover 1510. The heat fins 1515 can be arranged on the housing 1500 so as to be oriented vertically when the signal booster 1502 is mounted in a window according to a preferred embodiment. In some embodiments, the isolator 1530 can extend through the housing 1500, and can act as a heat sink. In embodiments where booster 1502 circuitry is mounted inside a structural component or trim of a vehicle, a portion of the metal vehicle body (for example, a rooftop body panel) can act as a heat sink. In some embodiments, the heat fins 1515 can be omitted.

The input/output panel 1520 serves to provide one or more user inputs and/or outputs. In various embodiments, the input/output panel 1520 can be a front panel, a display panel, or control panel. For example, the input/output panel 1520 can provide one or more status indicators and/or gain control inputs, each related to one or more wireless communication bands. Although the input/output panel 1520 is illustrated as a single panel, a person having ordinary skill in the art will appreciate that individual inputs or outputs can be located anywhere on the signal booster 1502. In various embodiments, the input/output panel 1520, or any portion thereof, can be omitted (for example, a user gain control portion), such as in embodiments where the booster 1502 is integrated within a trim or structural component of a vehicle.

The mounting bracket 1525 serves to provide structural support for the signal booster 1502, for example at a mounting point. The mounting bracket 1525 can be implemented using a variety of materials, including, for example, metals, such as aluminum, copper, or steel. As shown in FIG. 14H, the mounting bracket 1525 can be attached to (or removed from) the front cover 1510 of the housing 1500, for example via screws. In some embodiments, the mounting bracket 1525 can be omitted.

In the illustrated embodiment, the mounting bracket 1525 is attached to a bottom side of the housing 1500. In some embodiments, no inputs or outputs are provided on the side of the housing 1500 to which the mounting bracket 1525 is attached. For example, the mounting bracket 1525 can be attached to a side of the housing 1500 opposite to a side at which the mobile station antenna port 1505 is provided. Such configuration allows the mounting bracket 1525 to have a lower profile, for example when the signal booster 1502 is mounted in a window or between an interior panel and the outer body panel of a vehicle. Advantageously, material costs for the mounting bracket 1525 can be reduced, and visibility out a window increased.

The isolator 1530 serves as an isolator between the two antennae to reflect, shield, or reduce undesirable feedback and/or signal interference between an external mobile station antenna and the base station antenna 1600 over the air. In various embodiments, the isolator 1530 can be implemented using a variety of conductive materials, including, for example, metals, such as aluminum, copper, or steel. As shown in FIG. 14H, the isolator 1530 can be inserted (or removed from) a slot 1552 between the front cover 1510 and the rear cover 1540 of the housing 1500. In some embodiments, the isolator 1530 can be omitted, could be integrated in a manner that does not extend from the housing 1500, and/or could be integrated in a manner that extends through the center of the booster 1502.

The isolator 1530 can extend in a plane substantially parallel to faces of the front cover 1510 and the rear cover 1540, and can contact three sides (for example, a left side, right side, and top side) of the housing 1500. In some embodiments, the isolator 1530 can extend from four sides of the housing 1500. In the illustrated embodiment, a portion of the isolator 1530 is omitted from a side of the housing 1500 to which the mounting bracket 1525 attaches.

In various embodiments, the isolator 1530 can extend from the housing 1500 by at least ¼ the wavelength of the lowest frequency communication signal for which the signal booster 1502 is configured to transmit or receive. In some embodiments, the isolator 1530 can be sized sufficiently large to increase base station antenna 1600 front-to-back ratio by at least a threshold amount, for example 2 dB to 9 dB. In one embodiment, the isolator 1530 can extend in an upper portion 1570 in the range of about 2 cm to about 100 cm. In one embodiment, the isolator 1530 can extend in a side portion 1560 in the range of about 2 cm to about 50 cm. In some embodiments, the extent of the upper portion 1570 can be equal to the extent of the side portion 1560. In one embodiment, a total width of the isolator 1530 can be in the range of about 10 cm to about 200 cm, a total height of the isolator 1530 can be in the range of about 10 cm to about 200 cm, and a thickness of the isolator 1530 can be in the range of about 0.1 cm to about 1 cm. Although one example of dimensional ranges for the isolator 1530 has been provided, other configurations are possible.

In various embodiments, the isolator 1530 can include a plurality of perforations 1535 (FIG. 14H). The perforations 1535 can improve visibility and visible light infiltration, for example when the signal booster 1502 is mounted in a window of a vehicle. Although the perforations 1535 are shown as circular, other shapes are possible. In some embodiments, the perforations 1535 can be sized according to a wavelength of the highest frequency signal transmitted or received by the signal booster 1502. For example, the perforations 1535 can be sized such that visible light can pass though the perforations, but the highest frequency signal transmitted or received by the signal booster 1502 does not significantly pass through the perforations. As used herein, significant signal transmission can include, for example, signal transmission above a threshold. The threshold can include, for example, a sufficient signal to introduce errors as interference. In one embodiment, each perforation 1535 has a diameter in the range of about 1 mm to about 20 mm, and a spacing of about 1 mm to about 20 mm. Although one example of dimensional ranges for the perforations 1535 has been provided, other configurations are possible. In some embodiments, the perforations 1535 can be omitted.

In various embodiments, the isolator 1530 can include one or more zigzags 1555 (FIG. 14H). For example, in the illustrated embodiment, the zigzag 1555 brings an upper portion 1570 of the isolator 1530 towards a rear of the housing 1500. In an embodiment, the upper portion 1570 can be closer to the rear of the housing 1500 by an amount less than or equal to a standoff 1625 (FIG. 15) height. Bringing the upper portion 1570 of the isolator 1530 towards a rear of the housing 1500, and thus towards the base station antenna 1600 (FIG. 14J), increases the advantageous effects of the isolator 1530 such as, for example, reduced feedback between the base station antenna 1600 (FIG. 14J) and the mobile station antenna. In one embodiment, the zigzag 1555 has a depth in the range of about 1 mm to about 40 mm. In some embodiments, the zigzag 1555 can be sufficiently large to allow attachment of an RF cable 6b to the mobile station antenna port 1505. Although one example of dimensional ranges for the zigzag 1555 has been provided, other configurations are possible.

The power switch 1538 (FIGS. 14D and 14F) serves to turn the signal booster 1502 on and off. In the illustrated embodiment, the power switch 1538 is located on a top surface of the front cover 1510. In some preferred embodiments, the power switch 1538 is provided at a portion of the signal booster 1502 opposite a portion at which the mounting bracket 1525 is provided. Accordingly, the power switch 1538 can be manipulated without interference from the mounting bracket 1525 or a surface to which the signal booster 1502 is mounted.

The power input port 1550 (FIG. 14F) can be used to connect the signal booster 1502 to a power source such as, for example, main power or battery power. For example, in certain implementations, the power input port 1550 can be connected to a power cable (for instance, the power cable 14). In other implementations, the booster 1502 is powered using a DC supply voltage received over the mobile station antenna port 1505 via a shared DC power and RF cable. In the illustrated embodiment, the power input port 1550 is located on a top surface of the front cover 1510. In certain implementations, the power input port 1550 is provided at a portion of the signal booster 1502 opposite a portion at which the mounting bracket 1525 is provided. Accordingly, the power input port 1550 can be manipulated without interference from the mounting bracket 1525 or a surface to which the signal booster 1502 is mounted.

As shown in FIG. 14J, one or more circuit boards (including the base station antenna 1600) are positioned in one or more cavities of the rear cover 1540. The base station antenna 1600 is described in further detail below with respect to FIG. 15. The rear cover 1540 can be made from an RF transparent material. Configuring the signal booster 1502 in this manner can provide mechanical protection for the base station antenna 1600 with little to no degradation of RF signal strength.

In various embodiments, the rear cover 1540 can be implemented using a variety of materials, including, for example, plastics. In one embodiment, the rear cover 1540 has a height in the range of about 10 cm to about 50 cm, a width in the range of about 10 cm to about 50 cm, and a depth in the range of about 1 cm to about 10 cm. Although one example of dimensional ranges for the rear cover 1540 has been provided, other configurations are possible.

The input/output panel 1520 of FIG. 14A includes a power indicator and input/output interfaces for each of a plurality of frequency bands or groups of bands. Although the input/output panel 1520 of FIG. 14A is described herein with reference to particular components arranged in a particular configuration, in various embodiments, components herein can be combined, divided, arranged in a different order, or omitted, and additional components can be added. For example, while the input/output panel 1520 is illustrated as a single panel, a person having ordinary skill in the art will appreciate that individual inputs or outputs can be located anywhere on the signal booster 1502 or omitted in favor of remotely controlling the signal booster.

The power indicator serves to indicate whether the unit is on or off. In various embodiments, the power indicator can include an LED light, a text or graphic status display, a speaker, or any other output. In some embodiments, the power indicator can be omitted.

Each section or interface of the input/output panel 1520 includes an alert indicator and a gain control. Although two input/output interfaces are shown, separate interfaces can be provided for any individual frequency bands or channels (or combinations thereof) received and/or transmitted by the signal booster. For example, separate interfaces can be provided for any combination of frequency bands, as discussed above.

The alert indicator serves to provide a status indication for a respective frequency band or group of bands. In various embodiments, the alert indicator can include an LED light, a text or graphic status display, a speaker, or any other output. In some embodiments, the alert indicator can be omitted.

In another embodiment, an interface for a signal booster includes at least one of: a power-good state indicative of whether or not power is sufficient for operation, a signal-strength state indicative of whether or not an external signal has sufficient strength for reception, and/or an antenna-position state indicative of whether or not a distance between a mobile station antenna connected to the mobile station antenna port and the base station antenna is sufficient.

The gain control serves to control a gain for a respective frequency band or group of bands. In various embodiments, the gain control can include a knob, slider, one or more buttons, or any other input control. In some embodiments, the gain control can be omitted.

Although not illustrated in FIGS. 14A-14J, the signal booster 1502 can include a variety of other components, including, for example, fasteners, connectors, or adhesives used to assemble the signal booster 1502. Although the signal booster 1502 corresponds to one example implementation of a signal booster for a vehicle signal booster system, the teachings herein are applicable to other configurations of signal boosters.

Figure 15:
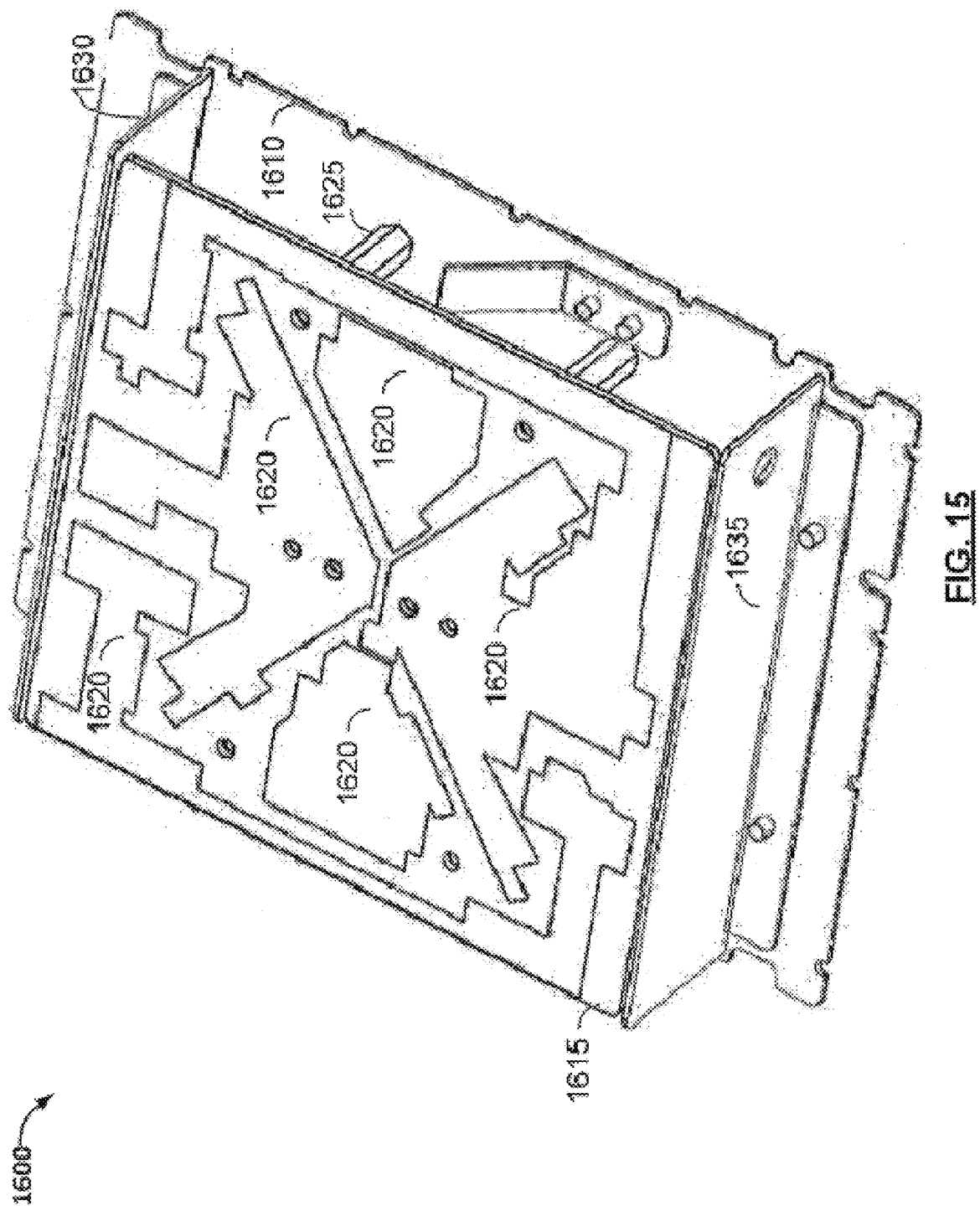
FIG. 15 is a perspective view of an integrated base station antenna of the signal booster of FIGS. 14A-14J.

FIG. 15 is a perspective view of an integrated base station antenna 1600 of the signal booster 1502 of FIGS. 14A-14J. As shown in FIG. 15, the base station antenna 1600 includes a shield or isolator 1610, an antenna PCB 1615, a plurality of antenna traces 1620, a plurality of standoffs 1625, a top support 1630, and a bottom support 1635. Although the base station antenna 1600 of FIG. 15 is described herein with reference to particular components arranged in a particular configuration, in various embodiments, components herein can be combined, divided, arranged in a different order, or omitted, and additional components can be added. The radiating element(s) need not be traces on a PCB, as will be appreciated by the skilled artisan.

The shield 1610 serves to provide RF shielding or isolation, in conjunction with the front cover 1510, for circuitry within the front cover 1510. In some embodiments, the shield 1610 can form a Faraday cage in conjunction with the front cover 1510. The shielding portion 1610 can also aid in providing thermal dissipation for booster circuitry. In the illustrated embodiment, the shield 1610 further provides structural support for the standoffs 1625, the top support 1630, and the bottom support 1635. The shield 1610 further serves as an isolator for the antenna traces 1620.

The antenna PCB 1615 serves to provide structural and fabrication support for the antenna traces 1620. In one embodiment, the antenna PCB 1615 has a height (measured with respect to the orientation of FIG. 14A) in the range of about 1 cm to about 100 cm, a width in the range of about 1 cm to about 100 cm, and a thickness in the range of about 0.1 cm to about 1 cm. In other embodiments the thickness can be small than 0.1 cm. Although one example of dimensional ranges for the antenna PCB 1615 has been provided, other configurations are possible.

The antenna traces 1620 serve to receive downlink signals from base stations, and to transmit uplink signals to base stations. In the illustrated embodiment, the antenna traces 1620 are configured as a bidirectional flat antenna, one side of which is reflected by the shield 1610 and/or the isolator 1530. Accordingly, the base station antenna 1600 as a whole is configured to provide an antenna radiation pattern substantially in the direction of the rear cover 1540. For example, when the signal booster 1502 is mounted in a window, the base station antenna 1600 is configured to provide an antenna radiation pattern substantially out the window.

In various embodiments, the antenna traces 1620 are connected to an internal base station input port such as, for example, a diplexer. The antenna traces 1620 can be connected via a local cable, which can be relatively short and high quality as compared to the remote cable 6a shown in FIG. 1. In one embodiment, the local cable (not shown) can have a length in the range of about 1 cm to about 20 cm, a length in the range of about 5 cm to 15 cm, and more particularly about 10 cm. The local RF cable can have a signal attenuation in the range of about 0.01 dB to about 10 dB, in the range of about 0.05 dB to about 1 dB, and more particularly about 0.1 dB.

The standoffs 1625 are configured to separate the antenna PCB 1615 from the shield 1610. In one embodiment, the standoffs 1625 have a height in the range of about 1 cm to about 10 cm. Although one example of dimensional ranges for the standoffs 1625 has been provided, other configurations are possible.

The top and bottom supports 1630 and 1635 serve to provide structural support for the antenna PCB 1615. In some embodiments, the top and bottom supports 1630 and 1635 further serve as isolators to create a resonant cavity between the antenna traces 1620 and the shield 1610. In one embodiment, the top and bottom supports 1630 and 1635 have a height in the range of about 1 cm to about 10 cm, and a thickness in the range of about 1 mm to about 10 mm. Although one example of dimensional ranges for the standoffs 1625 has been provided, other configurations are possible.

In various embodiments, the signal booster 1502 can include multiple base station antennas 1600. For example, the signal booster 1502 can include a separate base station antenna for high frequency bands (for example, those over 1 GHz) and a separate base station antenna for low frequency bands (for example, those 1 GHz and under). In another example, the signal booster 1502 can include a separate base station antenna for uplink bands and a separate base station antenna for downlink bands. In another example, the signal booster 1502 can include a separate base station antenna for TDD bands and a separate base station antenna for FDD bands. In various embodiments, separate base station antennas can be implemented as entire antenna modules 1600 (FIG. 15) or as separately connected traces 1620 on one or more antenna modules 1600.

Figure 16:
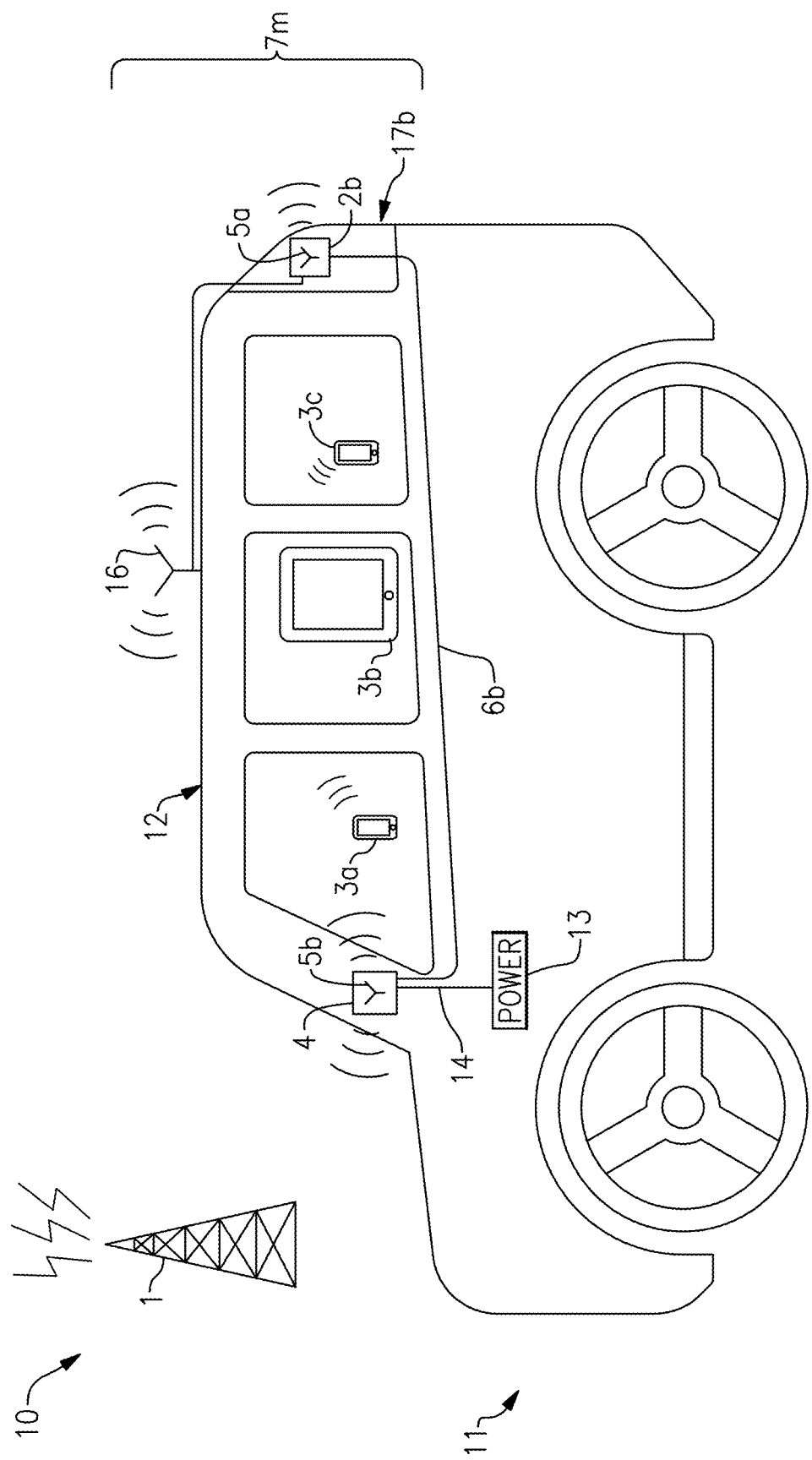
FIG. 16 is a schematic diagram of the mobile network according to another vehicular embodiment.

FIG. 16 is a schematic diagram of the mobile network 10 according to another vehicular embodiment. The mobile network 10 includes the base station 1, a signal booster system 7m, and the plurality of mobile devices 3a-3c (three shown). The signal booster system 7m includes a signal booster 2b, a vehicle interior mount 4, and an antenna cable 6b.

The signal booster system 7m of FIG. 16 is similar to the signal booster system 7d of FIG. 3C, except that the signal booster system 7m further includes an additional external base station antenna 16 connected to the signal booster 2b via a cable. The external base station antenna 16 can be optionally added by a user.

Thus, in this example, one integrated base station antenna 5a is included and one external base station antenna 16 is included. In certain implementation, a user can select to optionally include the external base station antenna 16 based on preference.

Figure 17:
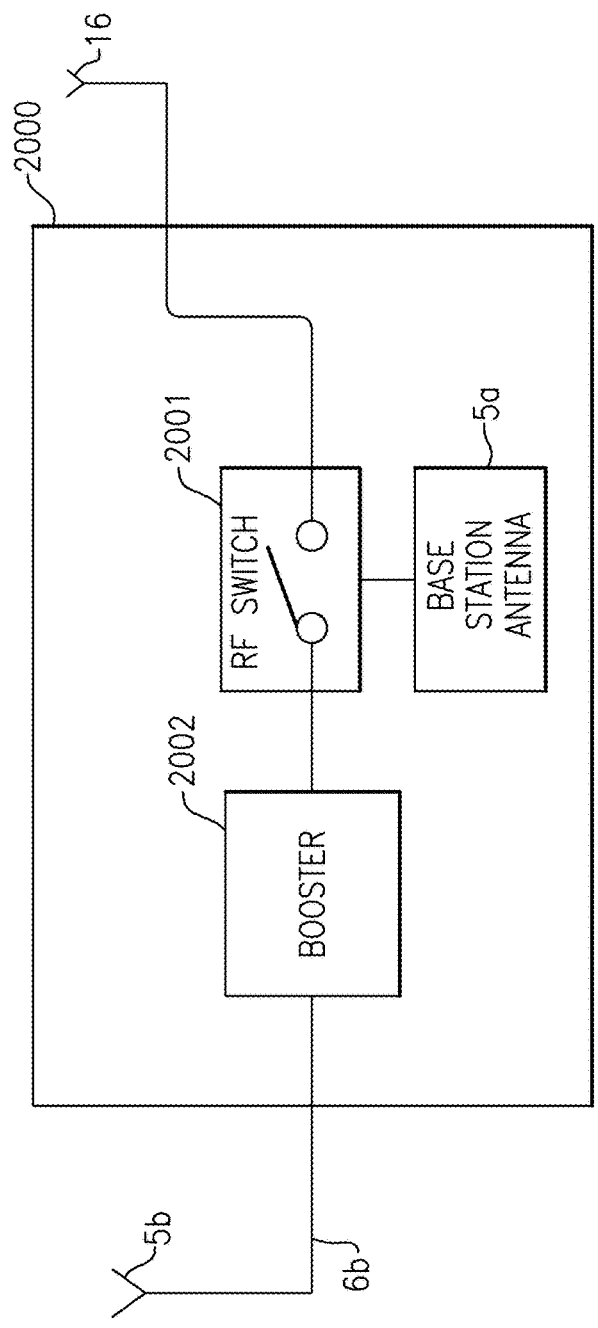
FIG. 17 is a schematic diagram of a signal booster according to another embodiment.

FIG. 17 is a schematic diagram of a signal booster 2000 according to another embodiment. The signal booster 2000 includes an RF switch 2001, booster circuitry 2002, and a base station antenna 5a in a housing. The signal booster 2000 is connectable to a mobile station antenna 5b over cable 5b, and to an external base station antenna 16. The RF switch 2001 can serve to connect to the external base station antenna 16, when present.

The signal booster 2000 can be adapted and modified in a wide variety of ways. In one example, multiple external base station antennas 16 and/or multiple base station antennas 5a are included, for instance, to support MIMO communications. In another example, the RF switch 2001 is omitted in favor of a combiner, such as a diplexer.

Figure 18:
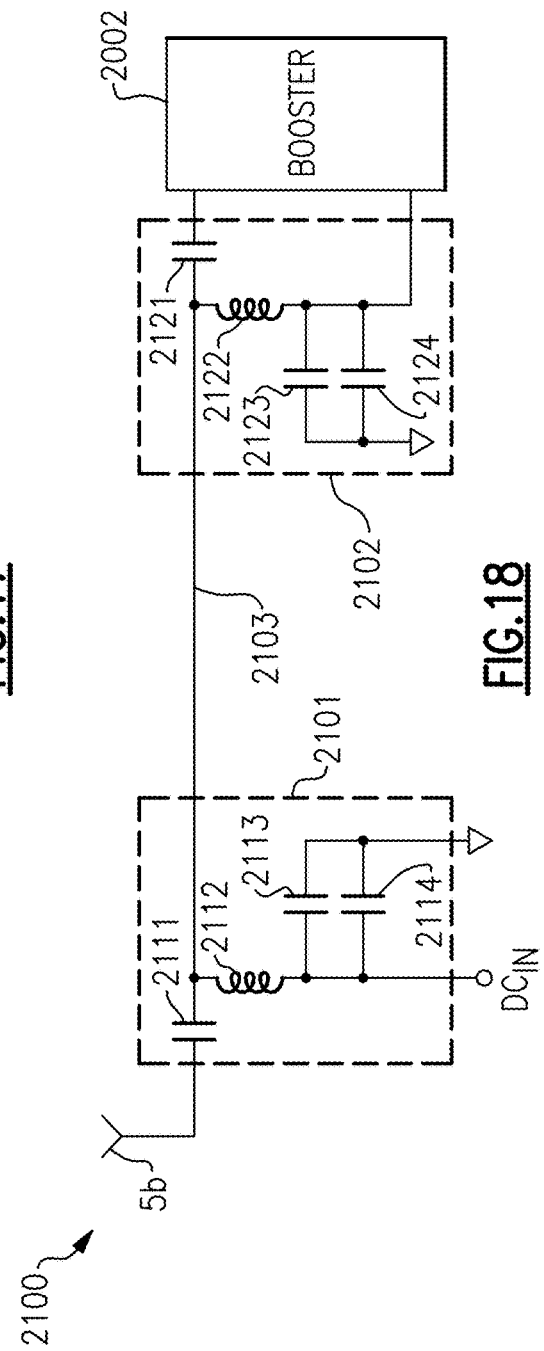
FIG. 18 is a schematic diagram of circuitry for connecting to a shared DC power and RF cable, according to one embodiment.

FIG. 18 is a schematic diagram of circuitry 2100 for connecting to a shared DC power and RF cable 2103, according to one embodiment. The circuitry 2100 includes an isolator/combiner 2101, which serves to combine a DC input voltage $DC_{IN}$ with an RF signal associated with the mobile station antenna 5b.

The isolator/combiner 2101 includes a DC blocking capacitor 2111, an RF choke inductor 2112 and decoupling capacitors 2113, 2114. The isolator/separator 2102 (corresponding to one embodiment of a DC power and RF processing circuit) includes a DC blocking capacitor 2121, an RF choke inductor 2122 and decoupling capacitors 2123, 2124.

Although one embodiment of circuitry for connecting to a shared DC power and RF cable is shown, other implementations are possible.

Any of the vehicle signal booster systems described herein can be installed in a vehicle, such as an automobile. Furthermore, the vehicle signal booster systems can be fully or partially integrated with the vehicle, including, but not limited to, integrated into or within interior paneling of the vehicle's body.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not only the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A vehicle signal booster system configured for use in a vehicle, the vehicle signal booster system comprising:
   a mobile station antenna configured to receive a radio frequency (RF) uplink signal and to transmit a boosted RF downlink signal; and
   a signal booster comprising:
      a housing;
      a mobile station antenna port configured to receive the RF uplink signal from the mobile station antenna and to provide the boosted RF downlink signal to the mobile station antenna;
      a base station antenna within 20 cm of the housing, wherein the base station antenna is configured to receive an RF downlink signal and to transmit a boosted RF uplink signal;
      booster circuitry within the housing, wherein the booster circuitry is configured to generate the boosted RF downlink signal based on amplifying one or more downlink channels of the RF downlink signal, and to generate the boosted RF uplink signal based on amplifying one or more uplink channels of the RF uplink signal; and
      a shared DC power and RF cable coupled between the mobile station antenna and the mobile station antenna port of the signal booster.

2. The vehicle signal booster system of claim 1, wherein the base station antenna is within the housing.

3. The vehicle signal booster system of claim 1, wherein the shared DC power and RF cable includes a conductor configured to carry an RF voltage superimposed on a DC supply voltage, the signal booster further comprising a DC power and RF processing circuit configured to extract the DC supply voltage from the conductor.

4. The vehicle signal booster system of claim 1, further comprising a vehicle interior mount configured to attach to an interior of the vehicle, wherein the mobile station antenna is integrated with or located within the vehicle interior mount.

5. The vehicle signal booster system of claim 1, further comprising a circuit board within the housing and comprising the booster circuitry and the base station antenna thereon.

6. The vehicle signal booster system of claim 1, further comprising an external base station antenna connected to the signal booster via a cable.

7. The vehicle signal booster system of claim 1, installed in an automobile.

8. The vehicle of claim 7, wherein the base station antenna is orientated substantially vertically to a surface of the earth.

9. A vehicle signal booster system configured for use in a vehicle, the vehicle signal booster system comprising:
- a mobile station antenna configured to receive a radio frequency (RF) uplink signal and to transmit a boosted RF downlink signal;
- a signal booster comprising:
  - a housing;
  - a mobile station antenna port configured to receive the RF uplink signal from the mobile station antenna and to provide the boosted RF downlink signal to the mobile station antenna;
  - a base station antenna within 20 cm of the housing, wherein the base station antenna is configured to receive an RF downlink signal and to transmit a boosted RF uplink signal; and
  - booster circuitry within the housing, wherein the booster circuitry is configured to generate the boosted RF downlink signal based on amplifying one or more downlink channels of the RF downlink signal, and to generate the boosted RF uplink signal based on amplifying one or more uplink channels of the RF uplink signal; and
- a vehicle interior mount configured to attach to an interior of the vehicle, wherein the mobile station antenna is integrated with or located within the vehicle interior mount,
- wherein the vehicle interior mount comprises a magnet operable to securely suspend a mobile device against the vehicle interior mount.

10. The vehicle signal booster system of claim 9, further comprising a pluggable power cable configured to supply the vehicle interior mount with power from a vehicle power source.

11. The vehicle signal booster system of claim 10, further comprising a shared DC power and RF cable coupled between the vehicle interior mount and the mobile station antenna port, wherein the shared DC power and RF cable is configured to provide a DC supply voltage to the booster circuitry and to carry the RF uplink signal and the boosted RF downlink signal.

12. A vehicle signal booster system configured for use in a vehicle, the vehicle signal booster system comprising:
- a mobile station antenna configured to receive a radio frequency (RF) uplink signal and to transmit a boosted RF downlink signal;
- a signal booster comprising:
  - a housing;
  - a mobile station antenna port configured to receive the RF uplink signal from the mobile station antenna and to provide the boosted RF downlink signal to the mobile station antenna;
  - a base station antenna within 20 cm of the housing, wherein the base station antenna is configured to receive an RF downlink signal and to transmit a boosted RF uplink signal; and
  - booster circuitry within the housing, wherein the booster circuitry is configured to generate the boosted RF downlink signal based on amplifying one or more downlink channels of the RF downlink signal, and to generate the boosted RF uplink signal based on amplifying one or more uplink channels of the RF uplink signal; and
- a vehicle interior mount configured to attach to an interior of the vehicle, wherein the mobile station antenna is integrated with or located within the vehicle interior mount,
- wherein the vehicle interior mount comprises a Wi-Fi router configured to communicate with a Wi-Fi adapter.

13. A vehicle signal booster system configured for use in a vehicle, the vehicle signal booster system comprising:
- a mobile station antenna configured to receive a radio frequency (RF) uplink signal and to transmit a boosted RF downlink signal;
- a signal booster comprising:
  - a housing;
  - a mobile station antenna port configured to receive the RF uplink signal from the mobile station antenna and to provide the boosted RF downlink signal to the mobile station antenna;
  - a base station antenna within 20 cm of the housing, wherein the base station antenna is configured to receive an RF downlink signal and to transmit a boosted RF uplink signal; and
  - booster circuitry within the housing, wherein the booster circuitry is configured to generate the boosted RF downlink signal based on amplifying one or more downlink channels of the RF downlink signal, and to generate the boosted RF uplink signal based on amplifying one or more uplink channels of the RF uplink signal;
- a vehicle interior mount configured to attach to an interior of the vehicle, wherein the mobile station antenna is integrated with or located within the vehicle interior mount; and
- a plurality of user-selectable fasteners of different types, wherein each of the plurality of user-selectable fasteners is attachable and detachable from the vehicle interior mount.

14. A vehicle signal booster system configured for use in a vehicle, the vehicle signal booster system comprising:
- a mobile station antenna configured to receive a radio frequency (RF) uplink signal and to transmit a boosted RF downlink signal;
- a signal booster comprising:
  - a housing;
  - a mobile station antenna port configured to receive the RF uplink signal from the mobile station antenna and to provide the boosted RF downlink signal to the mobile station antenna;
  - a base station antenna within 20 cm of the housing, wherein the base station antenna is configured to receive an RF downlink signal and to transmit a boosted RF uplink signal; and
  - booster circuitry within the housing, wherein the booster circuitry is configured to generate the boosted RF downlink signal based on amplifying one or more downlink channels of the RF downlink signal, and to generate the boosted RF uplink signal based on amplifying one or more uplink channels of the RF uplink signal; and a cable configured to connect between a vehicle power source and the mobile station antenna port, wherein the cable is configured to carry a DC supply voltage to the signal booster, and wherein the mobile station antenna is integrated in the cable.

15. A vehicle signal booster system configured for use in a vehicle, the vehicle signal booster system comprising:
a mobile station antenna configured to receive a radio frequency (RF) uplink signal and to transmit a boosted RF downlink signal;
a signal booster comprising:
a housing;
a mobile station antenna port configured to receive the RF uplink signal from the mobile station antenna and to provide the boosted RF downlink signal to the mobile station antenna;
a base station antenna within 20 cm of the housing, wherein the base station antenna is configured to receive an RF downlink signal and to transmit a boosted RF uplink signal; and
booster circuitry within the housing, wherein the booster circuitry is configured to generate the boosted RF downlink signal based on amplifying one or more downlink channels of the RF downlink signal, and to generate the boosted RF uplink signal based on amplifying one or more uplink channels of the RF uplink signal; and
an external base station antenna connected to the signal booster via a cable,
wherein the signal booster comprises an RF switch for selection of the base station antenna and the external base station antenna.

16. A vehicle signal booster system configured for use in a vehicle, the vehicle signal booster system comprising:
a mobile station antenna configured to receive a radio frequency (RF) uplink signal and to transmit a boosted RF downlink signal;
a signal booster comprising:
a housing;
a mobile station antenna port configured to receive the RF uplink signal from the mobile station antenna and to provide the boosted RF downlink signal to the mobile station antenna;
a base station antenna within 20 cm of the housing, wherein the base station antenna is configured to receive an RF downlink signal and to transmit a boosted RF uplink signal; and
booster circuitry within the housing, wherein the booster circuitry is configured to generate the boosted RF downlink signal based on amplifying one or more downlink channels of the RF downlink signal, and to generate the boosted RF uplink signal based on amplifying one or more uplink channels of the RF uplink signal,
wherein the signal booster further comprises a charging cable configured to charge a battery of a mobile device.

17. The vehicle signal booster system of claim 16, further comprising a shared DC power and RF cable coupled between the mobile station antenna and the mobile station antenna port of the signal booster.

18. A vehicle signal booster system comprising:
a base station antenna configured to receive a radio frequency (RF) downlink signal and to transmit a boosted RF uplink signal from above a roof of a vehicle;
a first mobile station antenna configured to receive an RF uplink signal and to transmit a boosted RF downlink signal from beneath the roof of the vehicle;
a signal booster configured for integration in the roof of the vehicle, wherein the signal booster comprises a housing and booster circuitry within the housing and configured to receive power from a power source of the vehicle, wherein the booster circuitry is further configured to generate the boosted RF downlink signal based on amplifying one or more downlink channels of the RF downlink signal, and to generate the boosted RF uplink signal based on amplifying one or more uplink channels of the RF uplink signal, wherein the base station antenna is within 20 cm of the housing; and
a mobile station port configured to provide at least one of a direct coupling connection or a wired connection to a mobile device.

19. The vehicle signal booster system of claim 18, further comprising a second mobile station antenna configured to transmit the boosted RF downlink signal from beneath the roof of the vehicle.

20. The vehicle signal booster system of claim 18, wherein the base station antenna is integrated within the signal booster.

21. The vehicle signal booster system of claim 18, wherein the signal booster operates without any antenna cables.

22. The vehicle signal booster system of claim 18, wherein the first mobile station antenna is configured for integration into the roof of the vehicle.

23. The vehicle signal booster system of claim 18, further comprising a cable connecting the first mobile station antenna to the signal booster and having a length in the range of about 1 cm to about 20 cm.

24. The vehicle signal booster system of claim 18, installed in an automobile.

25. A vehicle signal booster system comprising:
a base station antenna configured to receive a radio frequency (RF) downlink signal and to transmit a boosted RF uplink signal from above a roof of a vehicle;
a first mobile station antenna configured to receive an RF uplink signal and to transmit a boosted RF downlink signal from beneath the roof of the vehicle;
a signal booster configured for integration in the roof of the vehicle, wherein the signal booster comprises a housing and booster circuitry within the housing and configured to receive power from a power source of the vehicle, wherein the booster circuitry is further configured to generate the boosted RF downlink signal based on amplifying one or more downlink channels of the RF downlink signal, and to generate the boosted RF uplink signal based on amplifying one or more uplink channels of the RF uplink signal, wherein the base station antenna is within 20 cm of the housing; and
a second mobile station antenna configured to transmit the boosted RF downlink signal from beneath the roof of the vehicle,
wherein the signal booster is configured to control a phase difference between the first mobile station antenna and the second mobile station antenna such that the boosted RF downlink signal transmitted from the first mobile station antenna and the boosted RF downlink signal transmitted from the second mobile station antenna destructively interfere at the base station antenna.

26. The vehicle signal booster system of claim 25, further comprising a mobile station port configured to provide at least one of a direct coupling connection or a wired connection to a mobile device.

* * * * *